(12) United States Patent
Murata et al.

(10) Patent No.: US 11,852,911 B2
(45) Date of Patent: Dec. 26, 2023

(54) LIQUID CRYSTAL DISPLAY DEVICE

(71) Applicant: Sharp Display Technology Corporation, Kameyama (JP)

(72) Inventors: Koji Murata, Kameyama (JP);
Yasuhiro Haseba, Kameyama (JP);
Kazutaka Hanaoka, Kameyama (JP);
Kimiaki Nakamura, Kameyama (JP);
Mariko Honda, Kameyama (JP);
Atsuko Kanashima, Kameyama (JP);
Tadashi Hasegawa, Kameyama (JP);
Shinji Shimada, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 17/852,411

(22) Filed: Jun. 29, 2022

(65) Prior Publication Data

US 2023/0024383 A1 Jan. 26, 2023

(30) Foreign Application Priority Data

Jul. 2, 2021 (JP) .................. 2021-110811

(51) Int. Cl.
*G02F 1/1334* (2006.01)
*G02F 1/137* (2006.01)
(Continued)

(52) U.S. Cl.
CPC .......... *G02F 1/1334* (2013.01); *G02F 1/1337* (2013.01); *G02F 1/13706* (2021.01); *G02F 1/133603* (2013.01)

(58) Field of Classification Search
CPC ............... G02F 1/1334; G02F 1/13342; G02F 1/133603; G02F 1/133615; G02F 1/1347;
(Continued)

(56) References Cited

U.S. PATENT DOCUMENTS

2015/0279256 A1* 10/2015 Kobayashi ........... G09G 3/3413
345/694
2016/0116768 A1* 4/2016 Okuyama ............. G02F 1/1334
349/33
(Continued)

FOREIGN PATENT DOCUMENTS

JP 2009-128831 A 6/2009
JP 2009128831 A * 6/2009
(Continued)

*Primary Examiner* — Jia X Pan
(74) *Attorney, Agent, or Firm* — Keating & Bennett, LLP

(57) ABSTRACT

Provided is a liquid crystal display device capable of switching between a transparent state and a scattering state, reducing or preventing a decrease in transmittance in the transparent state, and reducing or preventing a decrease in luminance in the panel central portion in the scattering state. The liquid crystal display device includes, sequentially from its viewing surface side toward its back surface side: a first liquid crystal panel; a light source; and a second liquid crystal panel, the first liquid crystal panel including a polymer dispersed liquid crystal containing a polymer network and liquid crystal components, the light source being configured to irradiate a back surface side main surface of the first liquid crystal panel with light from an oblique direction.

14 Claims, 27 Drawing Sheets

(51) Int. Cl.
*G02F 1/1337* (2006.01)
*G02F 1/13357* (2006.01)

(58) Field of Classification Search
CPC ............... G02F 1/1337; G02F 1/13706; G02F 1/133622; G02F 1/13476; G09G 3/003; G09G 3/2003; G09G 3/36; G09G 2300/023; G09G 2320/0261; G09G 3/3413; G09G 2310/0235
See application file for complete search history.

(56) References Cited

U.S. PATENT DOCUMENTS

| | | | |
|---|---|---|---|
| 2016/0187724 A1* | 6/2016 | Masuda | G02B 6/0063 349/65 |
| 2017/0219861 A1* | 8/2017 | Fukuoka | G02F 1/13363 |
| 2018/0231837 A1* | 8/2018 | Fukuoka | G02F 1/13306 |
| 2019/0204632 A1 | 7/2019 | Okuyama et al. | |
| 2020/0124917 A1* | 4/2020 | Igarashi | G02F 1/133603 |
| 2020/0174294 A1 | 6/2020 | Okuyama et al. | |
| 2022/0075216 A1 | 3/2022 | Okuyama et al. | |

FOREIGN PATENT DOCUMENTS

| | | | |
|---|---|---|---|
| JP | 2010-217828 A | | 9/2010 |
| JP | 2010217828 A | * | 9/2010 |
| JP | 2016-085452 A | | 5/2016 |
| WO | 2014/054521 A1 | | 4/2014 |
| WO | 2015/053023 A1 | | 4/2015 |

\* cited by examiner

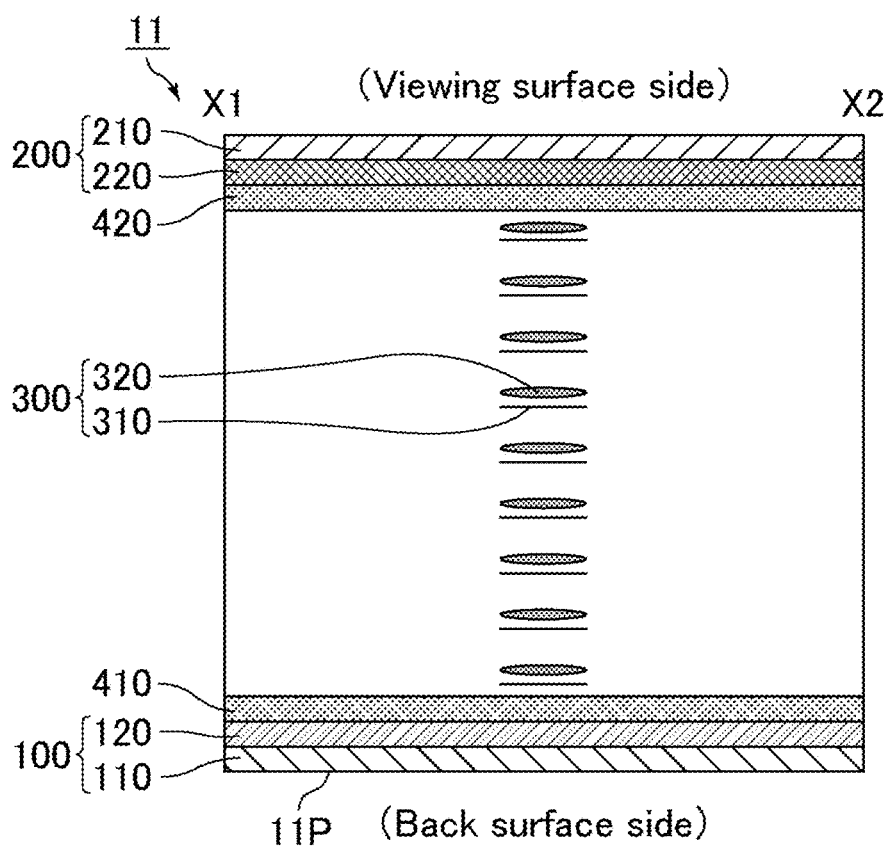

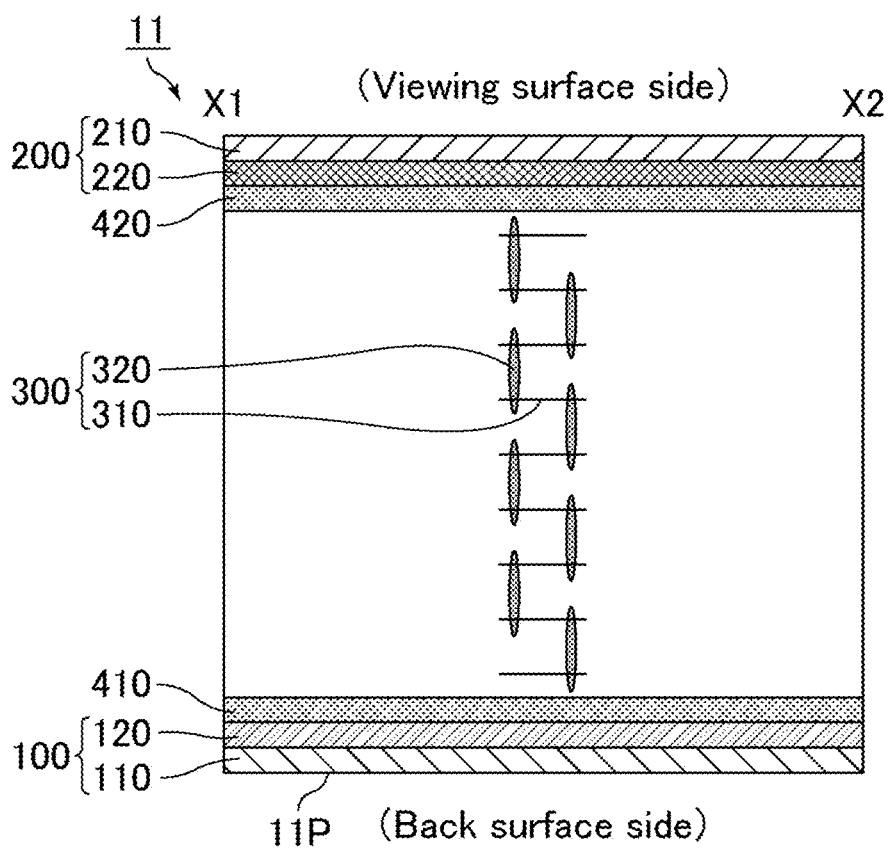

LIQUID CRYSTAL DISPLAY DEVICE

CROSS-REFERENCE TO RELATED APPLICATIONS

The present application claims priority under 35 U.S.C. § 119 to Japanese Patent Application No. 2021-110811 filed on Jul. 2, 2021, the contents of which are incorporated herein by reference in their entirety.

BACKGROUND OF THE INVENTION

Field of the Invention

The disclosure relates to liquid crystal display devices.

Description of Related Art

Liquid crystal display devices are display devices utilizing a liquid crystal composition to display images. Typical display methods thereof include applying voltage to the liquid crystal composition sealed between paired substrates to change the alignment of liquid crystal molecules in the liquid crystal composition based on the applied voltage, thus controlling the amount of light passing through the liquid crystal display device. Such liquid crystal display devices are used in a variety of fields owing to their features including their thin profile, light weight, and low power consumption.

Driving systems for liquid crystal display devices that display color images have been developed. One of the systems is a field-sequential color (FSC) system. A common FSC system divides a display period of a single screen (single frame period) into three subfields, and sequentially switching among red (R), green (G), and blue (B) light emitting diodes (LEDs) which serve as a light source of backlight illumination. Synchronously with the switching, the system sequentially inputs image signals of the colors of the illumination rays from the respective LEDs to the liquid crystal panel to control the transmission state of the panel, thus enabling additive color mixing on the retinas of the viewer's eyes.

The FSC system enables color display without formation of subpixels in a pixel, achieving a high resolution. Also, the FSC system directly uses light from LEDs. This eliminates the need for color filters with a high degree of absorptivity in each pixel, and thus achieves a high degree of use efficiency of light from each LED.

See-through displays have drawn attention which are capable of providing display where the background of its liquid crystal display device can be seen through the device. Liquid crystal display devices using a polymer dispersed liquid crystal (PDLC) have been developed as liquid crystal display devices for see-through displays. A PDLC contains liquid crystal components dispersed in a polymer network. Application of voltage to the PDLC changes the alignment of the liquid crystal components and produces a difference in refractive index between the liquid crystal components and the polymer network. The liquid crystal display devices use this difference to switch between a transparent state and a scattering state.

There are known techniques related to see-through displays based on the FSC system. For example, WO 2015/053023 discloses a liquid crystal display device that includes two liquid crystal panels and is capable of providing color display without color filters by FSC driving of the light sources. JP 2016-85452 A discloses a liquid crystal display device that causes light from an FSC-driven light source to be incident on a light modulation layer between paired transparent substrates.

BRIEF SUMMARY OF THE INVENTION

Since the liquid crystal display device disclosed in WO 2015/053023 provides transparent display and color display using a polarizing plate in combination with the FSC driving, the transmittance in the transmission display is insufficient (for example, about 25%).

JP 2016-85452 A employs a system that guides light from the FSC-driven light source extending along a side of the liquid crystal panel to the inside of the light modulation layer (for example, polymer dispersed liquid crystal). This causes loss of light due to a factor such as diffraction or scattering by the thin film transistors or the polymer dispersed liquid crystal inside the liquid crystal panel. As a result, light from the side of the liquid crystal panel is significantly attenuated as it travels toward the central portion of the liquid crystal panel. Thus, when the liquid crystal panel is increased in size, the luminance in the panel central portion may be insufficient. This means that there is a restriction on the size of the liquid crystal panel, and the size of the liquid crystal panel is difficult to increase to a middle or large size.

In response to the above issues, an object of the present invention is to provide a liquid crystal display device capable of switching between a transparent state and a scattering state, reducing or preventing a decrease in transmittance in the transparent state, and reducing or preventing a decrease in luminance in the panel central portion in the scattering state.

(1) One embodiment of the present invention is directed to a liquid crystal display device including, sequentially from its viewing surface side toward its back surface side: a first liquid crystal panel; a light source; and a second liquid crystal panel, the first liquid crystal panel including a polymer dispersed liquid crystal containing a polymer network and liquid crystal components, the light source being configured to irradiate a back surface side main surface of the first liquid crystal panel with light from an oblique direction.

(2) In an embodiment of the present invention, the liquid crystal display device includes the structure (1), the first liquid crystal panel displays an image based on a field-sequential color system, and the light source includes light-emitting elements configured to emit light rays of colors different from one another.

(3) In an embodiment of the present invention, the liquid crystal display device includes the structure (1) or (2), and the first liquid crystal panel further includes a thin film transistor.

(4) In an embodiment of the present invention, the liquid crystal display device includes the structure (1), (2), or (3), and a distance between the first liquid crystal panel and the second liquid crystal panel is a [cm] or shorter, where a is calculated from a length $2a$ [cm] of a long side of the first liquid crystal panel.

(5) In an embodiment of the present invention, the liquid crystal display device includes the structure (1), (2), (3), or (4), and the liquid crystal display device satisfies the following (formula 1-1):

$$1 \text{ cm} \leq h11 \leq \{a/(\tan \theta 11)\} \quad \text{(formula 1-1)}$$

where a is calculated from a length $2a$ [cm] of a long side of the first liquid crystal panel, h11 [cm] is a distance between the first liquid crystal panel and the light source, and θ11[°] is an angle of incidence of light from the light source on the back surface side main surface of the first liquid crystal panel.

(6) In an embodiment of the present invention, the liquid crystal display device includes the structure (1), (2), (3), (4), or (5), the light source is a first light source and disposed correspondingly to one of a pair of edge portions of the first liquid crystal panel facing each other, the liquid crystal display device further includes a second light source that is disposed between the first liquid crystal panel and the second liquid crystal panel and correspondingly to the other of the edge portions, the second light source is configured to irradiate the back surface side main surface of the first liquid crystal panel with light from an oblique direction, and an angle of incidence of light from the first light source on the back surface side main surface of the first liquid crystal panel is the same as an angle of incidence of light from the second light source on the back surface side main surface of the first liquid crystal panel.

(7) In an embodiment of the present invention, the liquid crystal display device includes the structure (1), (2), (3), (4), (5), or (6), the liquid crystal display device further includes a back surface side light source between the light source and the second liquid crystal panel, and the back surface side light source irradiates the back surface side main surface of the first liquid crystal panel with light from an oblique direction.

(8) In an embodiment of the present invention, the liquid crystal display device includes the structure (7), and the liquid crystal display device satisfies the following (formula 1-1) and (formula 2-1):

$$1 \text{ cm} \leq h11 \leq \{a/(\tan \theta 11)\} \quad \text{(formula 1-1)}$$

$$\theta 11 - \theta 21 > 10° \quad \text{(formula 2-1)}$$

where a is calculated from a length $2a$ [cm] of a long side of the first liquid crystal panel, h11 [cm] is a distance between the first liquid crystal panel and the light source, θ11[°] is an angle of incidence of light from the light source on the back surface side main surface of the first liquid crystal panel, and θ21[°] is an angle of incidence of light from the back surface side light source on the back surface side main surface of the first liquid crystal panel.

(9) In an embodiment of the present invention, the liquid crystal display device includes the structure (7) or (8), the back surface side light source is a first back surface side light source and disposed correspondingly to one of a pair of edge portions of the first liquid crystal panel facing each other, the liquid crystal display device further includes a second back surface side light source that is disposed between the light source and the second liquid crystal panel and correspondingly to the other of the edge portions, the second back surface side light source is configured to irradiate the back surface side main surface of the first liquid crystal panel with light from an oblique direction, and an angle of incidence of light from the first back surface side light source on the back surface side main surface of the first liquid crystal panel is the same as an angle of incidence of light from the second back surface side light source on the back surface side main surface of the first liquid crystal panel.

(10) In an embodiment of the present invention, the liquid crystal display device includes the structure (1), (2), (3), (4), (5), (6), (7), (8), or (9), and the first liquid crystal panel further includes a first support substrate on a back surface side of the polymer dispersed liquid crystal, and a second support substrate on a viewing surface side of the polymer dispersed liquid crystal.

(11) In an embodiment of the present invention, the liquid crystal display device includes the structure (10), the first liquid crystal panel further includes an alignment film at least one of between the first support substrate and the polymer dispersed liquid crystal or between the second support substrate and the polymer dispersed liquid crystal, and the alignment film is a horizontal alignment film configured to align the liquid crystal components in a direction parallel to a surface of the alignment film.

(12) In an embodiment of the present invention, the liquid crystal display device includes the structure (11), and the liquid crystal components have a positive anisotropy of dielectric constant.

(13) In an embodiment of the present invention, the liquid crystal display device includes the structure (10), (11), or (12), and the first liquid crystal panel further includes a transparent resin plate on a back surface side of the first support substrate.

(14) In an embodiment of the present invention, the liquid crystal display device includes the structure (10), (11), (12), or (13), and the first liquid crystal panel further includes an anisotropic light diffusion film having a function to transmit light in a front view and scatter light in an oblique view on at least one of a back surface side of the first support substrate or a viewing surface side of the second support substrate.

(15) In an embodiment of the present invention, the liquid crystal display device includes the structure (1), (2), (3), (4), (5), (6), (7), (8), (9), (10), (11), (12), (13), or (14), and the second liquid crystal panel includes, sequentially from its back surface side toward its viewing surface side, a third support substrate, a liquid crystal layer, a fourth support substrate, and an anisotropic light reflection film having a function to transmit light in a front view and reflect light in an oblique view.

The present invention can provide a liquid crystal display device capable of switching between a transparent state and a scattering state, reducing or preventing a decrease in transmittance in the transparent state, and reducing or preventing a decrease in luminance in the panel central portion in the scattering state.

BRIEF DESCRIPTION OF THE DRAWINGS

FIG. 2A is a schematic cross-sectional view of a transparent state of a first liquid crystal panel in the liquid crystal display device of Embodiment 1.

FIG. 2B is a schematic cross-sectional view of a scattering state of the first liquid crystal panel in the liquid crystal display device of Embodiment 1.

DETAILED DESCRIPTION OF THE INVENTION

The present invention is described in more detail based on the following embodiments with reference to the drawings. The present invention is not limited to these embodiments.

Definition of Terms

Herein, the "viewing surface side" refers to the side that is closer to the screen (display surface) of the polymer dispersed liquid crystal display device. The "back surface side" is the side that is farther from the screen (display surface) of the polymer dispersed liquid crystal display device.

Embodiment 1

Figure 1:
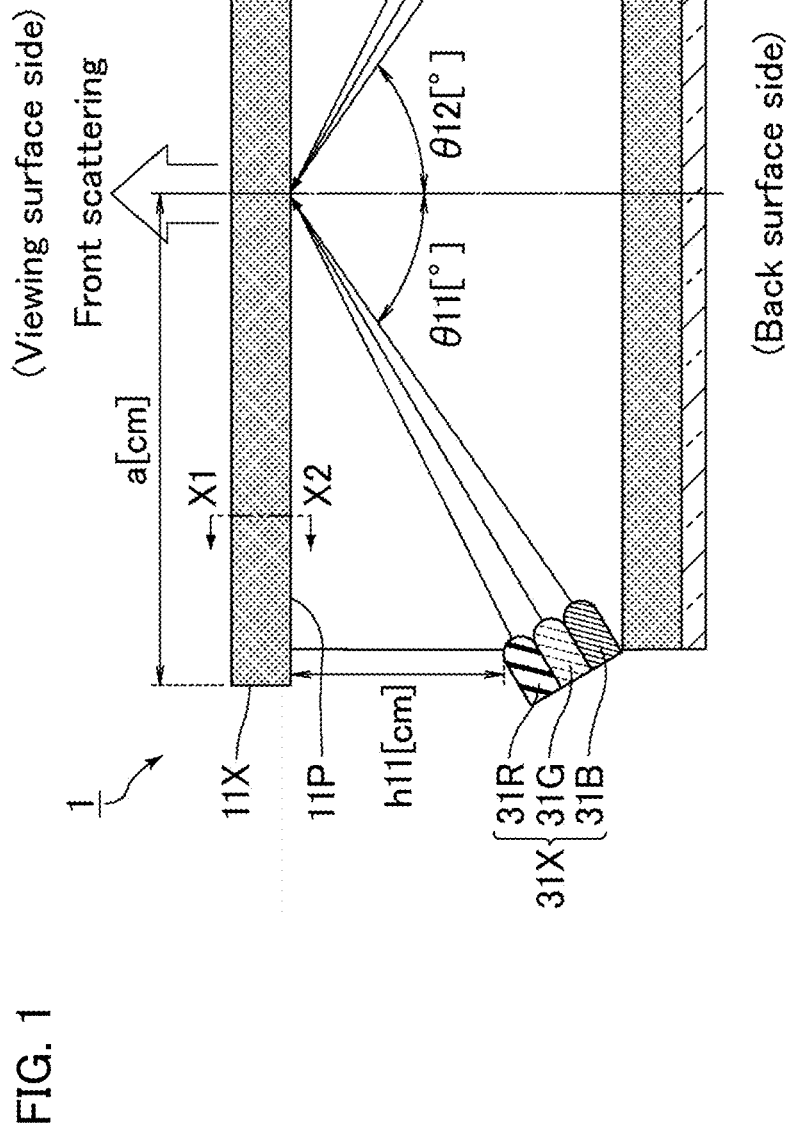
FIG. 1 is an example of a schematic cross-sectional view of a liquid crystal display device of Embodiment 1.

FIG. 1 is an example of a schematic cross-sectional view of a liquid crystal display device of Embodiment 1. As shown in FIG. 1, a liquid crystal display device 1 of the present embodiment includes, sequentially from its viewing surface side toward its back surface side, a first liquid crystal panel 11, a first light source 31X as the light source, a second liquid crystal panel 12, and a backlight 50.

FIG. 2A is a schematic cross-sectional view of the transparent state of the first liquid crystal panel in the liquid crystal display device of Embodiment 1. FIG. 2B is a schematic cross-sectional view of the scattering state of the first liquid crystal panel in the liquid crystal display device of Embodiment 1. FIG. 2A and FIG. 2B each are a schematic cross-sectional view taken along line X1-X2 in FIG. 1. As shown in FIG. 2A and FIG. 2B, the first liquid crystal panel 11 includes a polymer dispersed liquid crystal 300 containing a polymer network 310 and liquid crystal components 320 and is switchable between the transparent state and the scattering state. Including the polymer dispersed liquid crystal 300, the first liquid crystal panel 11 can display images without a polarizing plate, reducing or preventing a decrease in transmittance in the transparent state.

As shown in FIG. 1, the first light source 31X irradiates a back surface side main surface 11P of the first liquid crystal panel 11 with light from an oblique direction. This mode can reduce or prevent attenuation of light in the central portion of the liquid crystal panel as compared with a case where light from the first light source 31X travels inside the first liquid crystal panel 11 or the polymer dispersed liquid crystal 300, further reducing or preventing a decrease in luminance (in particular, front luminance) of the panel central portion in the scattering state. As a result, the display screen can be increased in size. Herein, the back surface side main surface of the first liquid crystal panel refers to the surface of the first liquid crystal panel closer to the light sources. The panel central portion refers to the central portion of the display screen of the first liquid crystal panel. The phrase "within the panel plane" refers to within the display screen of the first liquid crystal panel.

For example, the liquid crystal display device of JP 2016-85452 A, employing a system of guiding light from the FSC-driven light source disposed along a side of the liquid crystal panel to the inside of the light modulation layer (specifically, polymer dispersed liquid crystal), could guide light for substantially only about 10 cm if it included a 12.3-inch liquid crystal panel and light was incident from a long side of the panel.

The liquid crystal display device would be able to switch between the transparent display and the color display in a 19-inch liquid crystal panel (30 cm in length×40 cm in width) by guiding light from the FSC-driven light source to the inside of the panel. With this size of the panel, however, the luminance in the central portion of the liquid crystal panel may be significantly low as a result of loss of light due to a factor such as diffraction or scattering by the TFTs or the polymer dispersed liquid crystal (PDLC) inside the panel. Specifically, the liquid crystal display device can merely guide light for substantially about 20 cm when the light is incident on a short side of the liquid crystal panel. The system of irradiating the back surface side main surface 11P of the first liquid crystal panel 11 with light from an oblique direction is also referred to as an oblique light incidence system, and a system of guiding light to the inside of the light guide plate or the panel is referred to as a light guide system. Hereinafter, the liquid crystal display device 1 of the present embodiment is described in more detail.

As shown in FIG. 2A and FIG. 2B, the first liquid crystal panel 11 includes a first substrate 100 as one of the pair of substrates, the polymer dispersed liquid crystal 300, and a second substrate 200 as the other of the pair of substrates. The first substrate 100 includes a first support substrate 110 and pixel electrodes 120. The second substrate 200 includes a second support substrate 210 and a common electrode 220.

Preferably, the first liquid crystal panel 11 includes thin film transistors (TFTs). Light emitted from the first light source 31X is attenuated in some cases due to a factor such as diffraction or scattering by the TFTs inside the liquid crystal panel. The liquid crystal display device 1 of the present embodiment can reduce such attenuation of light by the TFTs even when the first liquid crystal panel 11 includes the TFTs since the first light source 31X irradiates the back surface side main surface 11P of the first liquid crystal panel 11 with light from an oblique direction. Thus, the liquid crystal display device 1 can effectively reduce or prevent a decrease in luminance of the panel central portion in the scattering state. The following describes a mode in which the first liquid crystal panel (specifically, first substrate 100) includes TFTs, but the liquid crystal display device is not limited to this mode.

The first substrate 100 includes TFTs which are switching elements used to switch between ON and OFF of pixels in the first liquid crystal panel 11. In the present embodiment, the structure of the first substrate 100 for a TN mode is described.

The first substrate 100 includes, sequentially from its back surface side toward its viewing surface side, the first support substrate 110, parallel gate lines, a gate insulator, parallel source lines extending in a direction in which they intersect the gate lines, an interlayer insulating film, and the pixel electrodes 120. The gate lines and the source lines are formed in a grid pattern that defines the pixels. TFTs as switching elements are disposed at the respective intersections of the gate lines and the source lines. The regions each surrounded by adjacent two gate lines and adjacent two source lines are provided with the respective pixel electrodes 120.

Each TFT is a three-terminal switch that is connected to the corresponding gate line and the corresponding source line, and includes a gate electrode that protrudes from (is part of) the corresponding gate line, a source electrode that protrudes from (is part of) the corresponding source line, a drain electrode connected to the corresponding pixel electrode, and a thin film semiconductor layer. The source electrode and the drain electrode are disposed in the same source line layer as the source lines. The gate electrode is disposed in the same gate line layer as the gate lines.

The thin film semiconductor layer of each TFT is composed of, for example, a high-resistance semiconductor layer formed from a material such as amorphous silicon or polysilicon, and a low-resistance semiconductor layer formed from a material such as n+ amorphous silicon obtained by doping amorphous silicon with an impurity such as phosphorus. The thin film semiconductor layer may be an oxide semiconductor layer such as a zinc oxide semiconductor layer. Examples of the oxide semiconductor layer include an In—Ga—Zn—O (indium gallium zinc oxide) layer which is an oxide semiconductor layer containing indium (In), gallium (Ga), zinc (Zn), and oxygen (O) as the main components. With such In—Ga—Zn—O-TFTs, the effect of increasing the resolution and the effect of reducing the power consumption can be achieved, and a higher writing speed than that in conventional display devices can be achieved. The same effects can be achieved also when an oxide semiconductor layer is used which contains at least one of indium, gallium, zinc, copper (Cu), silicon (Si), tin (Sn), aluminum (Al), calcium (Ca), germanium (Ge), or lead (Pb).

The first support substrate 110 and the second support substrate 210 are preferably transparent substrates. Examples thereof include glass substrates and plastic substrates.

The gate insulator is, for example, an inorganic insulating film. The inorganic insulating film may be, for example, an inorganic film (relative dielectric constant (relative permittivity) $\varepsilon=5$ to 7) such as a silicon nitride (SiNx) film or a silicon oxide ($SiO_2$) film, or a stack of such films.

The gate line layer and the source line layer each are, for example, a single or multi-layer of a metal such as copper, titanium, aluminum, molybdenum, or tungsten, or an alloy of any of these metals. The gate lines, the source lines, and the conductive lines and electrodes of the TFTs are formed by forming a single or multiple layers of a metal such as copper, titanium, aluminum, molybdenum, or tungsten, or an alloy of any of these metals by a technique such as sputtering, and patterning the layer(s) by a technique such as photolithography. For efficient production, the conductive lines and electrodes to be in the same layer are formed from the same material.

The interlayer insulating film is, for example, an inorganic insulating film. The inorganic insulating film may be, for example, an inorganic film (dielectric constant $\varepsilon=5$ to 7) such as a silicon nitride (SiNx) film or a silicon oxide ($SiO_2$) film, or a stack of such films.

The pixel electrodes 120 each are a planar (solid) electrode disposed in a corresponding region surrounded by adjacent two gate lines and adjacent two source lines. Each pixel electrode 120 is electrically connected to the corresponding source line via the thin film semiconductor layer of the corresponding TFT. The pixel electrode 120 is set at an electrical potential corresponding to the data signal supplied via the corresponding TFT.

The common electrode 220 is formed on almost the entire surface of the second support substrate 210 across the boundaries of the pixels. A common signal of a constant value is supplied to the common electrode 220, so that the common electrode 220 is at a constant electrical potential.

The pixel electrodes 120 and the common electrode 220 are formed from, for example, indium tin oxide (ITO) or indium zinc oxide (IZO).

The polymer dispersed liquid crystal 300 contains the polymer network 310 and the liquid crystal components 320 and is held between the first substrate 100 and the second substrate 200. In the polymer dispersed liquid crystal 300, fibrous matrices of a cured product of a photopolymerizable liquid crystal compound are aggregated to form the three-dimensionally continuous polymer network 310, and the liquid crystal components 320 are phase-separated and dispersed within the polymer network 310.

The polymer dispersed liquid crystal 300 contains the polymer network 310 formed from the cured product of the photopolymerizable liquid crystal compound, and the liquid crystal components 320. The polymer dispersed liquid crystal 300 is in the transparent state with no voltage applied and is in the scattering state with voltage applied. This mode enables a display device that uses no polarizing plate. More specifically, the polymer dispersed liquid crystal 300 is in the transparent state with no voltage applied, and shifts into the scattering state with voltage applied as the alignment of the liquid crystal components 320 is changed.

The state "with no voltage applied" means when the voltage applied to the polymer dispersed liquid crystal 300 is lower than the threshold voltage (including no voltage application). The state "with voltage applied" means when the voltage applied to the polymer dispersed liquid crystal 300 is equal to or higher than the threshold voltage. The state with no voltage applied is also referred as a no voltage application state, while the state with voltage applied is also referred to as a voltage application state.

Hereinafter, the alignment of the liquid crystal components 320 in the transparent state and that in the scattering state are described with reference to FIG. 2A and FIG. 2B. FIG. 2A and FIG. 2B show the central portion of the first liquid crystal panel 11.

As shown in FIG. 2A, with no voltage applied, preferably, the alignment azimuths of the polymer network 310 and the liquid crystal components 320 are substantially the same as each other. FIG. 2A shows a case where both the polymer network 310 and the liquid crystal components 320 are homogeneously aligned relative to the main surfaces of the first substrate 100 and the second substrate 200. With no voltage applied, in all the directions including the thickness direction of the polymer dispersed liquid crystal 300, there is almost no difference in extraordinary refractive index ne between the liquid crystal components 320 and the polymer network 310 and almost no difference in ordinary refractive index no between the liquid crystal components 320 and the polymer network 310. Thus, light emitted from the light source passes through the polymer dispersed liquid crystal 300, so that the liquid crystal panel is in the transparent state. Such a state where there is almost no difference in extraordinary refractive index ne between the liquid crystal components 320 and the polymer network 310 and almost no difference in ordinary refractive index no between the liquid crystal components 320 and the polymer network 310 in all the directions including the thickness direction of the polymer dispersed liquid crystal 300 is also considered as a state where the refractive index of the liquid crystal components 320 and that of the polymer network 310 match.

The transparent state is a state of being transparent to light. For example, the polymer dispersed liquid crystal 300 in the transparent state may have a transmittance of 80% or higher or 90% or higher. The upper limit of the transmittance of the polymer dispersed liquid crystal 300 in the transparent state is, for example, 100%. In the present embodiment, the polymer dispersed liquid crystal 300 in the transparent state is transparent to visible light. Herein, the transmittance of the polymer dispersed liquid crystal in the transparent state refers to a parallel light transmittance of the polymer dispersed liquid crystal in the transparent state. The transmittance of the polymer dispersed liquid crystal in the transparent state can be measured in the following manner, for example. The luminance is measured with the spectroradiometer (SR-UL1) available from Topcon Technohouse Corporation at a light acceptance angle of 2° when a first liquid crystal panel including a polymer dispersed liquid crystal and with no voltage applied is placed on a common backlight including a halogen lamp as a light source (i.e., light source for liquid crystal display devices) and when nothing is placed on the backlight. The measurement wavelength is about 550 nm, which is the wavelength at which the luminous reflectance Y value representing the visual sensitivity of the human eye is highest. The luminance measured when the first liquid crystal panel with no voltage applied is placed on the backlight is divided by the luminance measured when nothing is placed on the backlight, so that the transmittance of the polymer dispersed liquid crystal in the transparent state can be determined.

As shown in FIG. 2B, with voltage applied, the molecules of the polymer network 310 are aligned horizontally to the main surfaces of the first substrate 100 and the second substrate 200, while the liquid crystal components 320 are aligned in the direction vertical to the surfaces of the first substrate 100 and the second substrate 200. With voltage applied, electric fields generated in the polymer dispersed liquid crystal 300 change the alignment azimuth of the liquid crystal components 320, while having no influence on the polymer network 310. Thus, in all the directions including the thickness direction of the polymer dispersed liquid crystal 300, the difference in extraordinary refractive index ne between the liquid crystal components 320 and the polymer network 310 and the difference in ordinary refractive index no between the liquid crystal components 320 and the polymer network 310 are large. Unpolarized light emitted from the first light source 31X and incident on the polymer dispersed liquid crystal 300 from an oblique direction is scattered without dependence on polarization differently from the case where the unpolarized light is vertically incident on the polymer dispersed liquid crystal 300, so that the polymer dispersed liquid crystal 300 is in the highly scattering state. Such a state where the difference in extraordinary refractive index ne between the liquid crystal components 320 and the polymer network 310 and the difference in ordinary refractive index no between the liquid crystal components 320 and the polymer network 310 are large in all the directions including the thickness direction of the polymer dispersed liquid crystal 300 is also considered as a state where the refractive index of the liquid crystal components 320 and that of the polymer network 310 mismatch.

The scattering state is a state of scattering light. The polymer dispersed liquid crystal 300 in the scattering state may have a transmittance of 50% or lower, for example. The lower limit of the transmittance of the polymer dispersed liquid crystal 300 in the scattering state is, for example, 0% to 1%. Herein, the transmittance of the polymer dispersed liquid crystal in the scattering state refers to a parallel light transmittance of the polymer dispersed liquid crystal in the scattering state. The transmittance of the polymer dispersed liquid crystal in the scattering state can be measured in the following manner, for example. The luminance is measured with the spectroradiometer (SR-UL1) available from Topcon Technohouse Corporation at a light acceptance angle of 2° when a first liquid crystal panel including a polymer dispersed liquid crystal and with voltage applied is placed on a common backlight including a halogen lamp as a light source (i.e., light source for liquid crystal display devices) and when nothing is placed on the backlight. The measurement wavelength is about 550 nm, which is the wavelength at which the luminous reflectance Y value representing the visual sensitivity of the human eye is highest. The luminance measured when the first liquid crystal panel with voltage applied is placed on the backlight is divided by the luminance measured when nothing is placed on the backlight, so that the transmittance of the polymer dispersed liquid crystal in the scattering state can be measured.

The haze showing the light scattering ratio of the polymer dispersed liquid crystal 300 in the scattering state varies based on the voltage applied, and may be, for example, 80% or higher or 90% or higher. The upper limit of the haze showing the light scattering ratio of the polymer dispersed liquid crystal 300 in the scattering state is, for example, 90% to 100%. In the present embodiment, the polymer dispersed liquid crystal 300 in the scattering state scatters visible light. The polymer dispersed liquid crystal 300 in the scattering state is therefore in the same condition as frosted glass. Herein, the haze is measured by a method in conformity with JIS K 7136. The haze is measured with, for example, the haze meter "Haze Meter NDH2000" available from Nippon Denshoku Industries Co., Ltd. using a halogen lamp as a light source.

A liquid crystal panel that provides the transparent state with no voltage applied and provides the scattering state with voltage applied is also referred to as a reverse mode liquid crystal panel. When unpolarized light is vertically incident on a common reverse mode liquid crystal panel, the transmittance in the scattering state is as high as about 50% since only one of s-polarized light and p-polarized light is scattered, which means that scattering of light is insufficient. This is presumably because when light from a light source is vertically incident on a main surface of a reverse mode liquid crystal panel, the mismatch of the refractive index of the liquid crystal components and the refractive index of the polymer network is associated only with one of s-polarized light and p-polarized light. In contrast, in the present embodiment, presumably, light is incident on the back surface side main surface 11P of the first liquid crystal panel 11 from an oblique direction, so that the mismatch of the refractive index of the liquid crystal components and the refractive index of the polymer network is associated with both s-polarized light and p-polarized light, causing a higher degree of scattering. The present embodiment enables a higher degree of scattering than a reverse mode liquid crystal panel with a polymer dispersed liquid crystal containing a chiral agent, for example.

The liquid crystal display device 1 varies the difference in extraordinary refractive index ne between the liquid crystal components 320 and the polymer network 310 in the polymer dispersed liquid crystal 300 and the difference in ordinary refractive index no between the liquid crystal components 320 and the polymer network 310 to adjust the amount of light passing through the first liquid crystal panel 11. The liquid crystal display device 1 therefore requires no polarizing plate which is required in a common liquid crystal display device.

The photopolymerizable liquid crystal compound for formation of the polymer network 310, for example, exhibits a liquid crystal phase at room temperature to form a miscible blend with the liquid crystal components 320, and is phase-separated from the liquid crystal components 320 after it is cured by ultraviolet irradiation to form a polymer.

Examples of the photopolymerizable liquid crystal compound include monomers having a substituent such as a biphenyl group, a terphenyl group, a naphthalene group, a phenylbenzoate group, an azobenzene group, or a derivative of any of these groups (hereinafter, they are also referred to as mesogen groups); a photoreactive group such as a cinnamoyl group, a chalcone group, a cinnamylidene group, a β-(2-phenyl)acryloyl group, a cinnamic acid group, or a derivative of any of these groups; and a polymerizable group such as an acrylate, methacrylate, maleimide, N-phenylmaleimide, or siloxane group. The polymerizable group is preferably an acrylate group. The number of polymerizable groups per molecule of the photopolymerizable liquid crystal compound is not limited, but is preferably 1 or 2.

The liquid crystal components 320 may not have a polymerizable group such as an acrylate, methacrylate, maleimide, N-phenyl maleimide, or siloxane group.

In the present embodiment, the anisotropy of dielectric constant (Δε) of the liquid crystal components 320 defined by the following formula (L) may be positive or negative, but is preferably positive when the later-described alignment films 410 and 420 are horizontal alignment films. This mode can effectively simultaneously achieve a high degree of scattering and low-voltage driving. Liquid crystal components (liquid crystal molecules) having a positive anisotropy of dielectric constant are aligned in the direction parallel to the electric field direction. Liquid crystal components (liquid crystal molecules) having a negative anisotropy of dielectric constant are aligned in the direction vertical to the electric field direction. The liquid crystal components (liquid crystal molecules) having a positive anisotropy of dielectric constant are also referred to as positive liquid crystals. Liquid crystal components (liquid crystal molecules) having a negative anisotropy of dielectric constant are also referred to as negative liquid crystals. The long axis direction of each liquid crystal component (liquid crystal molecule) corresponds to the slow axis direction. The long axis direction of each liquid crystal component (liquid crystal molecule) with no voltage applied is also referred to as the initial alignment direction of the liquid crystal component (liquid crystal molecule).

Δε=(dielectric constant in long axis direction of liquid crystal component (liquid crystal molecule))−(dielectric constant in short axis direction of liquid crystal component (liquid crystal molecule)) (L)

The liquid crystal components 320 can be, for example, a tolan-type liquid crystal material (liquid crystal material having a —C≡C— bond (carbon-carbon triple bond) as a linking group).

The liquid crystal components 320 have an anisotropy of refractive index Δn of 0.18 or higher and 0.24 or lower. Preferably, the liquid crystal components 320 have an anisotropy of dielectric constant Δε of 15 or higher and 25 or lower, and the liquid crystal components 320 have a rotational viscosity γ1 of 100 mPa·s or higher and 300 mPa·s or lower. This mode can simultaneously achieve a high degree of scattering and low-voltage driving, while achieving a response speed equal to that of a common liquid crystal display device containing no polymer network. This effect can be achieved when the anisotropy of refractive index Δn, the anisotropy of dielectric constant Δε, and the rotational viscosity γ1 of the liquid crystal components 320 all fall within the respective ranges above.

Specific examples of the tolan-type liquid crystal material include liquid crystal materials having a structure represented by the following formula (L1).

(L1)

In the formula, $Q_1$ and $Q_2$ each independently represent an aromatic ring group, X represents a fluorine group or a cyano group, and $n_1$ and $n_2$ each independently represent 0 or 1.

The symbols $n_1$ and $n_2$ in the formula (L1) are not 0 at the same time. In other words, the sum of $n_1$ and $n_2$ is 1 or 2.

The aromatic ring groups in the formula (L1) may have a substituent.

In the formula (L1), preferably, $Q_1$ and $Q_2$ each independently have any one of the structures represented by the following formulas (L2-1) to (L2-7).

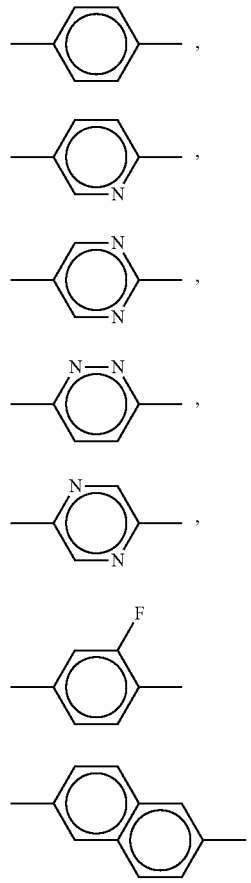

(L2-1)

(L2-2)

(L2-3)

(L2-4)

(L2-5)

(L2-6)

(L2-7)

Specific examples of the structure represented by the formula (L1) in the liquid crystal material include the following structures.

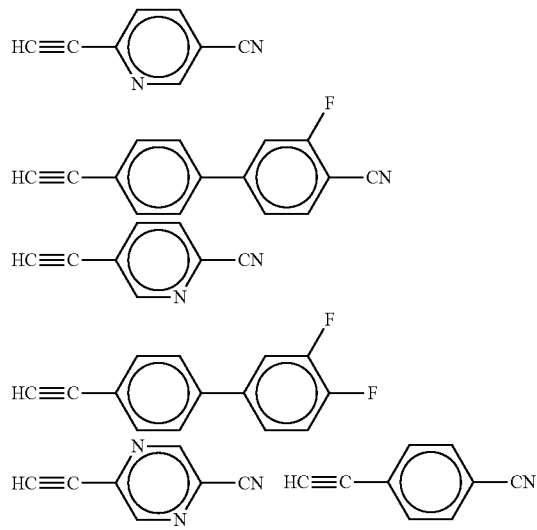

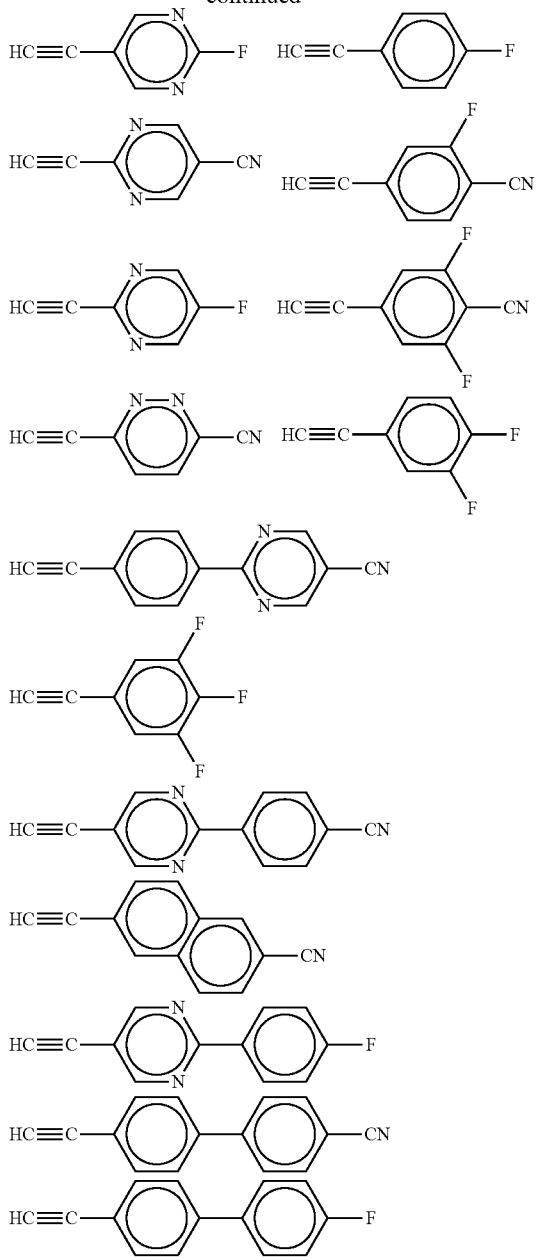

Preferably, the weight ratio of the liquid crystal components 320 to the polymer network 310, i.e., liquid crystal component:polymer network, is 90:10 to 97:3. In other words, preferably, the weight of the liquid crystal components 320 relative to the polymer network 310 is 90 or more and 97 or less, and when the weight of the liquid crystal components 320 is 90 or more, the weight of the polymer network 310 is 10 or less, while when the weight of the liquid crystal components 320 is 97 or less, the weight of the polymer network 310 is 3 or more. This mode can effectively simultaneously achieve a high degree of scattering and low-voltage driving. When the weight of the polymer network 310 relative to the liquid crystal components 320 is more than 10, a high degree of scattering can be achieved, but the driving voltage is high. When the weight of the polymer network 310 relative to the liquid crystal components 320 is less than 3, the driving voltage can be reduced but a high degree of scattering may not be achieved.

Preferably, the first liquid crystal panel 11 includes an alignment film between the polymer dispersed liquid crystal 300 and at least one of the pair of substrates (first substrate 100 and second substrate 200) holding the polymer dispersed liquid crystal 300 in between. This mode can cause the alignment film to mainly control the alignment of the liquid crystal components 320 in the polymer dispersed liquid crystal 300 when the voltage applied to the polymer dispersed liquid crystal 300 is lower than the threshold voltage (including no voltage application).

The following describes a mode in which a first alignment film 410 is disposed between the first substrate 100 and the polymer dispersed liquid crystal 300 and a second alignment film 420 is disposed between the second substrate 200 and the polymer dispersed liquid crystal 300, but the first liquid crystal panel 11 is not limited thereto. For example, an alignment film may be disposed only between the first substrate 100 and the polymer dispersed liquid crystal 300 or between the second substrate 200 and the polymer dispersed liquid crystal 300, meaning that an alignment film may not be disposed between the first substrate 100 and the polymer dispersed liquid crystal 300 and between the second substrate 200 and the polymer dispersed liquid crystal 300. For example, when the first liquid crystal panel 11 includes only one of the first alignment film 410 and the second alignment film 420 and the alignment film is a horizontal alignment film while the other substrate side is slippery (having zero anchoring), the liquid crystal components 320 are in twisted horizontal alignment. This ultimately results in the same alignment state as in the case where horizontal alignment films are disposed on the respective sides.

The first alignment film 410 and the second alignment film 420 are layers having been subjected to alignment treatment for controlling the alignment of the liquid crystal components 320 and the molecules of the photopolymerizable liquid crystal compound, and may each be an alignment film commonly used in the field of liquid crystal display devices, such as a polyimide film. The first alignment film 410 and the second alignment film 420 may each be a rubbing alignment film having been subjected to rubbing treatment or a photoalignment film having been subjected to photoalignment treatment. Hereinafter, the liquid crystal components 320 and the photopolymerizable liquid crystal compound may also be simply referred to as liquid crystal molecules.

A rubbing alignment film is obtainable by, for example, forming a film of an alignment film material containing a rubbing alignment film polymer on a substrate, and rubbing the surface of the film containing a rubbing alignment film polymer with a roller wrapped with a piece of cloth made of a material such as rayon or cotton at a constant rotational speed and with a constant distance between the roller and the substrate (rubbing method).

The rubbing alignment film polymer may be, for example, polyimide. One or two or more rubbing alignment film polymers may be used for the rubbing alignment film.

The photoalignment film is obtainable by, for example, forming a film of an alignment film material containing a photoalignable polymer with a photoreactive functional group on a substrate, and irradiating the film containing the photoalignable polymer with polarized ultraviolet light to make the surface of the film anisotropic (photoalignment method).

The photoalignable polymer may be, for example, a photoalignable polymer containing at least one photoreactive functional group selected from a cyclobutane group, an azobenzene group, a chalcone group, a cinnamate group, a coumarin group, a stilbene group, a phenolic ester group, and a phenylbenzoate group. One or two or more photoalignable polymers may be used for the photoalignment film. The photoalignable polymer may contain a photoreactive functional group in its main chain or its side chain, or both in its main chain and its side chain.

The photoalignable polymer may undergo any type of photoreaction. Preferred examples of the photoalignable polymer include those that can undergo photodecomposition, photorearrangement (preferably, photo-Fries rearrangement), photoisomerization, photodimerization, or photo-crosslinking. These polymers may be used alone or in combination of two or more. In particular, in terms of alignment stability, polymers that can undergo photodecomposition at a wavelength of about 254 nm (main sensing wavelength) and polymers that can undergo photorearrangement at a wavelength of about 254 nm (main sensing wavelength) are preferred. Also, polymers that can undergo photoisomerization and polymers that can undergo photodimerization which have a photoreactive functional group in their side chain are preferred.

The photoalignable polymer may have any main chain structure. Preferred examples thereof include a polyamic acid structure, a polyimide structure, a poly(meth)acrylic acid structure, a polysiloxane structure, a polyethylene structure, a polystyrene structure, and a polyvinyl structure.

The first alignment film 410 and the second alignment film 420 each are a horizontal alignment film that aligns the liquid crystal components 320 in the direction parallel to its surface or a vertical alignment film that aligns the liquid crystal components 320 in the direction vertical to its surface. Preferably, the first alignment film 410 and the second alignment film 420 are horizontal alignment films. This mode can effectively simultaneously achieve a high degree of scattering and low-voltage driving. More preferably, the first alignment film 410 and the second alignment film 420 are horizontal alignment films, and the liquid crystal components 320 have a positive anisotropy of dielectric constant. This mode can more effectively simultaneously achieve a high degree of scattering and low-voltage driving.

When the first alignment film 410 and the second alignment film 420 are horizontal alignment films and the voltage applied to the polymer dispersed liquid crystal 300 is lower than the threshold voltage (including no voltage application), the first alignment film 410 and the second alignment film 420 mainly control the liquid crystal components 320 such that the long axes of the liquid crystal components 320 are parallel to the first alignment film 410 and the second alignment film 420.

In other words, the liquid crystal components 320 are aligned horizontally (homogeneously) to the first substrate 100 with no voltage applied. When voltage is applied between the pixel electrodes 120 and the common electrode 220, electric fields are generated in the polymer dispersed liquid crystal 300 and change the alignment of the liquid crystal components 320, so that the amount of light passing through the polymer dispersed liquid crystal 300 can be controlled. The liquid crystal components 320 are horizontally aligned by the control force of the first alignment film 410 and the second alignment film 420 with no voltage applied between the pixel electrodes 120 and the common electrode 220. The liquid crystal components 320 are rotated by the vertical electric fields generated in the polymer dispersed liquid crystal 300 with voltage applied between the pixel electrodes 120 and the common electrode 220.

The phrase "the long axes of the liquid crystal components 320 are parallel to the first alignment film 410 and the second alignment film 420" means that the tilt angle (including the pre-tilt angle) of the liquid crystal components 320 is 0° to 5°, preferably 0° to 3°, more preferably 0° to 1°, relative to the first alignment film 410 and the second alignment film 420. The tilt angle of the liquid crystal components 320 means the angle at which the long axis (optical axis) of each liquid crystal component 320 inclines from the surface of the first alignment film 410 or the second alignment film 420.

When the first alignment film 410 and the second alignment film 420 are vertical alignment films and the voltage applied to the polymer dispersed liquid crystal 300 is lower than the threshold voltage (including no voltage application), the first alignment film 410 and the second alignment film 420 mainly control the liquid crystal molecules such that the long axes of the liquid crystal molecules are perpendicular to the first alignment film 410 and the second alignment film 420.

In other words, the liquid crystal components 320 are aligned in the direction vertical to the first substrate 100 with no voltage applied. When voltage is applied between the pixel electrodes 120 and the common electrode 220, electric fields are generated in the polymer dispersed liquid crystal 300 and change the alignment of the liquid crystal components 320, so that the amount of light passing through the polymer dispersed liquid crystal 300 is controlled. The liquid crystal components 320 are vertically aligned by the control force of the first alignment film 410 and the second alignment film 420 with no voltage applied between the pixel electrodes 120 and the common electrode 220. The liquid crystal components 320 are rotated by the vertical electric fields generated in the polymer dispersed liquid crystal 300 with voltage applied between the pixel electrodes 120 and the common electrode 220.

The phrase "the long axes of the liquid crystal components 320 are vertical to the first alignment film 410 and the second alignment film 420" means that the tilt angle (including the pre-tilt angle) of the liquid crystal components 320 is 86° to 90°, preferably 87° to 89°, more preferably 87.5° to 89°, relative to the first alignment film 410 and the second alignment film 420.

Next, the method of producing the first liquid crystal panel 11 of the present embodiment is described. The method of producing the first liquid crystal panel 11 includes forming the first alignment film 410 and the second alignment film 420, each having been subjected to alignment treatment, on one of the surfaces of the first substrate 100 and one of the surfaces of the second substrate 200, respectively; injecting a composition containing the photopolymerizable liquid crystal compound and a polymerization initiator between the first substrate 100 and the second substrate 200 that have been disposed with the first alignment film 410 and the second alignment film 420 facing each other; and forming the polymer network 310 while curing the photopolymerizable liquid crystal compound by irradiating the composition with light.

The first substrate 100 and the second substrate 200 can each be produced by a method commonly used in the field of the liquid crystal display devices.

In the forming of the alignment films, an alignment film material is applied to each of the first substrate 100 and the second substrate 200 to form the first alignment film 410 and the second alignment film 420. Examples of the application method include the inkjet method and the roll coater method. The first alignment film 410 and the second alignment film 420 are then subjected to alignment treatment. Examples of the alignment treatment include the rubbing treatment which rubs the alignment film surface with a roller, for example, and the photoalignment treatment which irradiates the alignment film surface with light. The photoalignment treatment enables alignment treatment without contact with the alignment film surface, and is thus advantageous over the rubbing method in that it can reduce or prevent stain or generation of dust, for example, during the alignment treatment. An alignment film having been subjected to the photoalignment treatment as the alignment treatment is also called a photoalignment film.

The first alignment film 410 and the second alignment film 420 may be subjected to the rubbing treatment such that they can provide antiparallel alignment or parallel alignment.

The injecting includes injecting a composition containing the photopolymerizable liquid crystal compound and a polymerization initiator between the first substrate 100 and the second substrate 200 that have been disposed with the first alignment film 410 and the second alignment film 420 facing each other. In the injecting, the liquid crystal molecules near the first alignment film 410 are aligned in the alignment direction provided by the first alignment film 410, the liquid crystal molecules near the second alignment film 420 are aligned in the alignment treatment direction provided by the second alignment film 420, and the liquid crystal molecules around the middle position between the first alignment film 410 and the second alignment film 420 are aligned such that the alignment azimuth thereof is continuously varied between the first alignment film 410 and the second alignment film 420.

The polymerization initiator may be any conventionally known one, such as Omnirad 184® (available from IGM Resins. B.V.) represented by the following Chemical formula (IN1) and OXE03 (available from BASF SE) represented by the following chemical formula (IN2).

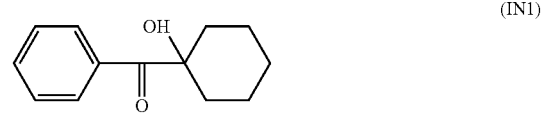

(IN1)

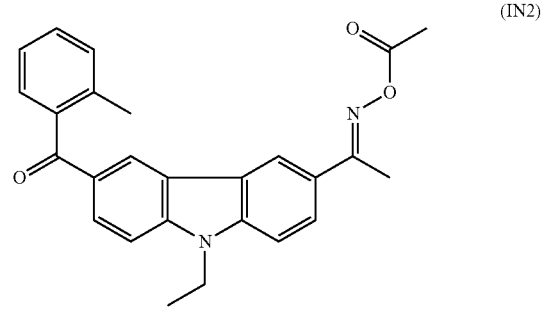

(IN2)

Preferably, the weight ratio of the liquid crystal components 320 to the photopolymerizable liquid crystal compound in the composition is 90:10 to 97:3. In other words, preferably, the weight of the liquid crystal components 320 relative to the photopolymerizable liquid crystal compound is 90 or more and 97 or less, and when the weight of the liquid crystal components 320 is 90 or more, the weight of the photopolymerizable liquid crystal compound is 10 or less, while when the weight of the liquid crystal components 320 is 97 or less, the weight of the photopolymerizable liquid crystal compound is 3 or more. This mode can effectively simultaneously achieve a high degree of scattering and low-voltage driving. When the weight of the photopolymerizable liquid crystal compound relative to the liquid crystal components 320 is more than 10, a high degree of scattering can be achieved, but the driving voltage is high. When the weight of the photopolymerizable liquid crystal compound relative to the liquid crystal components 320 is less than 3, the driving voltage can be reduced but a high degree of scattering may not be achieved.

The irradiating with light includes irradiating the composition with light to form the polymer network 310 while curing the photopolymerizable liquid crystal compound. Here, when the liquid crystal molecules are aligned in the injecting, the photopolymerizable liquid crystal compound exhibits a liquid crystalline phase. The photopolymerizable liquid crystal compound is cured through a photopolymerization reaction when the composition is irradiated with light in the irradiating with light, so that the alignment of the photopolymerizable liquid crystal compound is fixed. The photopolymerizable liquid crystal compound thus forms the polymer network 310, which is incapable of responding to the electric fields. The molecules of the polymer network 310 formed from the cured product of the photopolymerizable liquid crystal compound are therefore not aligned in the electric field direction upon voltage application. In contrast, the liquid crystal components 320 whose alignment is not fixed are aligned in the electric field direction upon voltage application.

Thus, with no voltage applied, the alignment direction of the polymer network 310 and the alignment direction of the liquid crystal components 320 are both parallel to the first substrate 100 and the second substrate 200. In this state, matching the refractive indices of them causes the first liquid crystal panel 11 to be in the transparent state. Also, with voltage applied to the polymer dispersed liquid crystal 300 by connecting a power supply to the pixel electrodes 120 and the common electrode 220, the liquid crystal components 320 are aligned in the electric field direction. The refractive index of the liquid crystal components 320 and the refractive index of the polymer network 310 thus mismatch in the interface therebetween to produce the light scattering state, causing the first liquid crystal panel 11 to shift into an opaque state (scattering state).

The light used in the irradiating with light may be any light such as ultraviolet light. Examples of the ultraviolet light include light having a peak wavelength in a wavelength range of 340 nm or longer and 390 nm or shorter, for example.

In the irradiating with light, preferably, the composition is irradiated with light having an irradiation intensity of 5 mW/cm$^2$ or higher and 50 mW/cm$^2$ or lower. With an irradiation intensity of 5 mW/cm$^2$ or higher, a more sufficient degree of scattering can be achieved. With an irradiation intensity of 50 mW/cm$^2$ or lower, an increase in temperature during irradiation can be reduced or prevented, and the yield decline and property variation can be reduced or prevented.

Preferably, in the irradiating with light, the composition is irradiated with light with an irradiation dose of 0.5 J/cm$^2$ or more and 5 J/cm$^2$ or less. With an irradiation dose of 0.5 J/cm$^2$ or more, the polymerization reaction of the photopolymerizable liquid crystal compound sufficiently proceeds to reduce unreacted molecules of the photopolymerizable liquid crystal compound, forming the polymer network 310. As a result, the hysteresis properties and the anti-image-sticking properties can be improved. With an irradiation dose of 5 J/cm$^2$ or less, the production takt time can be improved.

The method of displaying an image on the first liquid crystal panel is described. Preferably, the first liquid crystal panel 11 displays an image based on a field-sequential color (FSC) system, and the first light source 31X includes light-emitting elements (red light emitting diodes (LEDs) 31R, green LEDs 31G, and blue LEDs 31B) configured to emit light rays of colors different from one another as shown in FIG. 1. Typically, in a liquid crystal display device providing color display, each pixel is divided into three sub-pixels, namely a red pixel provided with a color filter transmitting red light, a green pixel provided with a color filter transmitting green light, and a blue pixel provided with a color filter transmitting blue light. The color filters in these three sub-pixels enable color display. The color filters absorb about ⅔ of the backlight illumination applied to the liquid crystal panel. This causes a liquid crystal display device employing the color filter system to have a low light use efficiency. In contrast, the liquid crystal display device 1 displaying images by the FSC system and using the first light source 31X including light-emitting elements configured to emit light rays of colors different from one another can provide color display without any color filters. The liquid crystal display device 1 therefore can achieve a higher light use efficiency than a liquid crystal display device employing the color filter system and achieve a higher luminance and low power consumption. Also, since color filters are not used, the liquid crystal display device 1 can be reduced in thickness.

In the first liquid crystal panel 11 employing the FSC system to display an image, a single frame period, which is a display period of a single screen image, is divided into multiple fields. A field is also called a sub-frame. Throughout the following description, the term "field" is used. For example, a single frame period is divided into a field that displays a red screen image based on the red color component in an input image signal (red field), a field that displays a green screen image based on the green color component in the input image signal (green field), and a field that displays a blue screen image based on the blue color component in the input image signal (blue field). The primary colors are displayed one by one as described above to display a color image on the liquid crystal panel.

As described above, the first liquid crystal panel 11 employing the FSC system to display an image provides color display by dividing a single frame period into multiple fields such that different colors are displayed in different fields. This enables elimination of color filters. The liquid crystal display device 1 employing the FSC system therefore has a light use efficiency that is about triple the light use efficiency of the liquid crystal display device employing the color filter system. Thus, the liquid crystal display device employing the FSC system is suitable for an increase in luminance and reduction in power consumption.

Figure 3:
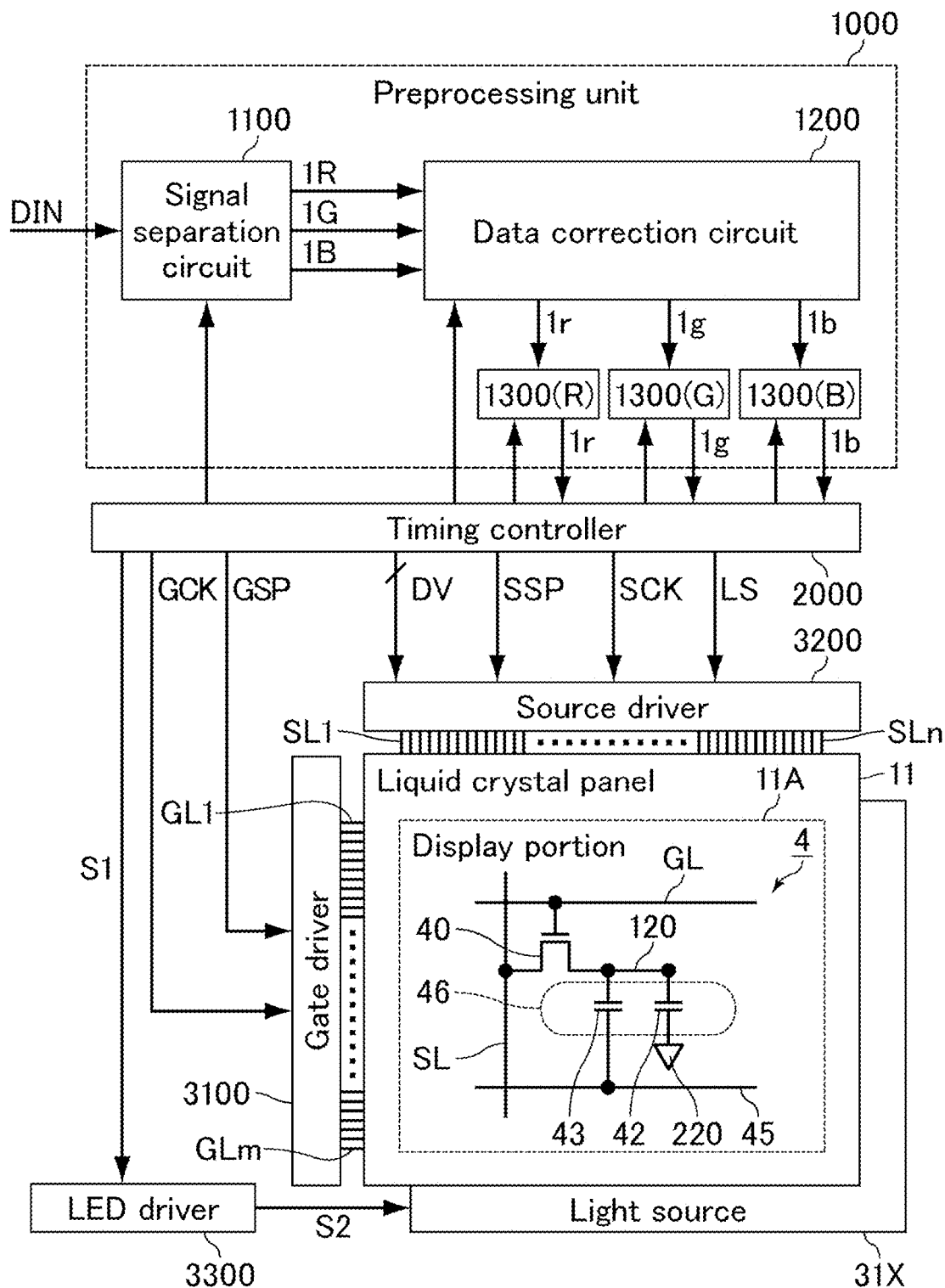
FIG. 3 is a block diagram of the overall structure of the liquid crystal display device of Embodiment 1.

FIG. 3 is a block diagram of the overall structure of the liquid crystal display device of Embodiment 1. The liquid crystal display device 1 of the present embodiment includes a preprocessing unit 1000, a timing controller 2000, a gate driver 3100, a source driver 3200, a LED driver 3300, the first liquid crystal panel 11, and the first light source 31X. One or both of the gate driver 3100 and the source driver 3200 may be disposed in the first liquid crystal panel 11. Also, FIG. 3 does not include the second liquid crystal panel 12. The second liquid crystal panel 12 has the same structure as the first liquid crystal panel 11, except that it is a common liquid crystal panel that provides color display using the color filters provided in the second liquid crystal panel 12 and the backlight provided on the back surface side of the second liquid crystal panel 12, not by displaying images based on the FSC system.

The first liquid crystal panel 11 includes a display portion 11A for displaying an image. The preprocessing unit 1000 includes a signal separation circuit 1100, a data correction circuit 1200, a red field memory 1300(R), a green field memory 1300(G), and a blue field memory 1300(B).

In the present embodiment, the first light source 31X uses light emitting diodes (LEDs) as the light-emitting elements. Specifically, as shown in FIG. 1, the red LEDs 31R, the green LEDs 31G, and the blue LEDs 31B define the first light source 31X. In the present embodiment, the timing controller 2000, the gate driver 3100, and the source driver 3200 define a liquid crystal panel driving unit, while the LED driver 3300 defines a light source driving unit. The signal separation circuit 1100 defines an input image data separation unit.

Figure 4:
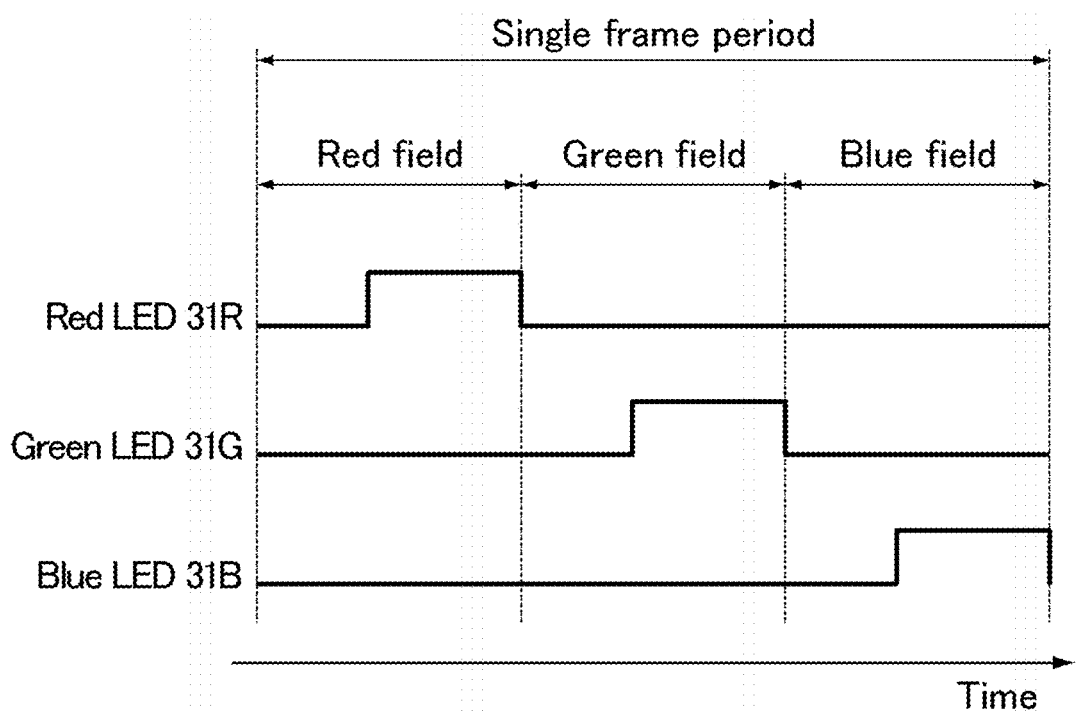
FIG. 4 is a view of the structure of a single frame period in the liquid crystal display device of Embodiment 1.

FIG. 4 is a view of the structure of a single frame period in the liquid crystal display device of Embodiment 1. A single frame period is divided into a red field which displays a red screen image based on the red component in an input image signal DIN, a green field which displays a green screen image based on the green component in the input image signal DIN, and a blue field which displays a blue screen image based on the blue component in the input image signal DIN. In the red field, the red LEDs 31R are turned on after an elapse of a predetermined period of time from when the field starts. In the green field, the green LEDs 31G are turned on after an elapse of a predetermined period of time from when the field starts. In the blue field, the blue LEDs 31B are turned on after an elapse of a predetermined period of time from when the field starts.

During operation of the liquid crystal display device 1, these red field, green field, and blue field are repeated. This causes the red screen, the green screen, and the blue screen to be displayed repeatedly, displaying the desired color image on the display portion 11A. The order of the fields is not limited. The order of the fields may be, for example, the blue field, the green field, and the red field. The length of the period during which the LED is turned on in each field may be determined in consideration of the response property of the liquid crystal.

As shown in FIG. 3, in the display portion 11A, multiple (n number of) source lines (video signal lines) SL1 to SLn and multiple (m number of) gate lines (scanning signal lines) GL1 to GLm are arranged. The intersections of the source line SL1 to SLn and the gate lines GL1 to GLm each are provided with a pixel forming portion 4. In other words, the display portion 11A includes multiple (n×m) pixel forming portions 4. The pixel forming portions 4 are arranged in a matrix pattern to define a pixel matrix with m rows×n columns. Hereinafter, each of the source lines SL1 to SLn is also simply referred to as a source line SL, and each of the gate lines GL1 to GLm is also simply referred to as a gate line GL.

Each pixel forming portion 4 includes a thin film transistor (TFT) 40 which is a switching element whose gate terminal is connected to the gate line GL passing the corresponding intersection and whose source terminal is connected to the source line SL passing the intersection; a pixel electrode 120 connected to the drain terminal of the TFT 40; the common electrode 220 and an auxiliary capacitance electrode 45 common to the pixel forming portions 4; a liquid crystal capacitance 42 formed by the pixel electrode 120 and the common electrode 220; and an auxiliary capacitance 43 formed by the pixel electrode 120 and the auxiliary capacitance electrode 45. The liquid crystal capacitance 42 and the auxiliary capacitance 43 define a pixel capacitance 46. In the display portion 11A in FIG. 3, only the components corresponding to a single pixel forming portion 4 are shown.

The operation of the components in FIG. 3 is descried below. The signal separation circuit 1100 in the preprocessing unit 1000 divides an input image signal DIN from an external device into red input grayscale data 1R, green input grayscale data 1G, and blue input grayscale data 1B. The data correction circuit 1200 in the preprocessing unit 1000 corrects the input grayscale data (red input grayscale data 1R, green input grayscale data 1G, and blue input grayscale data 1B) outputted from the signal separation circuit 1100 to data corresponding to the voltage to be applied to the liquid crystal panel 11, and outputs the corrected data as the application grayscale data (red field application grayscale data 1r, green field application grayscale data 1g, and blue field application grayscale data 1b). The data correction circuit 1200 is described in more detail later.

The red field memory 1300(R), the green field memory 1300(G), and the blue field memory 1300(B) respectively store the red field application grayscale data 1r, the green field application grayscale data 1g, and the blue field application grayscale data 1b which were outputted from the data correction circuit 1200.

The timing controller 2000 reads the red field application grayscale data 1r, the green field application grayscale data 1g, and the blue field application grayscale data 1b respectively from the red field memory 1300(R), the green field memory 1300(G), and the blue field memory 1300(B). The timing controller 2000 then outputs a digital video signal DV; a gate start pulse signal GSP and a gate clock signal GCK which are for controlling the operation of the gate driver 3100; a source start pulse signal SSP, a source clock signal SCK, and a latch strobe signal LS which are for controlling the operation of the source driver 3200; and an LED driver control signal S1 for controlling the operation of the LED driver 3300.

The gate driver 3100 repeats supply of an active scanning signal to each gate line GL based on the gate start pulse signal GSP and the gate clock signal GCK from the timing controller 2000, with a single vertical scanning period taken as a single cycle.

The source driver 3200 receives the digital video signal DV, the source start pulse signal SSP, the source clock signal SCK, and the latch strobe signal LS from the timing controller 2000, and supplies a driving video signal to each source line SL. At this time, the source driver 3200 holds digital video signals DV sequentially generated in response to generation of pulses of the source clock signals SCK and showing the magnitudes of voltage to be applied to the respective source lines SL. Then, in response to generation of pulses of the latch strobe signals LS, the digital video signals DV held as above are converted to the magnitudes of analogue voltage. The converted magnitudes of analogue voltage are simultaneously applied to the source lines SL1 to SLn as driving video signals.

The LED driver 3300, based on the LED driver control signals S1 from the timing controller 2000, outputs light source control signals S2 for controlling the states of the LEDs (red LEDs 31R, green LEDs 31G, and blue LEDs 31B) defining the first light source 31X. The first light source 31X appropriately switches the states (switches between turning on and off) of each LED based on the light source control signal S2. In the present embodiment, the state of each LED is switched as shown in FIG. 4.

As described above, scanning signals are supplied to the gate lines GL1 to GLm and driving video signals are supplied to the source lines SL1 to SLn, so that the states of each LED are appropriately switched. Thus, an image corresponding to the input image signal DIN is displayed on the display portion 11A of the liquid crystal panel 11.

The first light source 31X includes the light-emitting elements (red LEDs 31R, green LEDs 31G, and blue LEDs 31B) configured to emit light rays of colors different from one another. The first light source 31X has, for example, a rod-like shape in which the light-emitting elements are aligned in a straight line.

Preferably, the liquid crystal display device 1 satisfies the following (formula 1-1):

$$1 \text{ cm} \leq h11 \leq \{a/(\tan \theta 11)\} \quad \text{(formula 1-1)}$$

where a is calculated from the length 2a [cm] of a long side of the first liquid crystal panel 11, h11 [cm] is the distance between the first liquid crystal panel 11 and the first light source 31X, and θ11[°] is the angle of incidence of light from the first light source 31X on the back surface side main surface 11P of the first liquid crystal panel 11. This mode increases the intensity of the front scattering components in the scattering state and enables further reduction or prevention of a decrease in luminance of the panel central portion in the scattering state, thus enabling even brighter display. Herein, the distance between the first liquid crystal panel and the light source refers to the distance from the first liquid crystal panel to the end of the light source closer to the first liquid crystal panel. θ11 refers to the angle of incidence of a light ray travelling along the path closest to the center of the first liquid crystal panel 11 among the light rays emitted from the first light source 31X.

As shown in FIG. 1, the first light source 31X is disposed correspondingly to one edge portion 11X of a pair of edge portions 11X and 11Y of the first liquid crystal panel 11 facing each other, the liquid crystal display device 1 further includes a second light source 31Y that is disposed between the first liquid crystal panel 11 and the second liquid crystal panel 12 and correspondingly to the other edge portion 11Y of the edge portions 11X and 11Y, the second light source 31Y is configured to irradiate the back surface side main surface 11P of the first liquid crystal panel 11 with light from an oblique direction, and the angle of incidence θ11 of light from the first light source 31X on the back surface side main surface 11P of the first liquid crystal panel 11 is the same as the angle of incidence θ12 of light from the second light source 30Y on the back surface side main surface 11P of the first liquid crystal panel 11. This mode can reduce or prevent a decrease in luminance more evenly within the panel plane in the scattering state.

The second light source 31Y is the same as the first light source 31X, except that it is disposed in the other edge portion 11Y.

Preferably, the liquid crystal display device 1 satisfies the following (formula 1-2):

$$1 \text{ cm} \leq h12 \leq \{a/(\tan \theta 12)\} \quad \text{(formula 1-2)}$$

where a is calculated from the length 2a [cm] of a long side of the first liquid crystal panel 11, h12 [cm] is the distance between the first liquid crystal panel 11 and the second light source 31Y, and θ12[°] is the angle of incidence of light from the second light source 31Y on the back surface side main surface 11P of the first liquid crystal panel 11. This mode increases the intensity of the front scattering components in the scattering state and enables further reduction or prevention of a decrease in luminance of the panel central portion in the scattering state, thus enabling even brighter display. The symbol θ12 refers to the angle of incidence of a light ray travelling along the path closest to the center of the first liquid crystal panel 11 among the light rays emitted from the second light source 31Y.

Preferably, the first light source 31X and the second light source 31Y satisfy the following formulas (formula 1-3) and (formula 1-4):

$$h11 = h12 \quad \text{(formula 1-3)}$$

$$\theta 11 = \theta 12 \quad \text{(formula 1-4)}.$$

This mode applies light from the first light source 31X and light from the second light source 31Y symmetrically to the central line of the first liquid crystal panel 11 parallel to the pair of edge portions 11X and 11Y, thus enabling reduction or prevention of a decrease in luminance more evenly within the panel plane in the scattering state.

Preferably, the first light source 31X and the second light source 31Y in a front view are symmetrical about the central line of the first liquid crystal panel 11 parallel to the pair of edge portions 11X and 11Y. This mode can reduce or prevent a decrease in luminance more evenly within the panel plane in the scattering state.

Preferably, h11 and h12 and θ11 and θ12 are set such that light from the first light source 31X and light from the second light source 31Y reach the central line of the first liquid crystal panel 11 parallel to the pair of edge portions 11X and 11Y. This mode can reduce or prevent a decrease in luminance more evenly within the panel plane in the scattering state.

When the first liquid crystal panel 11 is a 19-inch one, h11 and h12 are preferably 3 cm or longer and 12 cm or shorter, more preferably 4 cm or longer and 11 cm or shorter, still more preferably 5 cm or longer and 10 cm or shorter. Also, θ11 and θ12 are preferably 51° or more and 63° or less, more preferably 53° or more and 61° or less, still more preferably 55° or more and 59° or less.

Next, the second liquid crystal panel 12 is described. In the liquid crystal display device 1 of the present embodiment, when the first liquid crystal panel 11 is in the transparent state, an image on the second liquid crystal panel 12 can be observed from the viewing surface side.

Figure 5:
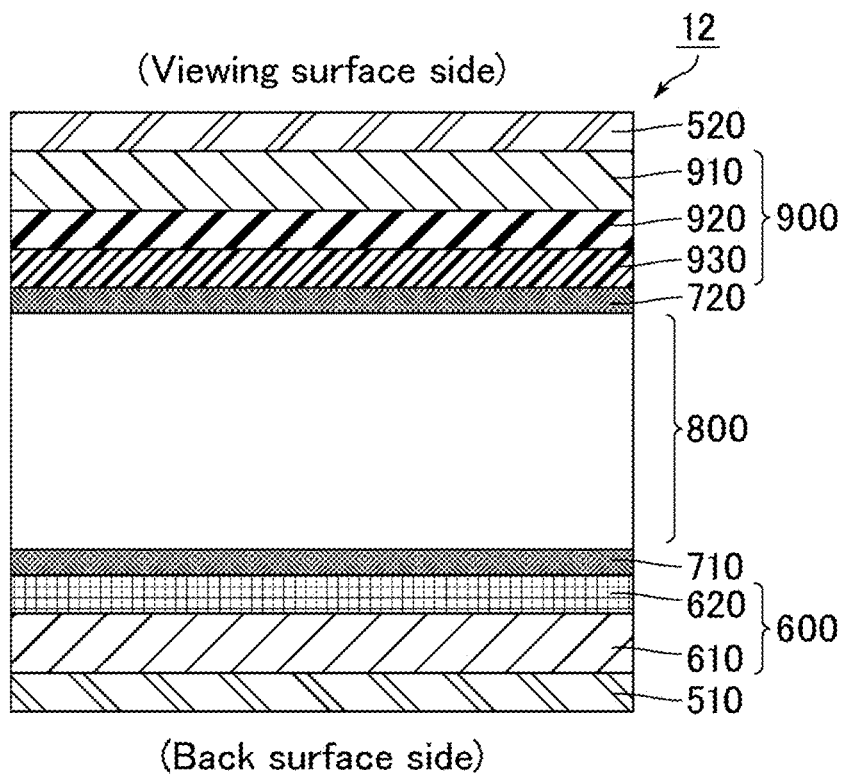
FIG. 5 is a schematic cross-sectional view of a second liquid crystal panel in the liquid crystal display device of Embodiment 1.

FIG. 5 is a schematic cross-sectional view of a second liquid crystal panel in the liquid crystal display device of Embodiment 1. As shown in FIG. 5, the second liquid crystal panel 12 includes, sequentially from its back surface side toward its viewing surface side, a first polarizing plate 510, a third substrate 600, a third alignment film 710, a liquid crystal layer 800 containing liquid crystal molecules, a fourth alignment film 720, a fourth substrate 900, and a second polarizing plate 520. The third substrate 600 includes a third support substrate 610 and pixel electrodes 620. The fourth substrate 900 includes a fourth support substrate 910, a color filter layer 920, and a common electrode 930.

In the present embodiment, a vertical alignment mode liquid crystal display device is described in which the third substrate 600 includes the pixel electrodes 620 and the fourth substrate 900 includes the common electrode 930. The display mode of the second liquid crystal panel 12 is not limited thereto. The liquid crystal display device may be a horizontal alignment mode liquid crystal display device in which the third substrate 600 or the fourth substrate 900 includes both the pixel electrodes and the common electrode. The vertical alignment mode is a mode that aligns the liquid crystal molecules in the direction substantially vertical to the main surfaces of the pair of substrates (the first substrate and the second substrate) with no voltage applied to the liquid crystal layer. Examples of the mode include the vertical alignment (VA) mode and the twisted nematic (TN) mode. The horizontal alignment mode is a mode that aligns the liquid crystal molecules in the direction substantially horizontal to the main surfaces of the pair of substrates with no voltage applied to the liquid crystal layer. Examples of the mode include the in-plane switching (IPS) mode and the fringe field switching (FFS) mode.

The phrase "substantially vertical" means that, for example, the pre-tilt angle of the liquid crystal molecules is 85° or greater and 90° or smaller relative to the main surface of one of the substrates. The phrase "substantially horizontal" means that, for example, the pre-tilt angle of the liquid crystal molecules is 0° or greater and 5° or smaller relative to the main surface of one of the substrates. The pre-tilt angle refers to the angle formed by the long axis of each liquid crystal molecule with a surface of a substrate when the voltage applied to the liquid crystal layer is lower than the threshold voltage (including no voltage application), with the substrate surface being at 0° and the line normal to the substrate being at 90°. The main surface of a substrate means a substrate surface.

In the present embodiment, light from the backlight 50 is incident on the second liquid crystal panel 12 and the alignment of the liquid crystal molecules in the liquid crystal layer 800 is switched, so that the amount of light passing through the second liquid crystal panel 12 is controlled. The second liquid crystal panel 12 is a liquid crystal display (LCD) panel.

The third support substrate 610 and the fourth support substrate 910 are preferably transparent substrates, such as glass substrates or plastic substrates.

The pixel electrodes 620 are the same as the pixel electrodes 120 in the first liquid crystal panel 11. The common electrode 930 is the same as the common electrode 220 in the first liquid crystal panel 11.

The color filter layer 920 includes red color filters, green color filters, and blue color filters. In each pixel, three sub-pixels, namely a sub-pixel with a red color filter, a sub-pixel with a green color filter, and a sub-pixel with a blue color filter, are arranged in a striped pattern.

Each of the red color filter, the green color filter, and the blue color filter is formed from, for example, a transparent resin containing a pigment. Typically, each pixel is provided with a red color filter, a green color filter, and a blue color filter in combination, and the desired color is produced in each pixel by mixing the colors of the light rays passing through the red color filter, the green color filter, and the blue color filter while controlling the amounts of the light rays passing through the respective filters.

The third alignment film 710 and the fourth alignment film 720 have a function to control the alignment of the liquid crystal molecules in the liquid crystal layer 800. When the voltage applied to the liquid crystal layer 800 is lower than the threshold voltage (including no voltage application), the alignment films mainly control the alignment of the liquid crystal molecules in the liquid crystal layer 800. The alignment films can be formed from a material commonly used in the field of liquid crystal display panels, such as a polymer with a polyimide structure in its main chain, a polymer with a polyamic acid structure in its main chain, or a polymer with a polysiloxane structure in its main chain.

The liquid crystal layer 800 contains a liquid crystal material. The amount of light passing through the liquid crystal layer 800 is controlled by applying voltage to the liquid crystal layer 800 to change the alignment of the liquid crystal molecules in the liquid crystal material based on the applied voltage.

The liquid crystal molecules may have a positive value or negative value of the anisotropy of dielectric constant (As) which is defined by the formula (L).

The alignment of the liquid crystal molecules is switched by application of voltage between the pixel electrodes 620 and the common electrode 930 holding the liquid crystal layer 800. With no voltage applied between the pixel electrodes 620 and the common electrode 930, the third alignment film 710 and the fourth alignment film 720 control the initial alignment of the liquid crystal molecules. The state "with no voltage applied between the pixel electrodes 620 and the common electrode 930" means that the voltage applied to the liquid crystal layer 800 is lower than the threshold voltage, including a state where voltage is substantially not applied between the pixel electrodes 620 and the common electrode 930.

The second liquid crystal panel 12 may further include polarizing plates on the respective surfaces of the third substrate 600 and the fourth substrate 900 remote from the liquid crystal layer 800. Both polarizing plates are absorptive polarizers, and are preferably in crossed Nicols where the absorption axes thereof are perpendicular to each other. Preferably, the liquid crystal molecules in the liquid crystal layer 800 with no voltage applied are homogeneously aligned in the direction parallel to the absorption axis of one of the polarizing plates. This mode enables the liquid crystal panel 12 to operate in the normally black mode.

The backlight 50 may be any backlight that irradiates the second liquid crystal panel 12 with light. The backlight 50 may be one usually used in the field of liquid crystal display devices. The backlight 50 may be any one that is disposed on the back surface of the second liquid crystal panel 12 and can cause light produced in the backlight 50 to pass through the transmission region of the second liquid crystal panel 12 and then to be emitted toward the viewer. The backlight 50 may be a direct-lit backlight or an edge-lit backlight.

The backlight 50 includes, for example, a light source and a light guide plate. The light source may be any light source that emits light including visible light, such as one that emits light including only visible light or light including both visible light and ultraviolet light. In order to provide color display on the second liquid crystal panel 12, a light source emitting white light is suitable. Suitable kinds of the light source include cold cathode fluorescent lamps (CCFLs) and light emitting diodes (LEDs). The light guide plate may be any one that has a function to guide light incident on its edge surface to be uniformly emitted from its surface, and may be one usually used in the field of liquid crystal display devices. The "visible light" as used herein means light (electromagnetic waves) having a wavelength of 380 nm or longer and shorter than 800 nm. The backlight 50 may further utilize an optical sheet such as a diffuser plate or a prism sheet as appropriate.

Preferably, the distance b [cm] between the first liquid crystal panel 11 and the second liquid crystal panel 12 is a [cm] or shorter, wherein a is calculated from the length 2a [cm] of a long side of the first liquid crystal panel 11. This mode can reduce the thickness of the liquid crystal display device 1. This mode can also reduce the distance between the videos on the first liquid crystal panel 11 and the second liquid crystal panel 12, enabling integrated visual effects in oblique observation of the liquid crystal display device 1. This mode is suitable for, for example, a case where characters are displayed as information on the first liquid crystal panel 11 and the second liquid crystal panel 12.

Also preferably, the distance b [cm] between the first liquid crystal panel 11 and the second liquid crystal panel 12 is longer than a [cm]. This mode can increase the distance between the videos on the first liquid crystal panel 11 and the second liquid crystal panel 12, enabling visual effects with a spatial depth in oblique observation of the liquid crystal display device 1.

When the first liquid crystal panel 11 is a 19-inch one and the second liquid crystal panel is a 17-inch one, preferably, 2a is 40 cm and b is 10 cm or longer and 20 cm or shorter, more preferably 11 cm or longer and 19 cm or shorter, still more preferably 12 cm or longer and 18 cm or shorter.

As described above, the liquid crystal display device 1 of the present embodiment includes a PDLC panel as the front panel (first liquid crystal panel 11) and an LCD panel as the back surface panel (second liquid crystal panel 12), i.e., is a dual display (PDLC panel+LCD panel). The liquid crystal display device 1 irradiates the PDLC panel with light from the FSC-driven light source from an oblique direction, and thus can achieve a favorable transparent transmittance (50% or higher), an increase in size (for example, 19-inch size), and bright display (high luminance) at the same time.

The liquid crystal display device 1 of the present embodiment has a structure including, as well as the components described above, components including external circuits such as a tape-carrier package (TCP) and a printed circuit board (PCB); optical films such as a viewing angle-increasing film and a luminance-increasing film; and a bezel (frame). Some components may be incorporated into another component. Components other than those described above are not particularly limited and are not described here because such components can be those commonly used in the field of liquid crystal display devices.

Embodiment 2

In the present embodiment, features unique to the present embodiment are mainly described, and the same features as those in the above embodiment are not described again. The present embodiment is substantially the same as Embodiment 1, except that a back surface side light source is between the first light source 31X and the second liquid crystal panel 12.

Figure 6:
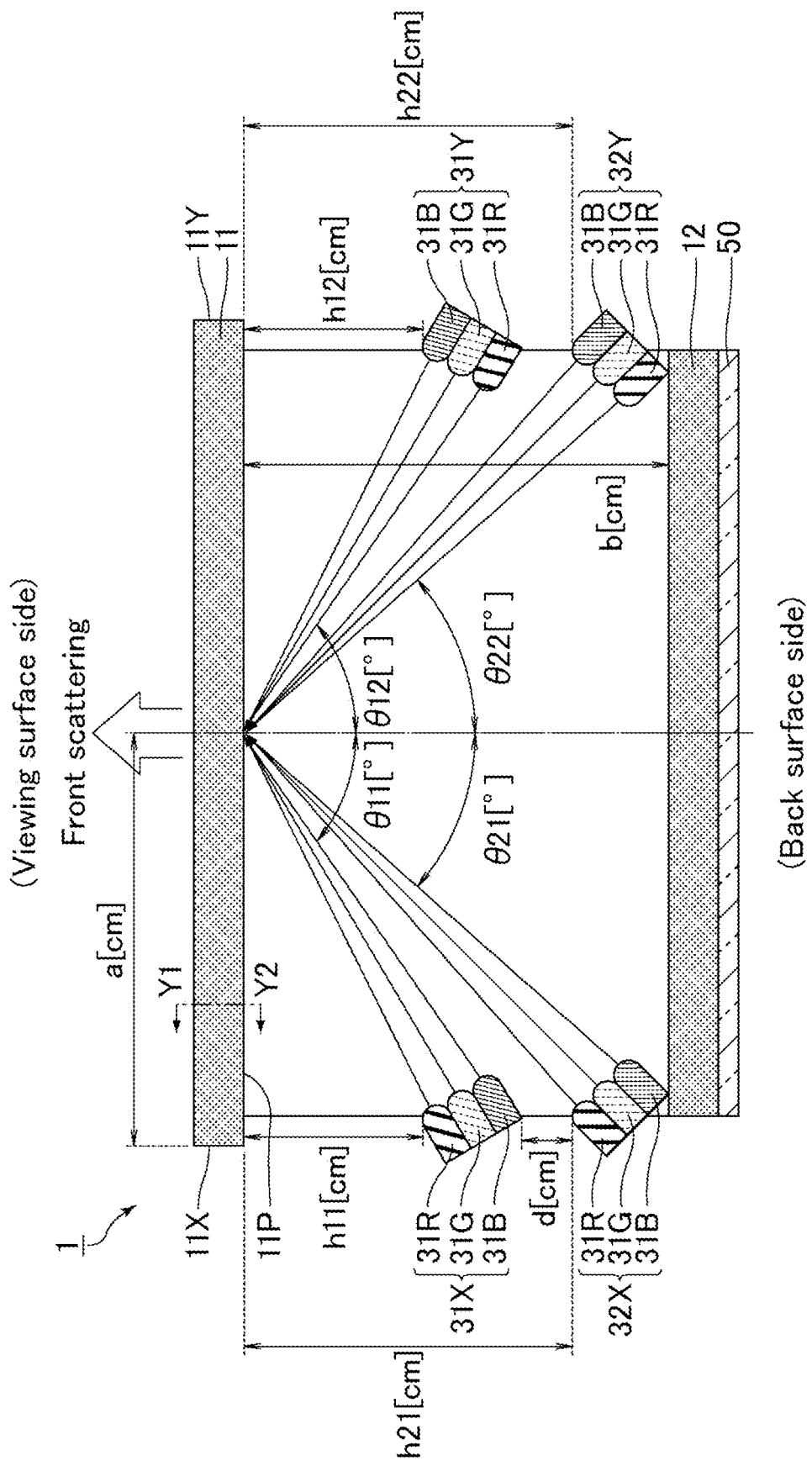
FIG. 6 is a schematic cross-sectional view of a liquid crystal display device of Embodiment 2.

FIG. 6 is a schematic cross-sectional view of a liquid crystal display device of Embodiment 2. As shown in FIG. 6, preferably, the liquid crystal display device 1 of the present embodiment includes a first back surface side light source 32X as the above back surface side light source between the first light source 31X and the second liquid crystal panel 12, and the first back surface side light source 32X irradiates the back surface side main surface 11P of the first liquid crystal panel 11 with light from an oblique direction. This mode can further reduce a decrease in luminance (more specifically, front luminance) of the panel central portion in the scattering state. As a result, the display screen can be further increased in size.

Preferably, the first back surface side light source 32X includes light-emitting elements (red LEDs 31R, green LEDs 31G, and blue LEDs 31B) configured to emit light rays of colors different from one another. The first back surface side light source 32X has, for example, a rod-like shape in which the light-emitting elements are aligned in a straight line.

Preferably, the liquid crystal display device 1 satisfies the following (formula 1-1) and (formula 2-1):

$$1 \text{ cm} \leq h11 \leq \{a/(\tan \theta11)\} \quad \text{(formula 1-1)}$$

$$\theta11 - \theta21 > 10° \quad \text{(formula 2-1)}$$

where a is calculated from the length 2a [cm] of a long side of the first liquid crystal panel 11, h11 [cm] is the distance between the first liquid crystal panel 11 and the first light source 31X, θ11[°] is the angle of incidence of light from the first light source 31X on the back surface side main surface 11P of the first liquid crystal panel 11, and θ21[°] is the angle of incidence of light from the first back surface side light source 32X on the back surface side main surface 11P of the first liquid crystal panel 11. This mode increases the intensity of the front scattering components in the scattering state and enables further reduction or prevention of a decrease in luminance of the panel central portion in the scattering state, thus enabling even brighter display. The symbol 821 refers to the angle of incidence of a light ray travelling along the path closest to the center of the first liquid crystal panel 11 among the light rays emitted from the light source 32X.

Preferably, the liquid crystal display device 1 satisfies the following (formula 1-2) and (formula 2-2):

$$1 \text{ cm} \leq h12 \leq \{a/(\tan \theta12)\} \quad \text{(formula 1-2)}$$

$$\theta12 - \theta22 > 10° \quad \text{(formula 2-2)}$$

where a is calculated from the length 2a [cm] of a long side of the first liquid crystal panel 11, h12 [cm] is the distance between the first liquid crystal panel 11 and the second light source 31Y, θ12[°] is the angle of incidence of light from the second light source 31Y on the back surface side main surface 11P of the first liquid crystal panel 11, and θ22[°] is the angle of incidence of light from a second back surface side light source 32Y on the back surface side main surface 11P of the first liquid crystal panel 11. This mode increases the intensity of the front scattering components in the scattering state and enables further reduction or prevention of a decrease in luminance of the panel central portion in the scattering state, thus enabling even brighter display. The symbol 922 refers to the angle of incidence of a light ray travelling along the path closest to the center of the first liquid crystal panel 11 among the light rays emitted from the light source 32Y.

As shown in FIG. 6, the first back surface side light source 32X is disposed correspondingly to the one edge portion 11X of the pair of edge portions 11X and 11Y of the first liquid crystal panel 11 facing each other, the liquid crystal display device 1 further includes the second back surface side light source 32Y that is disposed between the first liquid crystal panel 11 and the second liquid crystal panel 12 and correspondingly to the other edge portion 11Y of the edge portions 11X and 11Y, the second back surface side light source 32Y is configured to irradiate the back surface side main surface 11P of the first liquid crystal panel 11 from an oblique direction, and the angle of incidence θ21 of light from the first back surface side light source 32X on the back surface side main surface 11P of the first liquid crystal panel 11 is the same as the angle of incidence θ22 of light from the second back surface side light source 32Y on the back surface side main surface 11P of the first liquid crystal panel 11. This mode can reduce or prevent a decrease in luminance more evenly within the panel plane in the scattering state.

The second back surface side light source 32Y is the same as the first back surface side light source 32X, except that it is disposed on the other edge portion 11Y.

Preferably, the liquid crystal display device 1 satisfies the following (formula 1-2) and (formula 2-2):

$$1 \text{ cm} \leq h12 \leq \{a/(\tan \theta12)\} \quad \text{(formula 1-2)}$$

$$\theta12 - \theta22 > 10° \quad \text{(formula 2-2)}$$

where a is calculated from the length 2a [cm] of a long side of the first liquid crystal panel 11, h12 [cm] is the distance between the first liquid crystal panel 11 and the second light source 31Y, θ12[°] is the angle of incidence of light from the second light source 31Y on the back surface side main surface 11P of the first liquid crystal panel 11, and θ22[°] is the angle of incidence of light from the second back surface side light source 32Y on the back surface side main surface 11P of the first liquid crystal panel 11. This mode increases the intensity of the front scattering components in the scattering state and enables further reduction or prevention of a decrease in luminance of the panel central portion in the scattering state, thus enabling even brighter display.

Preferably, the first back surface side light source 32X and the second back surface side light source 32Y satisfy the following formulas (formula 2-3) and (formula 2-4):

$$h21 = h22 \quad \text{(formula 2-3)}$$

$$\theta21 = \theta22 \quad \text{(formula 2-4)}$$

where h21 [cm] is the distance between the first liquid crystal panel 11 and the first back surface side light source 32X and h22 [cm] is the distance between the first liquid crystal panel 11 and the second back surface side light source 32Y. This mode applies light from the first back surface side light source 32X and light from the second back surface side light source 32Y symmetrically to the central line of the first liquid crystal panel 11 parallel to the pair of edge portions 11X and 11Y, thus enabling reduction or prevention of a decrease in luminance more evenly within the panel plane in the scattering state.

Preferably, the first back surface side light source 32X and the second back surface side light source 32Y in a front view are symmetrical about the central line of the first liquid crystal panel 11 parallel to the pair of edge portions 11X and 11Y. This mode can reduce or prevent a decrease in luminance more evenly within the panel plane in the scattering state.

Preferably, the angles of incidence θ21 and θ22 are set such that light from the first back surface side light source 32X and light from the second back surface side light source 32Y reach the central line of the first liquid crystal panel 11 parallel to the pair of edge portions 11X and 11Y. This mode can reduce or prevent a decrease in luminance more evenly within the panel plane in the scattering state.

Preferably, the distances h21 and h22 and the angles of incidence θ21 and θ22 are set such that light from the first back surface side light source 32X and light from the second back surface side light source 32Y reach the central line of the first liquid crystal panel 11 parallel to the pair of edge portions 11X and 11Y. This mode can reduce or prevent a decrease in luminance more evenly within the panel plane in the scattering state.

When the first liquid crystal panel 11 is a 19-inch one, the distances h21 and h22 each are preferably 4 cm or longer and 13 cm or shorter, more preferably 5 cm or longer and 12 cm or shorter, still more preferably 6 cm or longer and 11 cm or shorter. The angles of incidence θ21 and θ22 are preferably 62° or greater and 74° or smaller, more preferably 64° or greater and 72° or smaller, still more preferably 66° or greater and 70° or smaller.

The distance d between the first light source 31X and the first back surface side light source 32X and the distance d between the second light source 31Y and the second back surface side light source 32Y each are preferably 1 cm or longer and 6 cm or shorter, more preferably 2 cm or longer and 5 cm or shorter.

Modified Example 1

Figure 7:
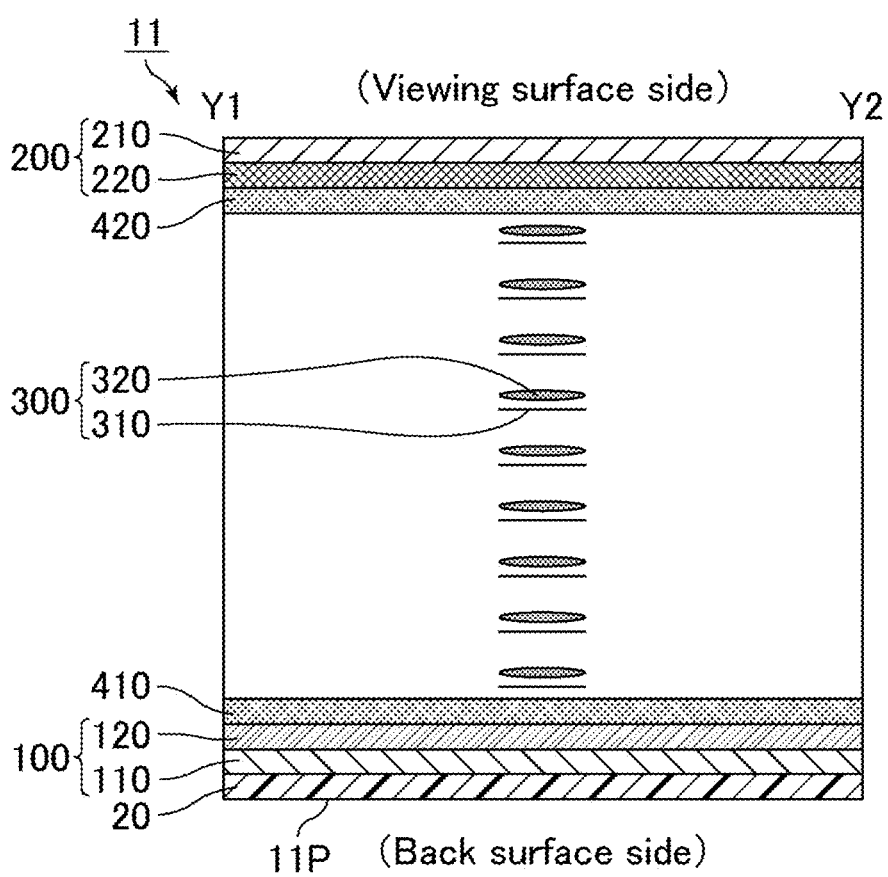
FIG. 7 is a schematic cross-sectional view of a liquid crystal display device of Modified Example 1.

FIG. 7 is a schematic cross-sectional view of a liquid crystal display device of Modified Example 1. FIG. 7 is a schematic cross-sectional view taken along line Y1-Y2 in FIG. 6. As shown in FIG. 7, the first liquid crystal panel 11 may include a transparent resin plate 20 on the back surface side of the first substrate 100. With the transparent resin plate 20, the first liquid crystal panel 11 can exhibit a higher degree of strength. The size of the transparent resin plate 20 may be the same as or greater than that of the first support substrate 110. Examples of the transparent resin plate 20 include acrylic plates.

Modified Example 2

Figure 8:
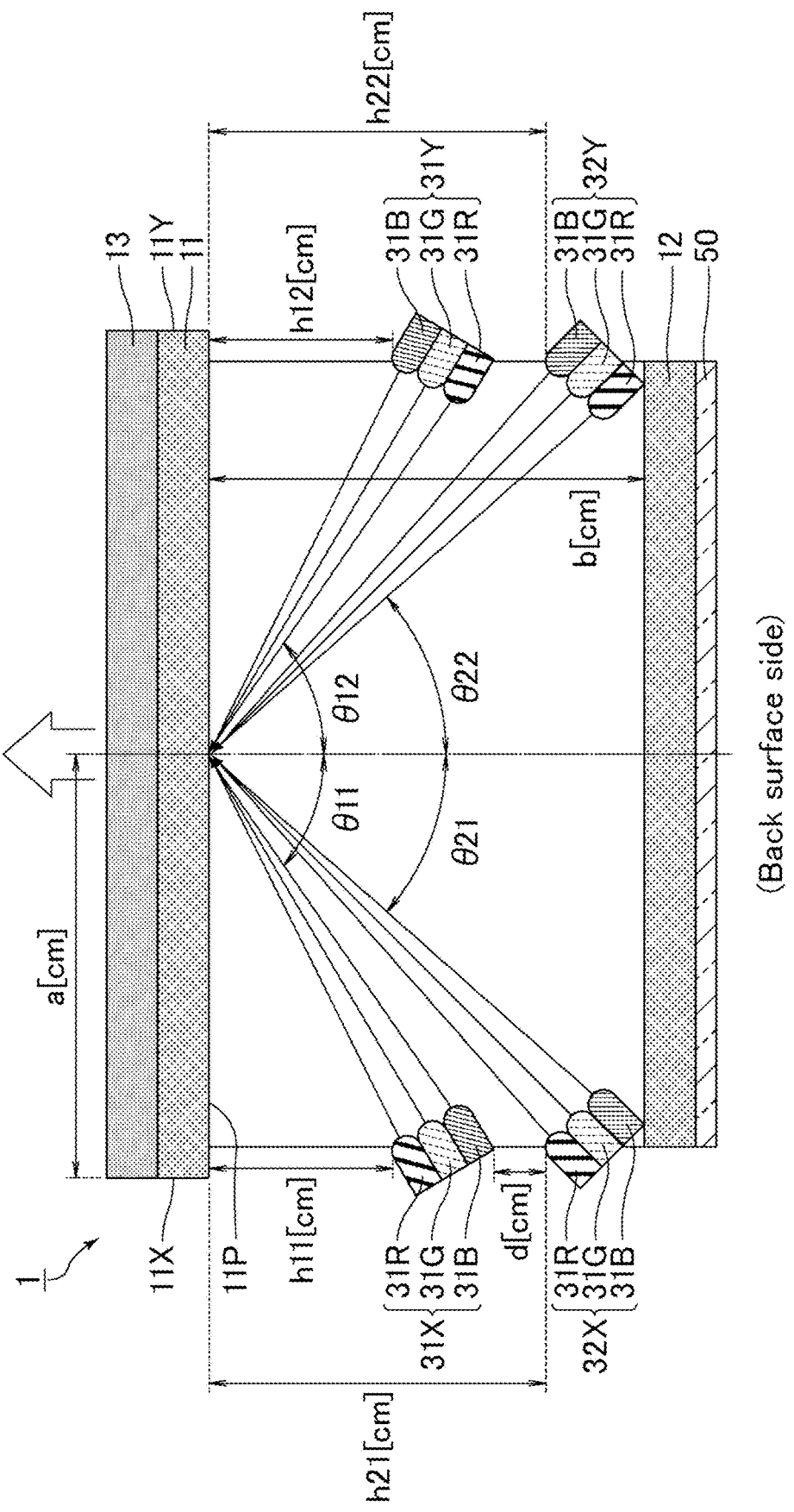
FIG. 8 is a schematic cross-sectional view of a liquid crystal display device of Modified Example 2.

FIG. 8 is a schematic cross-sectional view of a liquid crystal display device of Modified Example 2. As shown in FIG. 8, the liquid crystal display device 1 may include a light-shielding louver 13 on the viewing surface side of the first liquid crystal panel 11. This mode can achieve light shielding with the light source (particularly the LEDs defining the light source) being unobservable in observation of the liquid crystal display device from an oblique direction.

Figure 9:
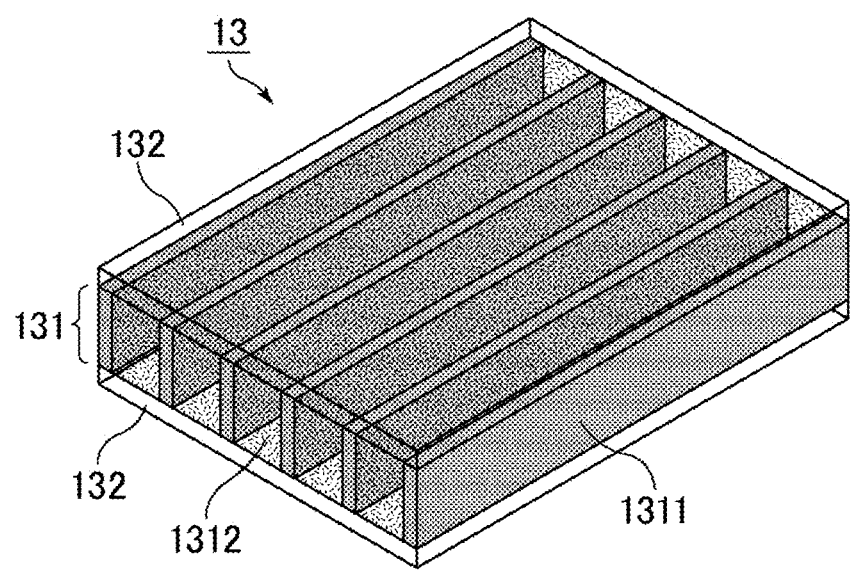
FIG. 9 is a schematic perspective view of a light-shielding louver in the liquid crystal display device of Modified Example 2.

FIG. 9 is a schematic perspective view of a light-shielding louver in the liquid crystal display device of Modified Example 2. The light-shielding louver 13 includes, as shown in FIG. 9, a louver layer 131 in which light-shielding layers 1311 and transparent layers 1312 are alternately arranged in the direction parallel to each other, and a pair of transparent films 132 holding the louver layer 131 in between. The light-shielding layers 1311 and the transparent layers 1312 include, for example, a silicone resin.

Modified Example 3

FIG. 10A to FIG. 10D each are an example of a schematic cross-sectional view of a liquid crystal display device of Modified Example 3. As shown in FIG. 10A to FIG. 10D, the first liquid crystal panel 11 may further include an anisotropic light diffusion film 14 having a function to transmit light in a front view while scattering light in an oblique view, on at least one of the back surface side of the first support substrate 110 or the viewing surface side of the second support substrate 210. This mode can further reduce or prevent a decrease in luminance of the panel central portion in the scattering state.

Figure 10A:
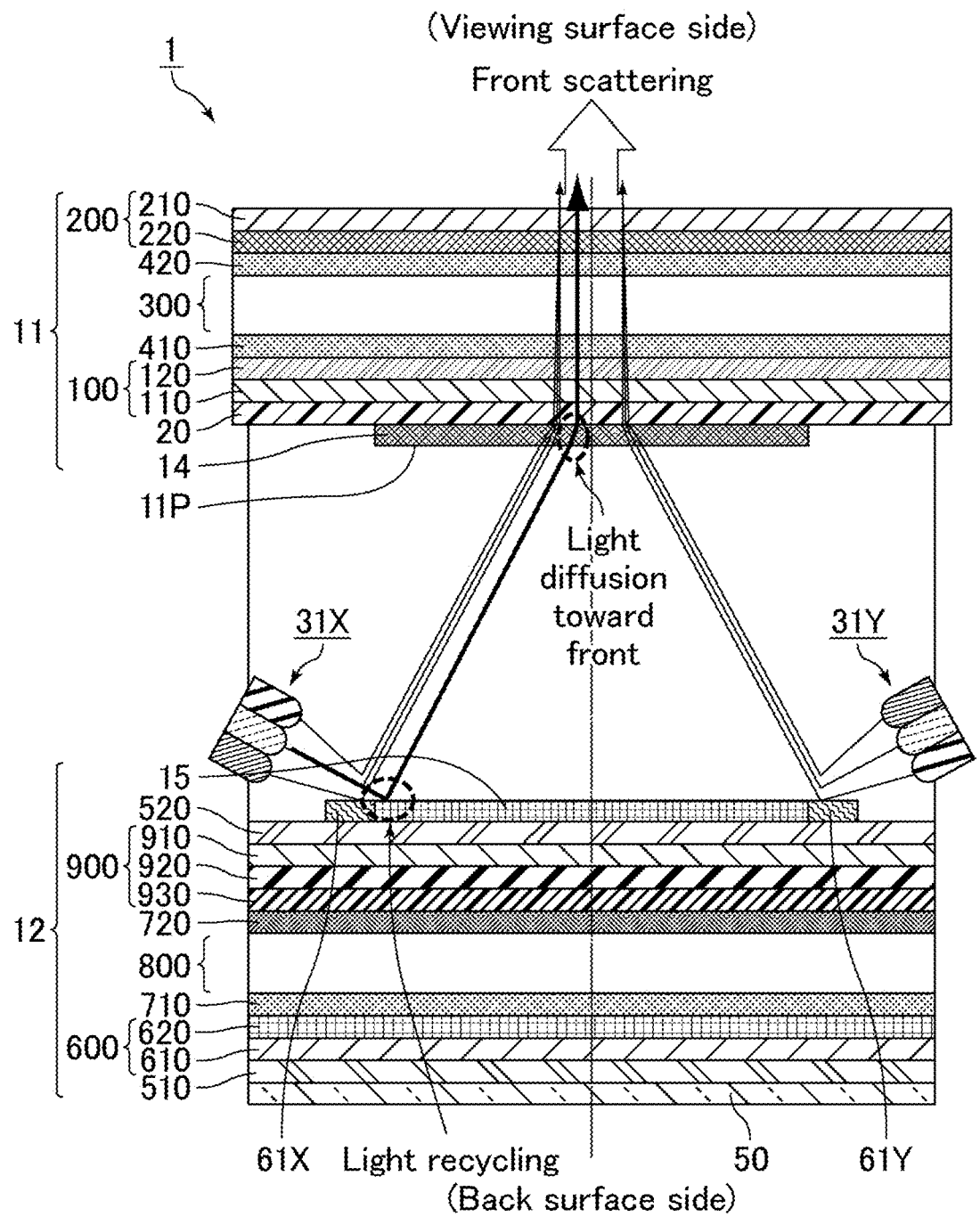
FIG. 10A is an example of a schematic cross-sectional view of a liquid crystal display device of Modified Example 3.
Figure 10B:
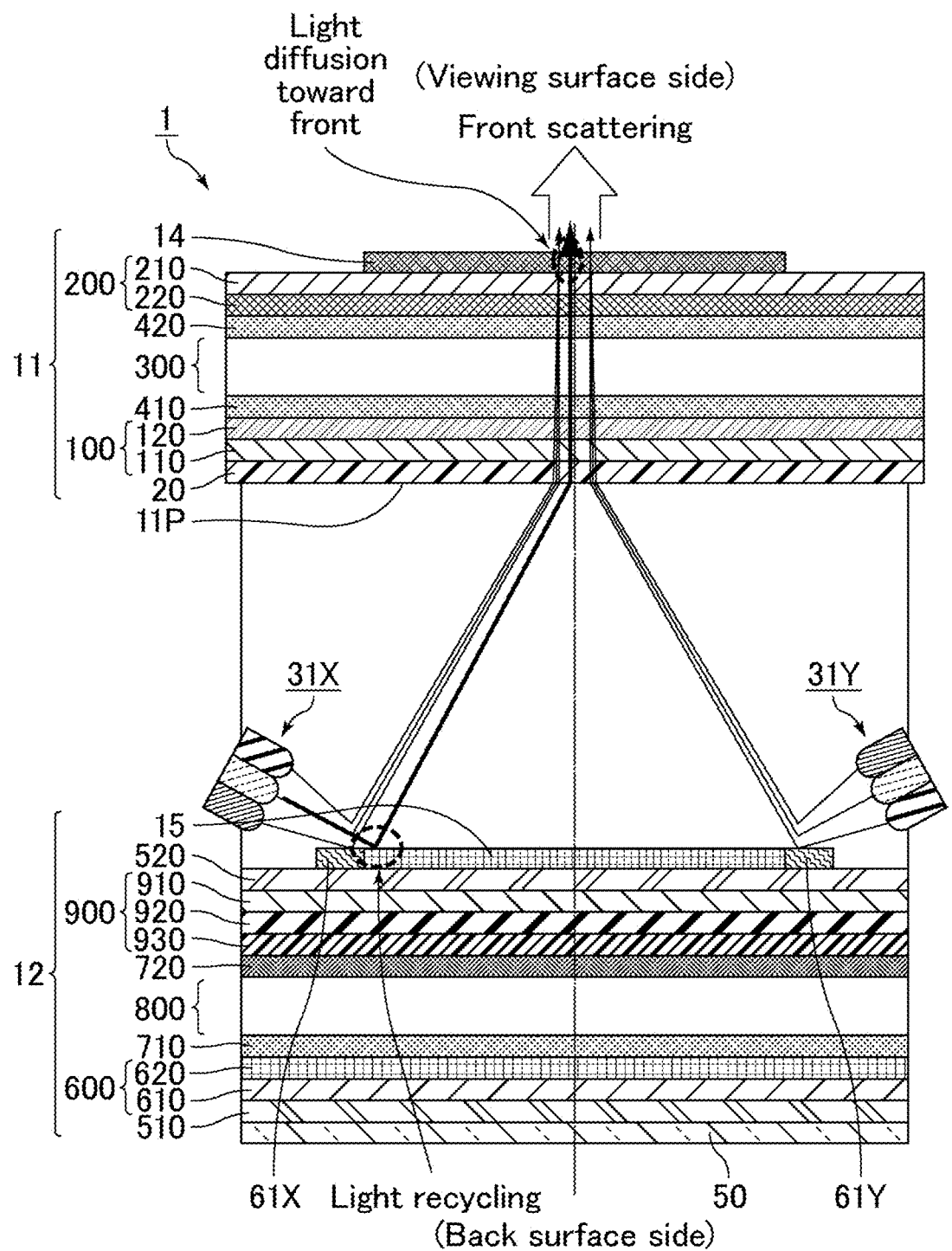
FIG. 10B is another example of a schematic cross-sectional view of the liquid crystal display device of Modified Example 3.
Figure 10C:
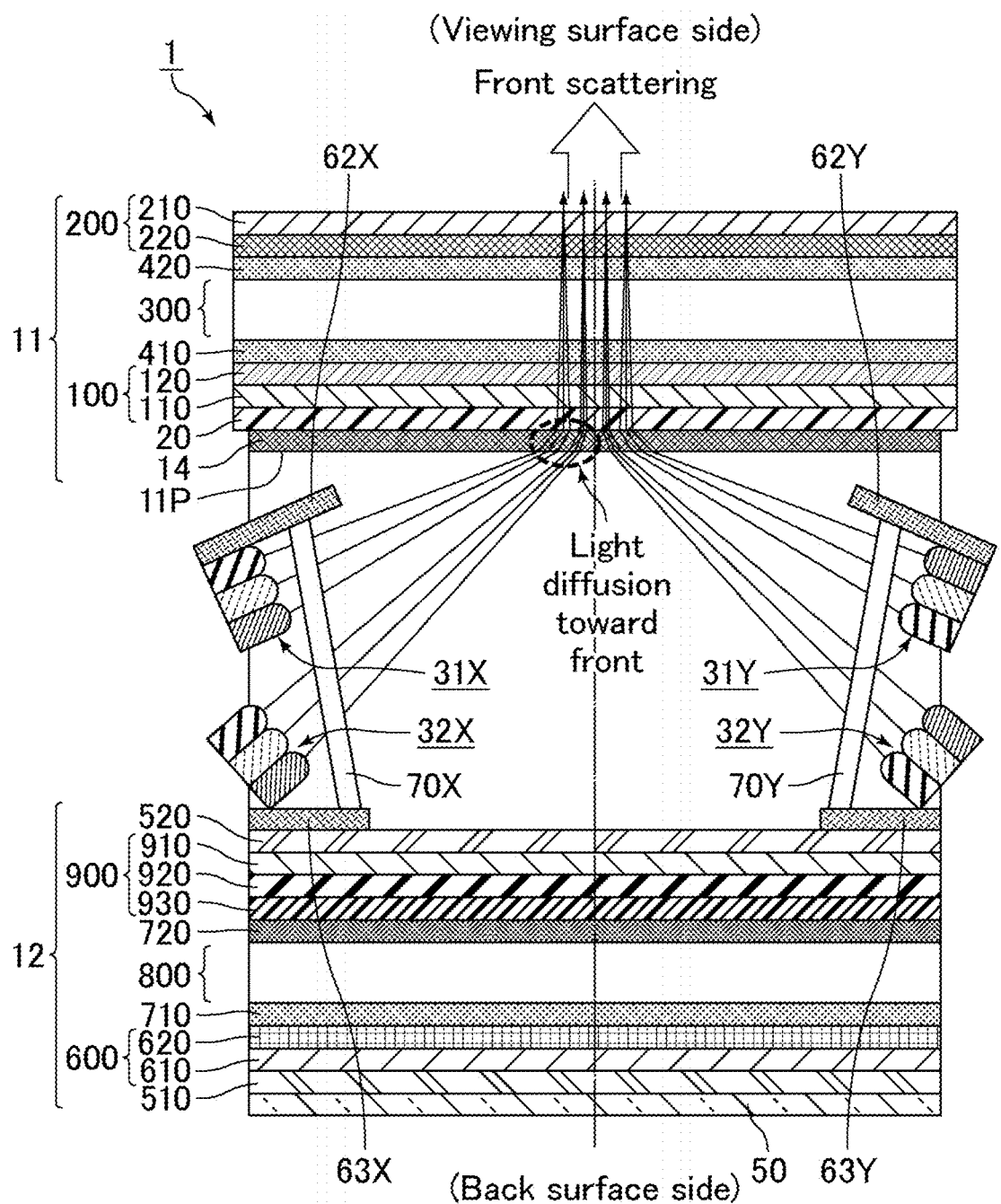
FIG. 10C is yet another example of a schematic cross-sectional view of the liquid crystal display device of Modified Example 3.
Figure 10D:
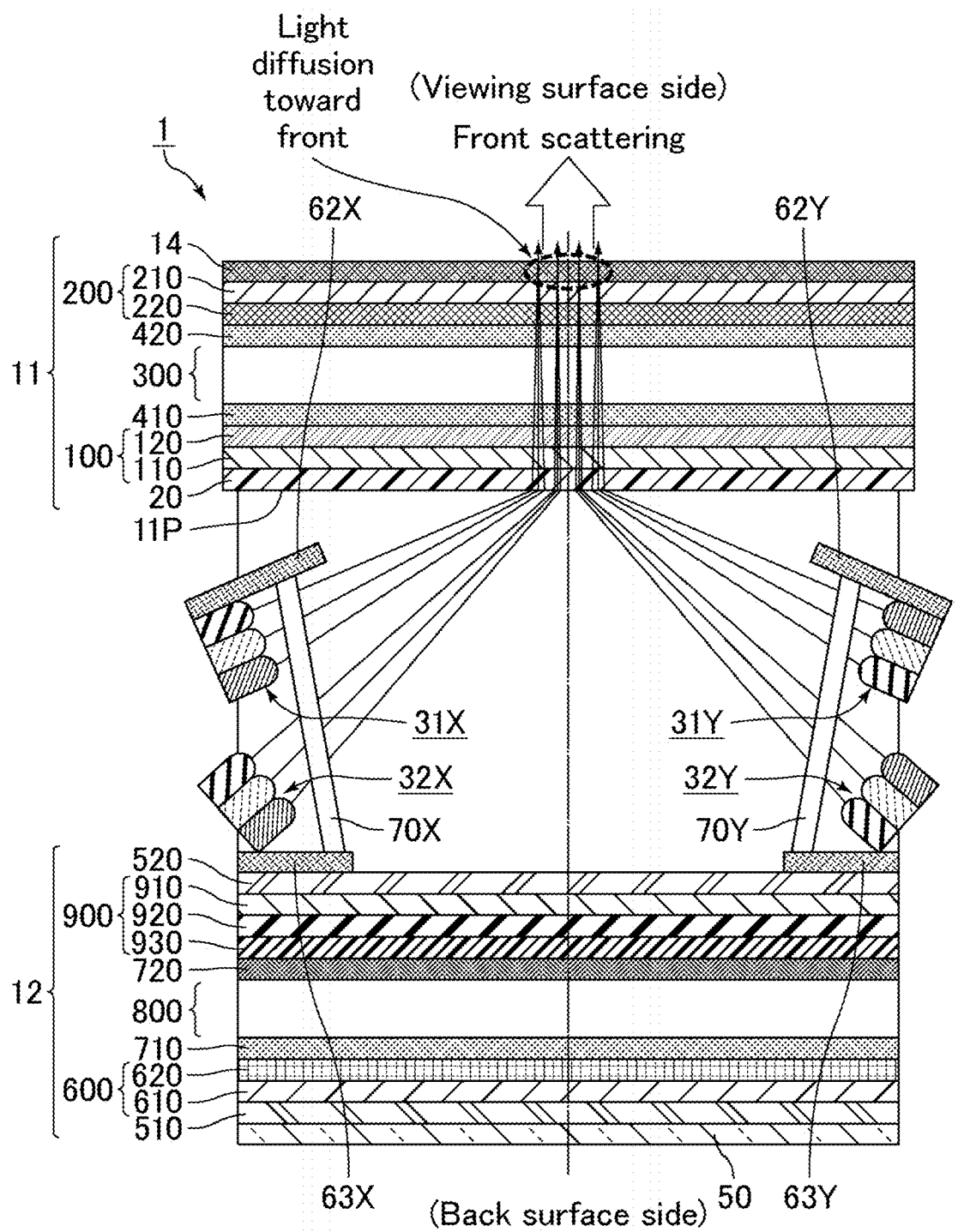
FIG. 10D is yet another example of a schematic cross-sectional view of the liquid crystal display device of Modified Example 3.

For example, in a mode where the liquid crystal display device 1 includes a pair of light sources (first light source 31X and second light source 31Y) as shown in FIG. 10A, the anisotropic light diffusion film 14 may be disposed on the back surface side of the first support substrate 110. Also, in a mode where the liquid crystal display device 1 includes a pair of light sources (first light source 31X and second light source 31Y) as shown in FIG. 10B, the anisotropic light diffusion film 14 may be disposed on the viewing surface side of the second support substrate 210. In a mode where the liquid crystal display device 1 include two pairs of light sources (first light source 31X and second light source 31Y, as well as first back surface side light source 32X and second back surface side light source 32Y) as shown in FIG. 10C, the anisotropic light diffusion film 14 may be disposed on the back surface side of the first support substrate 110. In a mode where the liquid crystal display device 1 includes two pairs of light sources (first light source 31X and second light source 31Y, as well as first back surface side light source 32X and second back surface side light source 32Y) as shown in FIG. 10D, the anisotropic light diffusion film 14 may be disposed on the viewing surface side of the second support substrate 210.

The anisotropic light diffusion film 14 may have a function to diffuse light in both a right oblique view and a left oblique view of the main surface of the anisotropic light diffusion film 14, or may have a function to diffuse light in either a right oblique view or a left oblique view.

The anisotropic light diffusion film 14 may be, for example, the light diffusion film (a hybrid film with high and low refractive indices) disclosed in WO 2016/051560 or a PDLC sheet. With such an anisotropic light diffusion film 14, the efficiency of light diffusion toward the front increases. The PDLC sheet is a normal PDLC sheet that is in the scattering state with no voltage applied while it is in the transparent state with voltage applied, and contributes to reduction in thickness as compared with the case of using a glass base material. The PDLC sheet can be, for example, a PDLC film available from SMARTINT, INC.

Figure 11A:
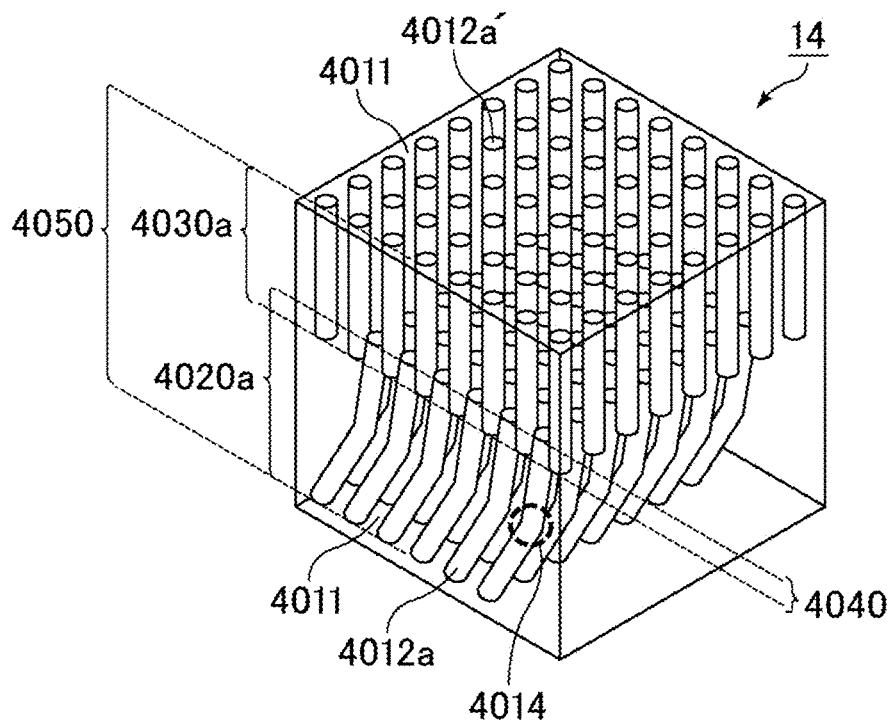
FIG. 11A is a schematic perspective view of an anisotropic light diffusion film in the liquid crystal display device of Modified Example 3.
Figure 11B:
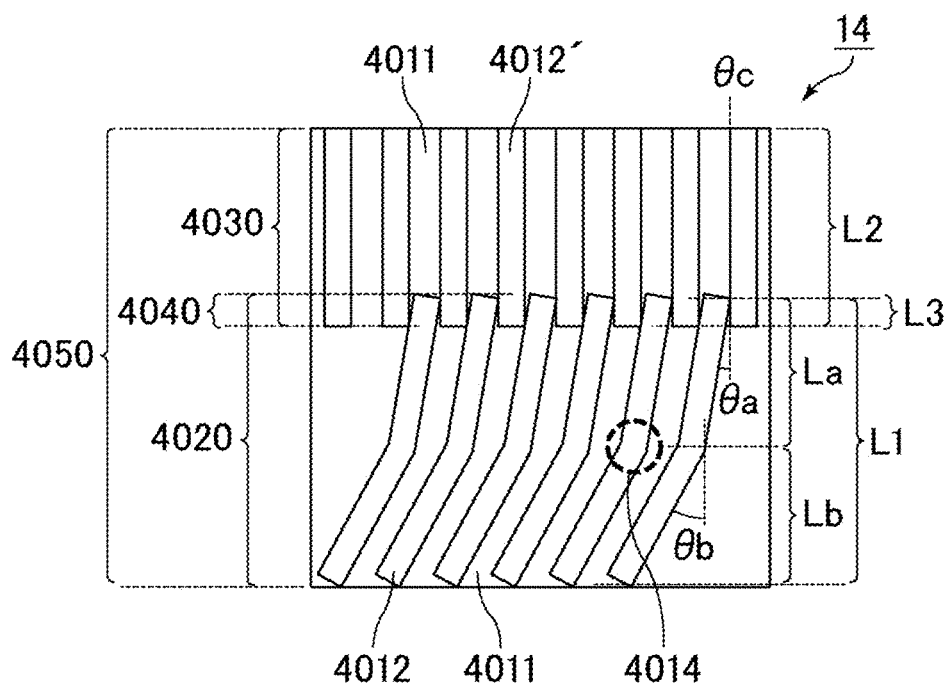
FIG. 11B is a schematic cross-sectional view of the anisotropic light diffusion film in the liquid crystal display device of Modified Example 3.

FIG. 11A is a schematic perspective view of an anisotropic light diffusion film in the liquid crystal display device of Modified Example 3. FIG. 11B is a schematic cross-sectional view of the anisotropic light diffusion film in the liquid crystal display device of Modified Example 3. An example of the anisotropic light diffusion film 14 is described in more detail with reference to FIG. 11A and FIG. 11B. The anisotropic light diffusion film 14 in FIG. 11A and FIG. 11B includes a first internal structure 4020 and a second internal structure 4030 which are columnar structures (4020a, 4030a). Yet, FIG. 11B is used as a comprehensive view encompassing the case where the first and second internal structures (4020, 4030) are columnar structures (4020a, 4030a), and cases where, for example, the first and second internal structures (4020, 4030) are any other internal structures such as louver structures.

As shown in FIG. 11A and FIG. 11B, the anisotropic light diffusion film 14 includes a single-layered light diffusion layer 4050 including, sequentially from the bottom in the film thickness direction, the first columnar structure 4020a and the second columnar structure 4030a with columns (4012a, 4012a') as regions having a relatively high refractive index (4012, 4012') in a region 4011 having a relatively low refractive index.

The columns 4012a in the first columnar structure 4020a each have a bent portion 4014 at the middle point in the film thickness direction.

Figure 12:
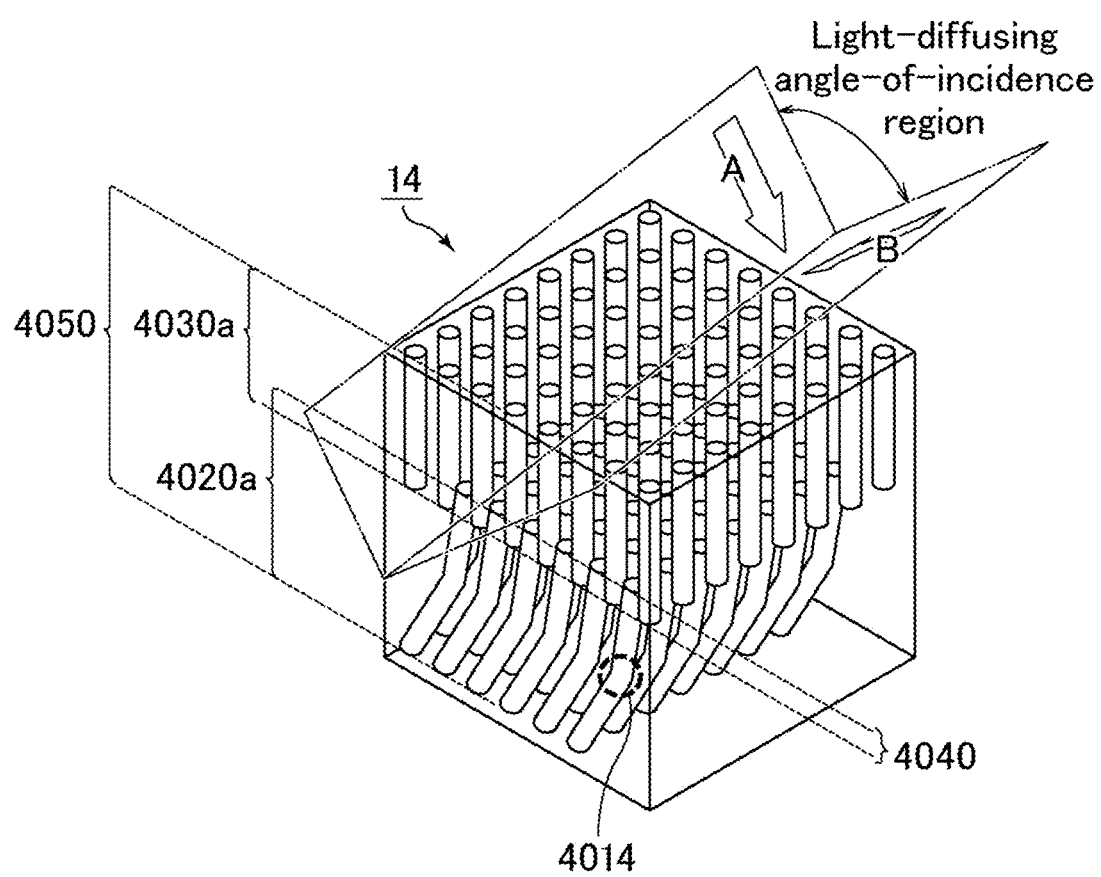
FIG. 12 is another schematic perspective view of the anisotropic light diffusion film in the liquid crystal display device of Modified Example 3.

FIG. 12 is another schematic perspective view of the anisotropic light diffusion film in the liquid crystal display device of Modified Example 3. The light diffusion properties of the anisotropic light diffusion film 14 are described in more detail based on an example in which the first internal structure 4020 and the second internal structure 4030 are both columnar structures (4020a, 4030a).

As shown in FIG. 12, the anisotropic light diffusion film 14 includes therein the first columnar structure 4020a and the second columnar structure 4030a, and the columns in the first columnar structure 4020a each have a bent portion 4014. Thus, as shown in FIG. 12, the three light-diffusing angle-of-incidence regions formed by the first columnar structure 4020a and the second columnar structure 4030a are overlapped while they are shifted by an appropriate range, so that the light-diffusing angle-of-incidence region as the whole film can be effectively increased.

In the columnar structures, the incident light with an angle of incidence substantially parallel to the inclination angle of the columns constituting the columnar structure can be efficiently diffused without loss. This is because such an angle of incidence is included in the light-diffusing angle-of-incidence region. However, incident light with an angle of incidence that is completely the same as the inclination angle of the columns may be transmitted without sufficient diffusion. In contrast, the anisotropic light diffusion film 14 can effectively solve this problem.

For example, as with the incident light indicated by the arrow A, incident light with an angle of incidence that is completely parallel to the inclination angle of the columns in the second columnar structure 4030a tends not to be diffused sufficiently by the second columnar structure 4030a. However, the anisotropic light diffusion film 14 shown in FIG. 12 uses the first columnar structure 4020a including columns each with a bent portion 4014 to gradually diffuse light in two stages, and thus can ultimately diffuse light sufficiently.

Also, for example, as with the incident light indicated by the arrow B, incident light with an angle of incidence significantly different from the inclination angle of columns in the second columnar structure 4030a is merely diffused in a crescent moon shape by the side surfaces of the columns in the second columnar structure 4030a, so that the diffusion by the second columnar structure 4030a tends to be insufficient. However, the anisotropic light diffusion film 14 shown in FIG. 12 uses the first columnar structure 4020a including columns each with a bent portion 4014, and thus can ultimately diffuse light sufficiently.

Thus, the anisotropic light diffusion film 14 can effectively increase the light-diffusing angle-of-incidence region as the whole film while effectively reducing or preventing changes in light diffusion properties caused by changes in angle of incidence of incident light.

Although the case where light is incident on the second columnar structure side has been described, light is diffused based on the same mechanism when light is incident on the first columnar structure side. Also, diffusion at three stages was described, but light may be diffused at four or more stages.

Figure 13A:
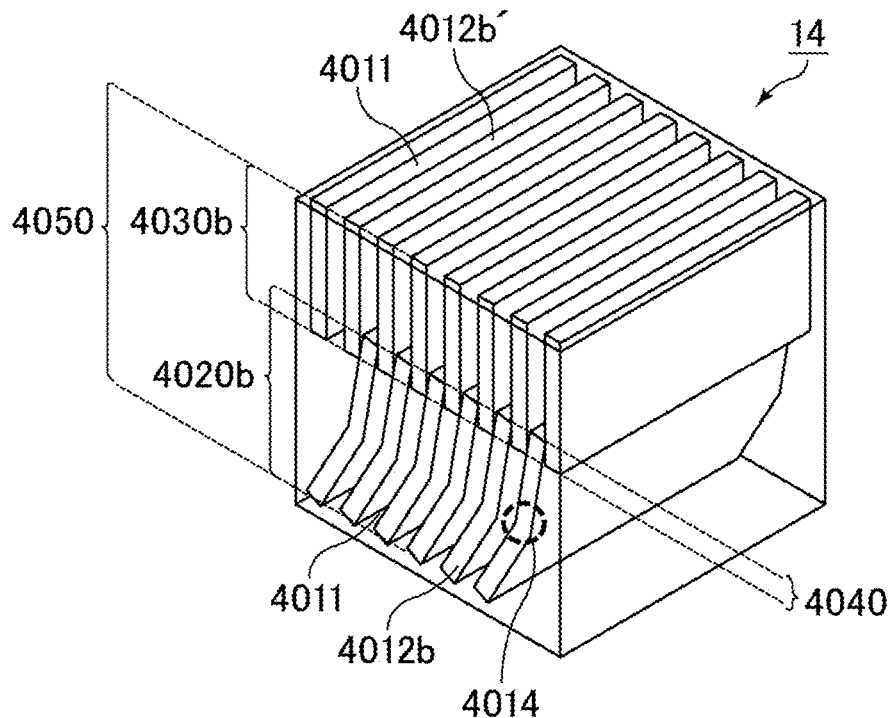
FIG. 13A is another example of a schematic cross-sectional view of the anisotropic light diffusion film in the liquid crystal display device of Modified Example 3.
Figure 13B:
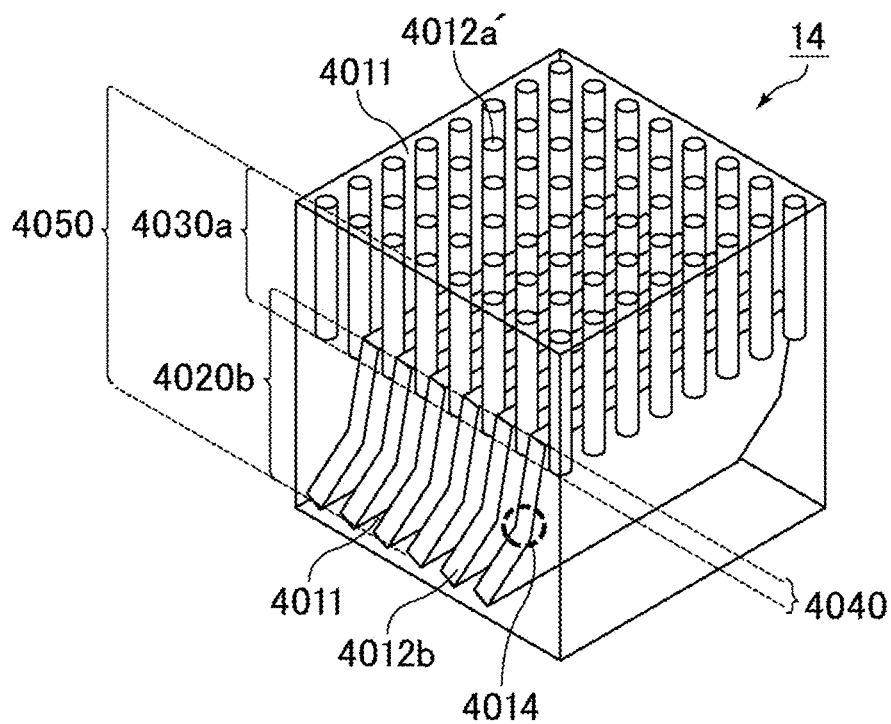
FIG. 13B is yet another example of a schematic cross-sectional view of the anisotropic light diffusion film in the liquid crystal display device of Modified Example 3.

FIG. 13A and FIG. 13B are other examples of a schematic cross-sectional view of the anisotropic light diffusion film in the liquid crystal display device of Modified Example 3. In FIG. 11A, FIG. 11B, and FIG. 12, the anisotropic light diffusion film 14 was described based on the example in which the first and second internal structures are both columnar structures, but the first and second internal structures are not limited to this example. Specifically, possible modes include a mode in which the first and second internal structures are louver structures (4020b, 4030b) as shown in FIG. 13A, a mode in which the first internal structure is the louver structure 4020b and the second internal structure is the columnar structure 4030a as shown in FIG. 13B, and a mode in which the first internal structure is the columnar structure 4020a and the second internal structure is the louver structure 4030b.

The columnar structure isotropically diffuses incident light (diffuses light such that the planar shape of the diffused light is substantially circular), while the louver structure anisotropically diffuses incident light (diffuses light such that the planar shape of the diffused light is linear).

As shown in FIG. 10A and FIG. 10B, the second liquid crystal panel 12 of the present embodiment may include, sequentially from its back surface side toward its viewing surface side, the third support substrate 610, the liquid crystal layer 800, the fourth support substrate 910, and an anisotropic light reflection film 15 that has a function to transmit light in a front view and reflect light in an oblique view. This mode can increase the recycling efficiency of light from the backlight 50 and further increase the luminance of the liquid crystal display device 1.

Examples of the anisotropic light reflection film 15 include dielectric multilayer mirrors and luminance increasing films.

A dielectric multilayer mirror has a structure in which layers of a dielectric material having a high refractive index and layers of a dielectric material having a low refractive index are alternately stacked on a substrate. Examples of the dielectric materials having a high refractive index include $TiO_2$. Examples of the dielectric materials having a low refractive index include $SiO_2$. The dielectric multilayer mirror has a structure in which, for example, layers of a dielectric material having a high refractive index and layers of a dielectric material having a low refractive index are stacked alternately in several to several tens of layers. Non-limiting examples of the substrate include substrates transparent to light, such as glass substrates. Examples of the dielectric multilayer mirror include PICASUS® available from Toray Industries, Inc.

The luminance increasing film is an optical component that transmits light polarized in a certain direction (light vibrating in the certain direction) and reflects light polarized in the other directions. Examples of the luminance increasing film include DBEF® available from 3M Company.

As shown in FIG. 10A and FIG. 10B, the liquid crystal display device 1 may include a first mirror 61X on the viewing surface side of the second liquid crystal panel 12 and near the first light source 31X, and a second mirror 61Y on the viewing surface side of the second liquid crystal panel 12 and near the second light source 31Y. This mode uses the anisotropic light reflection film 15 to reflect light from the first light source 31X and light from the second light source 31Y toward the viewing surface side for recycling, and thus can increase the light use efficiency.

The first mirror 61X and the second mirror 61Y may each be any component having a reflection function. The first mirror 61X and the second mirror 61Y each have a width of, for example, 1 cm.

As shown in FIG. 10C and FIG. 10D, the liquid crystal display device 1 may further include a third mirror 62X disposed on the viewing surface side of the first light source 31X, a fourth mirror 62Y disposed on the viewing surface side of the second light source 31Y, a fifth mirror 63X disposed on the back surface side of the first back surface side light source 32X, and a sixth mirror 63Y disposed on the back surface side of the second back surface side light source 32Y. This mode enables easier collection of light from the first light source 31X, light from the second light source 31Y, light from the first back surface side light source 32X, and light from the second back surface side light source 32Y to the central portion of the first liquid crystal panel 11.

The third mirror 62X, the fourth mirror 62Y, the fifth mirror 63X, and the sixth mirror 63Y may each be any component that has a reflection function.

As shown in FIG. 10C and FIG. 10D, the liquid crystal display device 1 may include a first anisotropic light reflection film 70X disposed between the third mirror 62X and the fifth mirror 63X to receive light from the first light source 31X and light from the first back surface side light source 32X, and a second anisotropic light reflection film 70Y disposed between the fourth mirror 62Y and the sixth mirror 63Y to receive light from the second light source 31Y and light from the second back surface side light source 32Y. This mode can make an LED bulb less observable from the viewing surface side when at least one of the first light source 31X, the second light source 31Y, the first back surface side light source 32X, or the second back surface side light source 32Y includes an LED.

Examples of the first anisotropic light reflection film 70X and the second anisotropic light reflection film 70Y include luminance increasing films. Examples of the luminance increasing films include those mentioned above.

EXAMPLES

Hereinafter, the present invention is described in more detail based on examples and comparative example. The present invention is not limited to these examples.

Example 1-1

The liquid crystal display device of Embodiment 1 shown in FIG. 1 was produced as a liquid crystal display device of Example 1-1.

First, the first liquid crystal panel 11 in the liquid crystal display device of Example 1-1 is described. The first substrate 100 including the pixel electrodes 120 formed from ITO and the second substrate 200 including the common electrode 220 formed from ITO were prepared. The surfaces of the pixel electrodes 120 remote from the first support substrate 110 and the surface of the common electrode 220 remote from the second support substrate 210 each were coated with an alignment film material containing a polymer capable of undergoing photoisomerization, and then subjected to photoalignment treatment such that the first alignment film 410 and the second alignment film 420 were formed. The photoalignment treatment for the first alignment film 410 and the second alignment film 420 was performed such that they would provide antiparallel alignment.

The first substrate 100 and the second substrate 200 were then disposed such that the first alignment film 410 and the second alignment film 420 faced each other. Between the first substrate 100 and the second substrate 200 was injected a composition (polymer dispersed liquid crystal material) containing 90.6 wt % host liquid crystal (liquid crystal components 320), i.e., positive liquid crystal; 8.96 wt % photopolymerizable liquid crystal compound (monomer); and 0.448 wt % polymerization initiator. The liquid crystal components 320 were a liquid crystal compound having a Δn of 0.18, a Δε of +20, and a rotational viscosity γ1 of 206 mPa·s. The photopolymerizable liquid crystal compound was a monomer containing a mesogen group, a photoreactive group, and an acrylate group. The polymerization initiator was OXE03 (available from BASF SE).

The polymer dispersed liquid crystal material was irradiated with ultraviolet (UV) light with a light irradiation intensity of 50 mW/cm$^2$, a light irradiation dose of 2 J/cm$^2$, and a dominant wavelength of 365 nm (i.e., 40-second irradiation) to polymerize the monomer, so that the polymer dispersed liquid crystal 300 was formed between the first substrate 100 and the second substrate 200. Thus, the first liquid crystal panel 11 having a cell thickness of 3 μm was produced. The first liquid crystal panel 11 did not include a black matrix layer or a color filter layer.

The second liquid crystal panel 12 in the liquid crystal display device 1 of Example 1-1 was an existing VA mode liquid crystal panel in which polarizing plates were disposed in crossed Nicols. As in the existing technique, the backlight 50 including a light guide plate and an LED light source on an edge surface of the light guide plate was disposed on the back surface side of the second liquid crystal panel 12.

The first light source 31X and the second light source 31Y each were a rod-like light source in which the red LEDs 31R were arranged in a straight line, the green LEDs 31G were arranged in a straight line, and the blue LEDs 31B were arranged in a straight line. The first light source 31X and the second light source 31Y were driven based on the FSC system for color display.

In Example 1-1, the length and angle of each portion in FIG. 1 were set as follows.

$h11=h12=8$ cm $a=20$ cm $b=10$ cm $θ11=θ12=68°$

The first liquid crystal panel 11 in the liquid crystal display device of Example 1-1 produced as described above was a reverse mode liquid crystal panel that operated in the transparent state with no voltage applied and shifted into the scattering state with voltage applied. Also in Example 1-1, substitution resulted in $1≤8≤\{20/\tan 68°\}≈8.08$, meaning that the liquid crystal display device satisfied the (formula 1-1) and (formula 1-2).

Example 1-2

Figure 14:
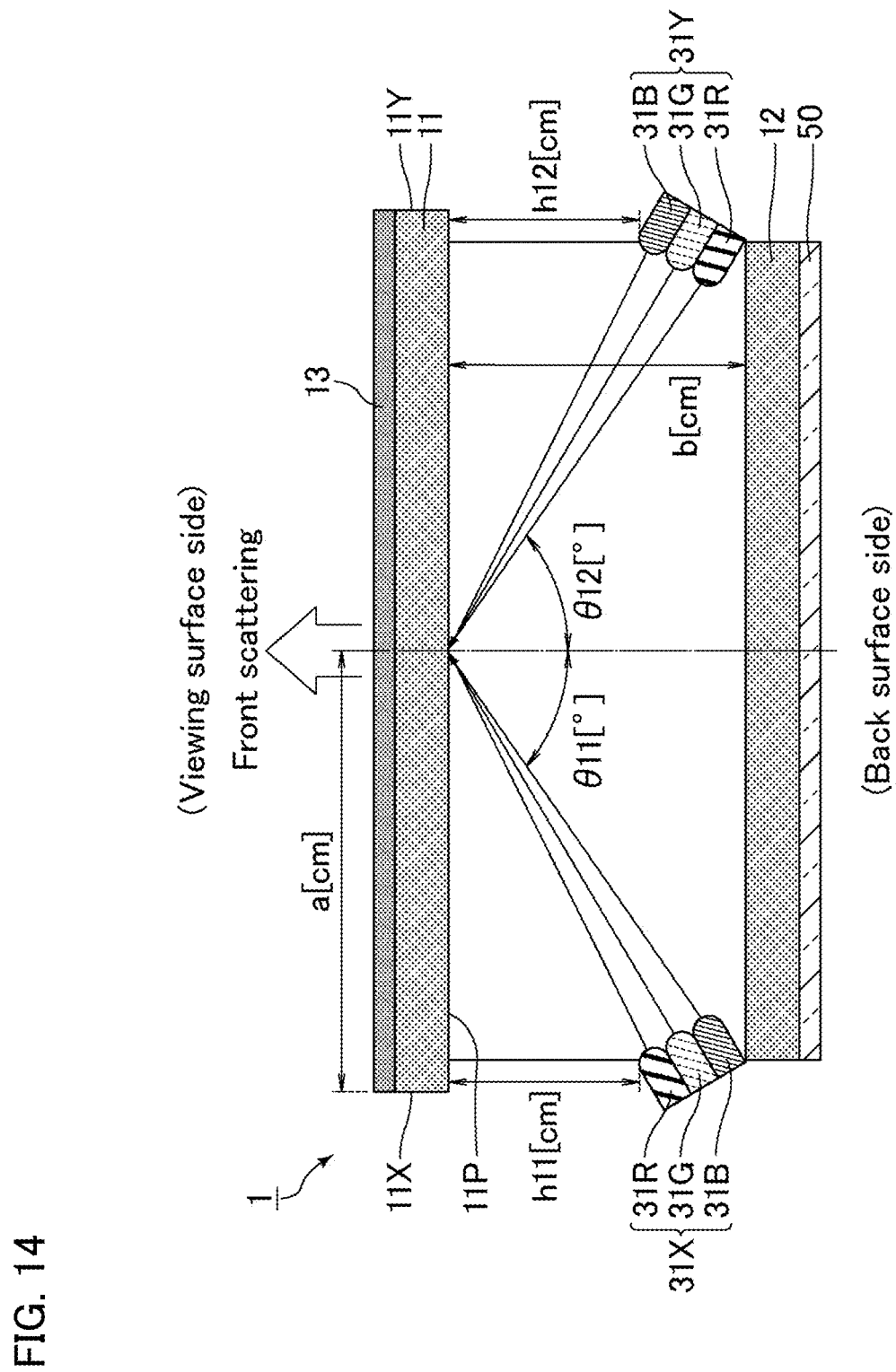
FIG. 14 is a schematic cross-sectional view of a liquid crystal display device of Example 1-2.
Figure 15A:
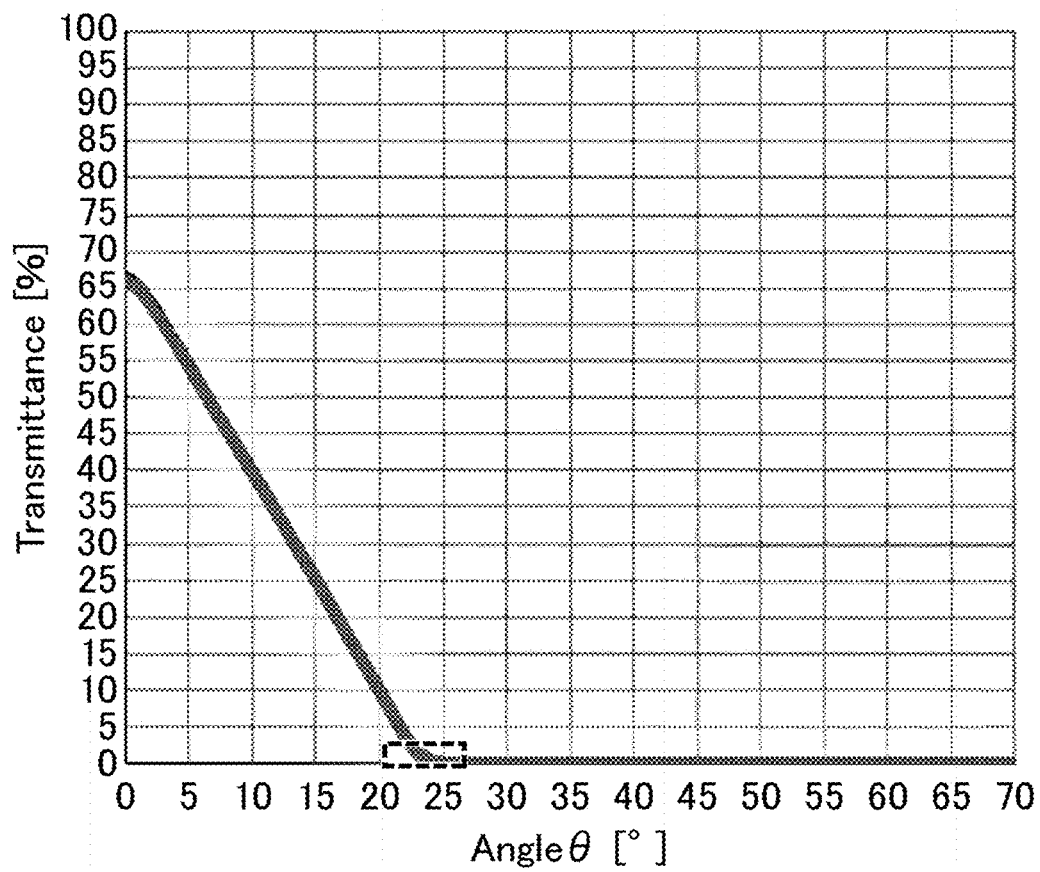
FIG. 15A is a graph of angle dependence of the transmittance of a light-shielding louver sheet in the liquid crystal display device of Example 1-2.
Figure 15B:
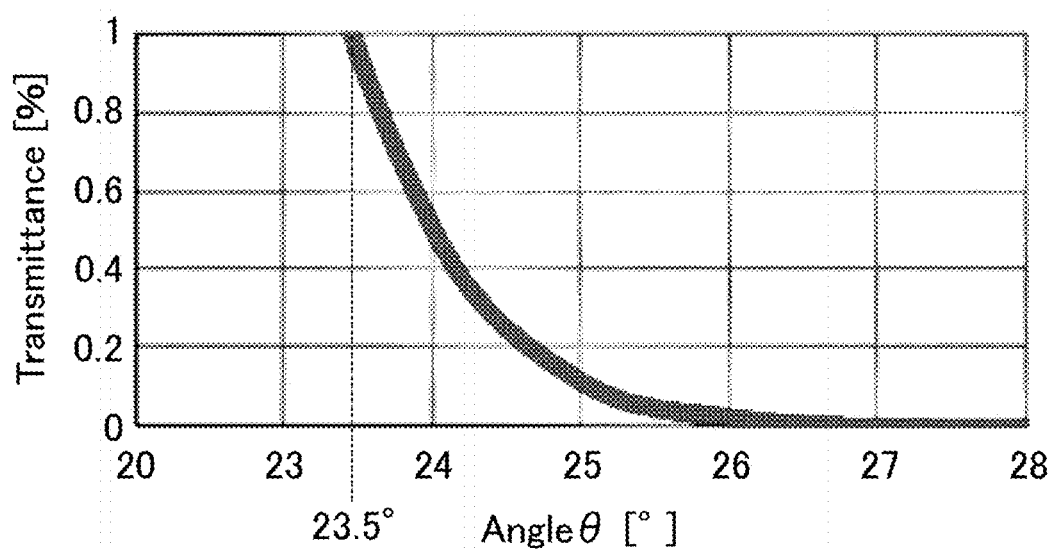
FIG. 15B is an enlarged view of a region surrounded by the rectangle in the graph of FIG. 15A.
Figure 15C:
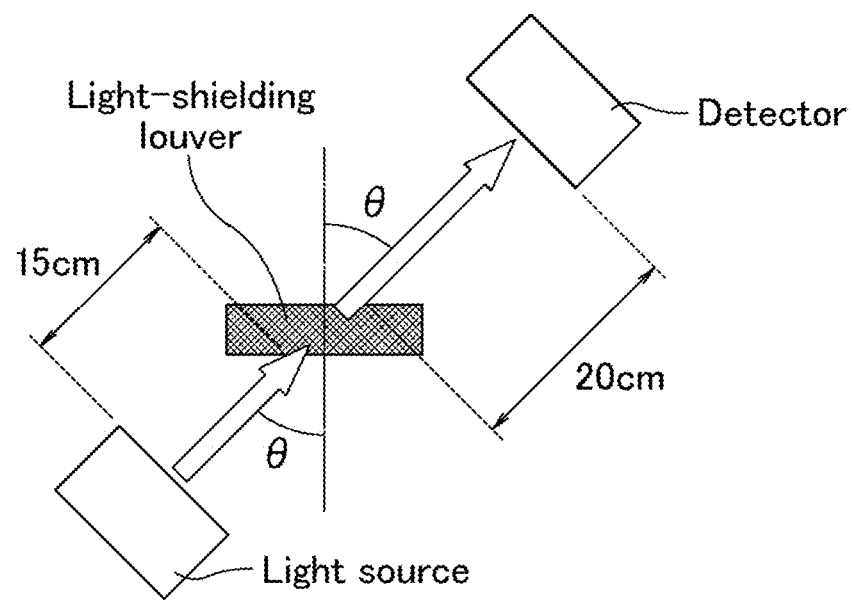
FIG. 15C is a schematic view showing a method of determining the angle dependence of the transmittance of the light-shielding louver sheet in the liquid crystal display device of Example 1-2.

FIG. 14 is a schematic cross-sectional view of a liquid crystal display device of Example 1-2. FIG. 15A is a graph of angle dependence of the transmittance of a light-shielding louver sheet in the liquid crystal display device of Example 1-2. FIG. 15B is an enlarged view of a region surrounded by the rectangle in the graph of FIG. 15A. FIG. 15C is a schematic view showing a method of determining the angle dependence of the transmittance of the light-shielding louver sheet in the liquid crystal display device of Example 1-2.

The liquid crystal display device of Example 1-2 as shown in FIG. 14 was produced as in Example 1-1, except that a light-shielding louver sheet available from Shin-Etsu Polymer Co., Ltd. having the angle dependence of transmittance shown in FIG. 15A and FIG. 15B was disposed as the light-shielding louver 13 on the viewing surface side of the first liquid crystal panel 11. The light-shielding louver sheet included the light-shielding layers 1311 at a pitch P of 0.100 mm, a viewing angle of 48°, and a maximum light transmittance angle of 0°. The paired transparent films 132 each were a 0.2-mm-thick PC film. The light-shielding louver sheet had a thickness of 0.79 mm.

Herein, the angle dependence of the transmittance of the light-shielding louver (for example, the light-shielding louver sheet) was determined by the method shown in FIG. 15C with the panel/module evaluation system LCD-5200 (available from Otsuka Electronics Co., Ltd.). Specifically, the panel/module evaluation system LCD-5200 was used to measure the luminance at each angle θ when the light-shielding louver was disposed as shown in FIG. 15C, and the luminance at an angle θ of 0° when no light-shielding louver was disposed. The luminance at each angle θ when the light-shielding louver was disposed was divided by the luminance at an angle θ of 0° when no light-shielding louver was disposed to determine the transmittance at each angle θ. The light source used to measure the luminance was a halogen lamp. The measurement wavelength was set to about 550 nm, and the acceptance angle was about 2°. The light-shielding louver sheet used in Example 1-2 had a transmittance of lower than 1% at an angle θ of 23.5°, exhibiting a high light-shielding capability.

Example 1-3

Figure 16:
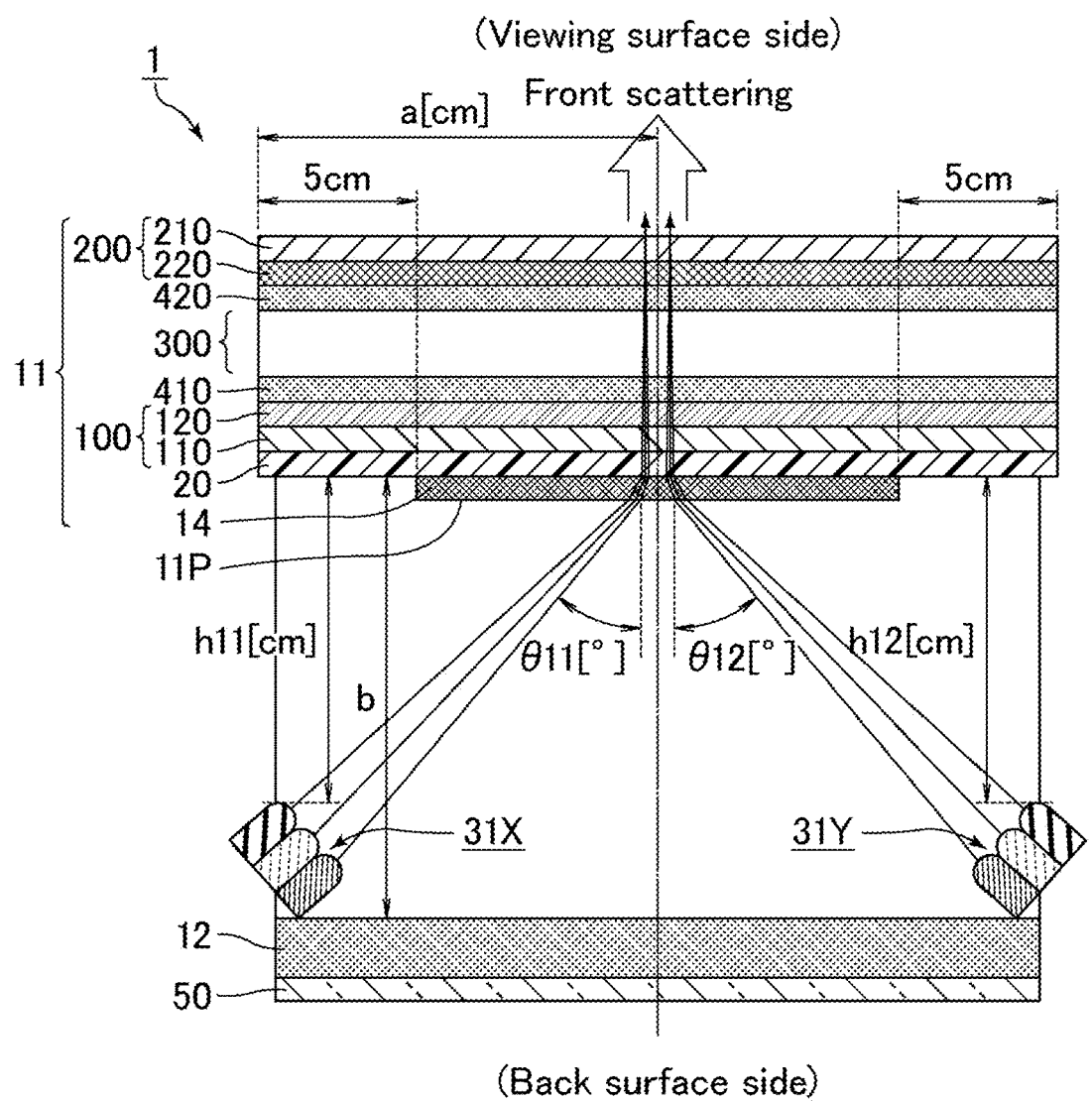
FIG. 16 is a schematic cross-sectional view of a liquid crystal display device of Example 1-3.
Figure 17:
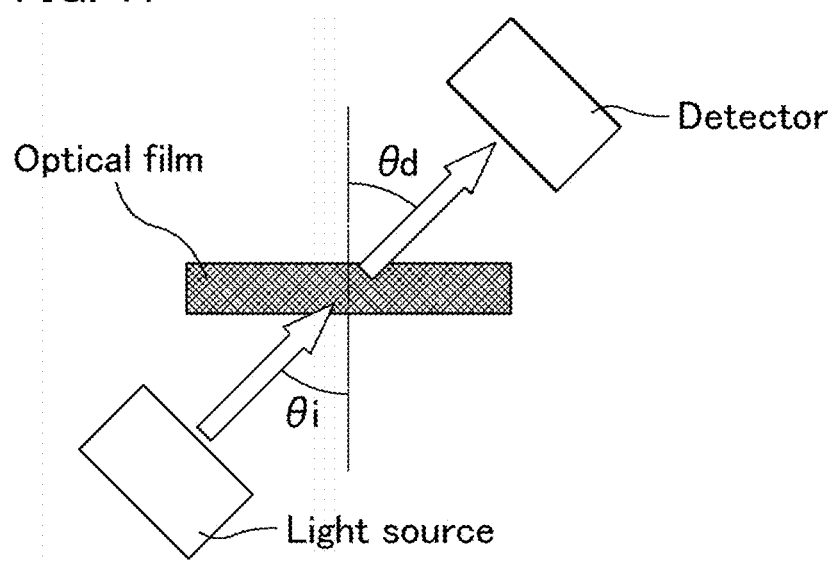
FIG. 17 is a schematic view showing a method of determining the angle dependence of the transmittance of an optical film.

FIG. 16 is a schematic cross-sectional view of a liquid crystal display device of Example 1-3. FIG. 17 is a schematic view showing a method of determining the angle dependence of the transmittance of an optical film. The liquid crystal display device 1 of Example 1-3 shown in FIG. 16 was produced as in Example 1-1, except that the first liquid crystal panel 11 included the anisotropic light diffusion film 14 on the back surface side of the first support substrate 110.

In Example 1-3, the anisotropic light diffusion film 14 was an anisotropic light diffusion film 1-a having the optical characteristics shown in the following Table 1. The following Table 1 shows the angle dependence of the transmittance of the anisotropic light diffusion film 1-a.

Herein, the angle dependence of the transmittance of an optical film such as an anisotropic light diffusion film or an anisotropic light reflection film was determined by the method shown in FIG. 17 with the panel/module evaluation system LCD-5200 (available from Otsuka Electronics Co., Ltd.). Specifically, the panel/module evaluation system LCD-5200 was used to measure the luminance at each angle θi (=θd) when the optical film was disposed as shown in FIG. 17. The luminance at each angle θi (=θd) was divided by the luminance at θi=θd=0° to determine the transmittance at each angle θi (=θd). In other words, the transmittance at each angle was calculated, with the transmittance at an angle of 0° taken as 100%. The light source used to measure the luminance was a halogen lamp. The measurement wavelength was set to about 550 nm and the acceptance angle was about 2°. FIG. 17 shows the case where the optical film is the anisotropic light diffusion film or the anisotropic light reflection film.

TABLE 1

| Angle | Transmittance |
|---|---|
| 0° | 100% |
| ±15° | 95% |
| ±30° | 31 to 36% |
| ±40° | 3.1 to 3.3% |
| ±45° | 3.1 to 3.5% |
| ±50° | 2.9 to 3.3% |
| ±60° | 1.3 to 1.4% |

Example 1-4

Figure 18:
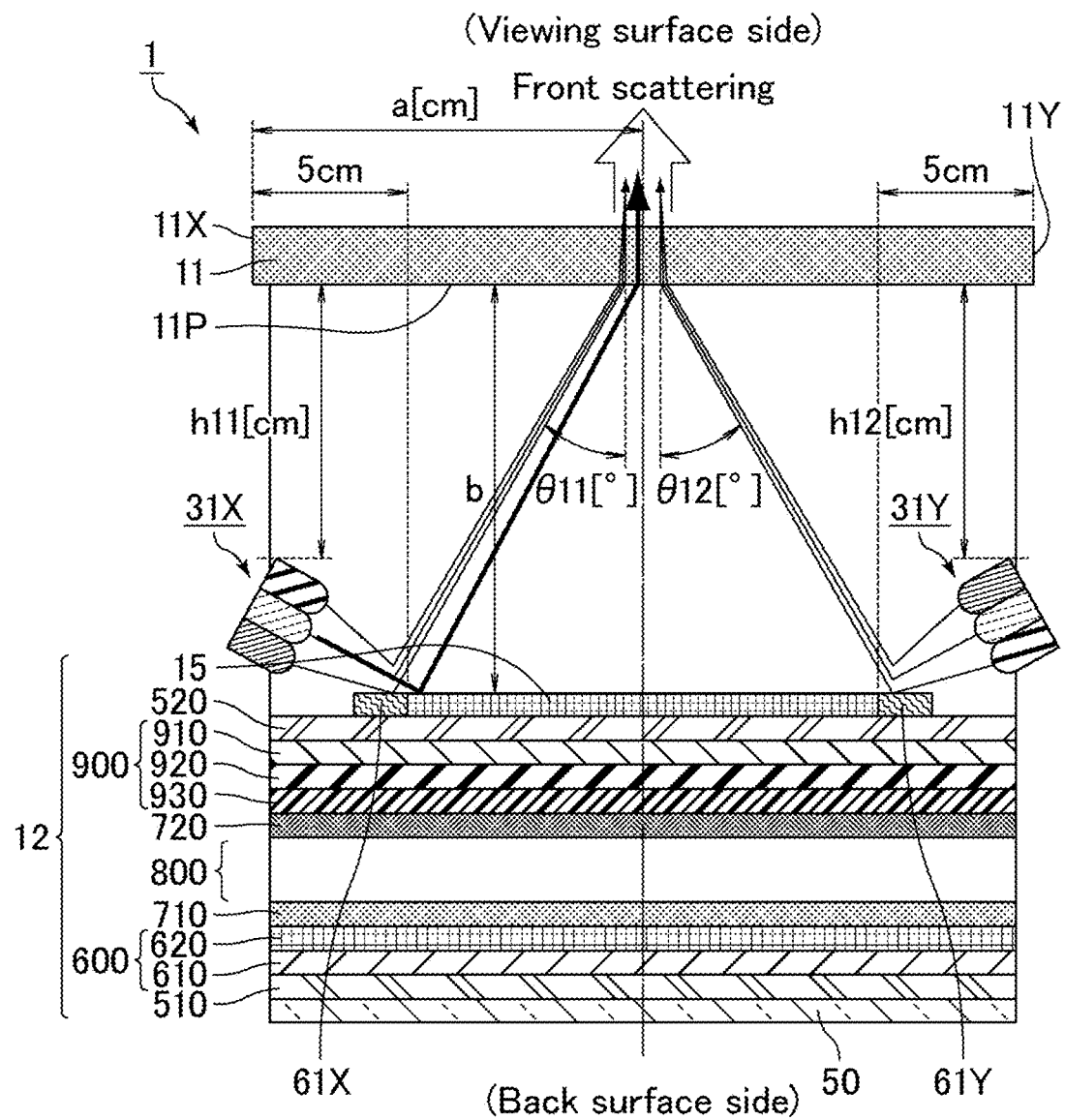
FIG. 18 is a schematic cross-sectional view of a liquid crystal display device of Example 1-4.

FIG. 18 is a schematic cross-sectional view of a liquid crystal display device of Example 1-4. The liquid crystal display device 1 of Example 1-4 shown in FIG. 18 was produced as in Example 1-1, except that the second liquid crystal panel 12 included the anisotropic light reflection film 15 on the viewing surface side of the fourth support substrate 910, the first mirror 61X and the second mirror 61Y were disposed at the respective ends of the anisotropic light reflection film 15, light from the first light source 31X and light from the second light source 31Y were emitted toward the back surface side, and θ11=θ12=75°.

In Example 1-4, the anisotropic light reflection film 15 was the anisotropic light reflection film having the optical characteristics shown in the following Table 2. The following Table 2 shows the angle dependence of transmittance of the anisotropic light reflection film.

TABLE 2

| Angle | Transmittance |
|---|---|
| 0° | 100% |
| ±15° | 98 to 99% |
| ±30° | 93 to 94% |
| ±40° | 87 to 88% |
| ±45° | 82 to 83% |
| ±50° | 76 to 77% |
| ±60° | 63 to 64% |

In Example 1-4, substitution resulted in $1 \leq 4 \leq \{20/\tan 75°\} \approx 5.36$, meaning that the liquid crystal display device satisfied (formula 1-1) and (formula 1-2).

Example 1-5

Figure 19:
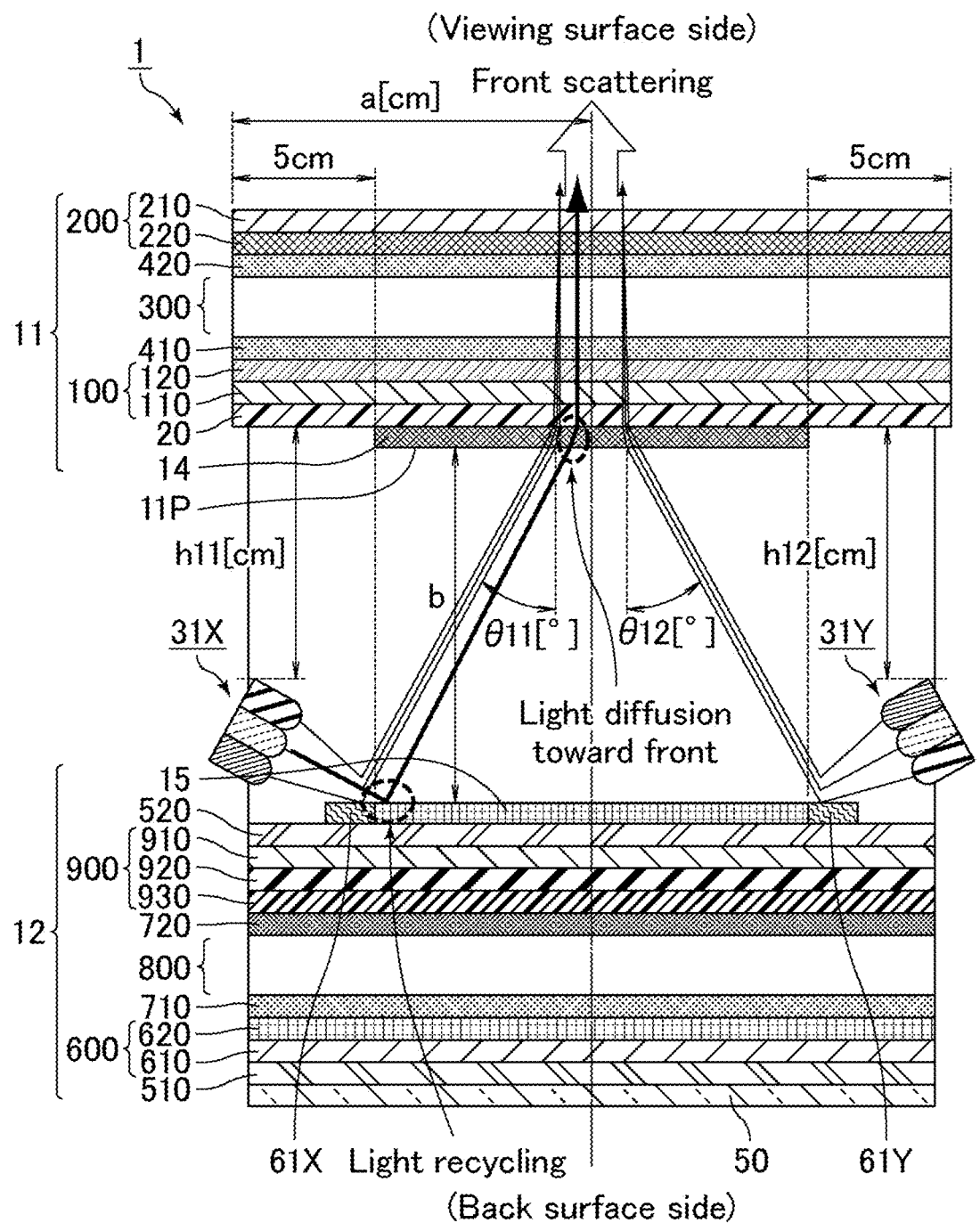
FIG. 19 is a schematic cross-sectional view of a liquid crystal display device of Example 1-5.

FIG. 19 is a schematic cross-sectional view of a liquid crystal display device of Example 1-5. The liquid crystal display device 1 of Example 1-5 shown in FIG. 19 was produced as in Example 1-1, except that the first liquid crystal panel 11 included the anisotropic light diffusion film 14 on the back surface side of the first support substrate 110 and the second liquid crystal panel 12 included the anisotropic light reflection film 15 on the viewing surface side of the fourth support substrate 910, the first mirror 61X and the second mirror 61Y at the respective ends of the anisotropic light reflection film 15, light from the first light source 31X and light from the second light source 31Y were emitted toward the back surface side, h11=h12=4 cm, b=5 cm, and θ11=θ12=75°.

In Example 1-5, the anisotropic light diffusion film 14 was the anisotropic light diffusion film 1-a, and the anisotropic light reflection film 15 was the anisotropic light reflection film having the optical characteristics shown in Table 2.

In Example 1-5, substitution resulted in $1 \leq 4 \leq \{20/\tan 75°\} \approx 5.36$ cm, meaning that the liquid crystal display device satisfied (formula 1-1) and (formula 1-2).

Example 1-6

The liquid crystal display device 1 of Example 1-6 was produced as in Example 1-5, except that h11=h12=8 cm, b=10 cm, and θ11=θ12=68°.

In Example 1-6, substitution resulted in $1 \leq 8 \leq \{20/\tan 68°\} \approx 8.08$, meaning that the liquid crystal display device satisfied (formula 1-1) and (formula 1-2).

Example 2-1

Figure 20:
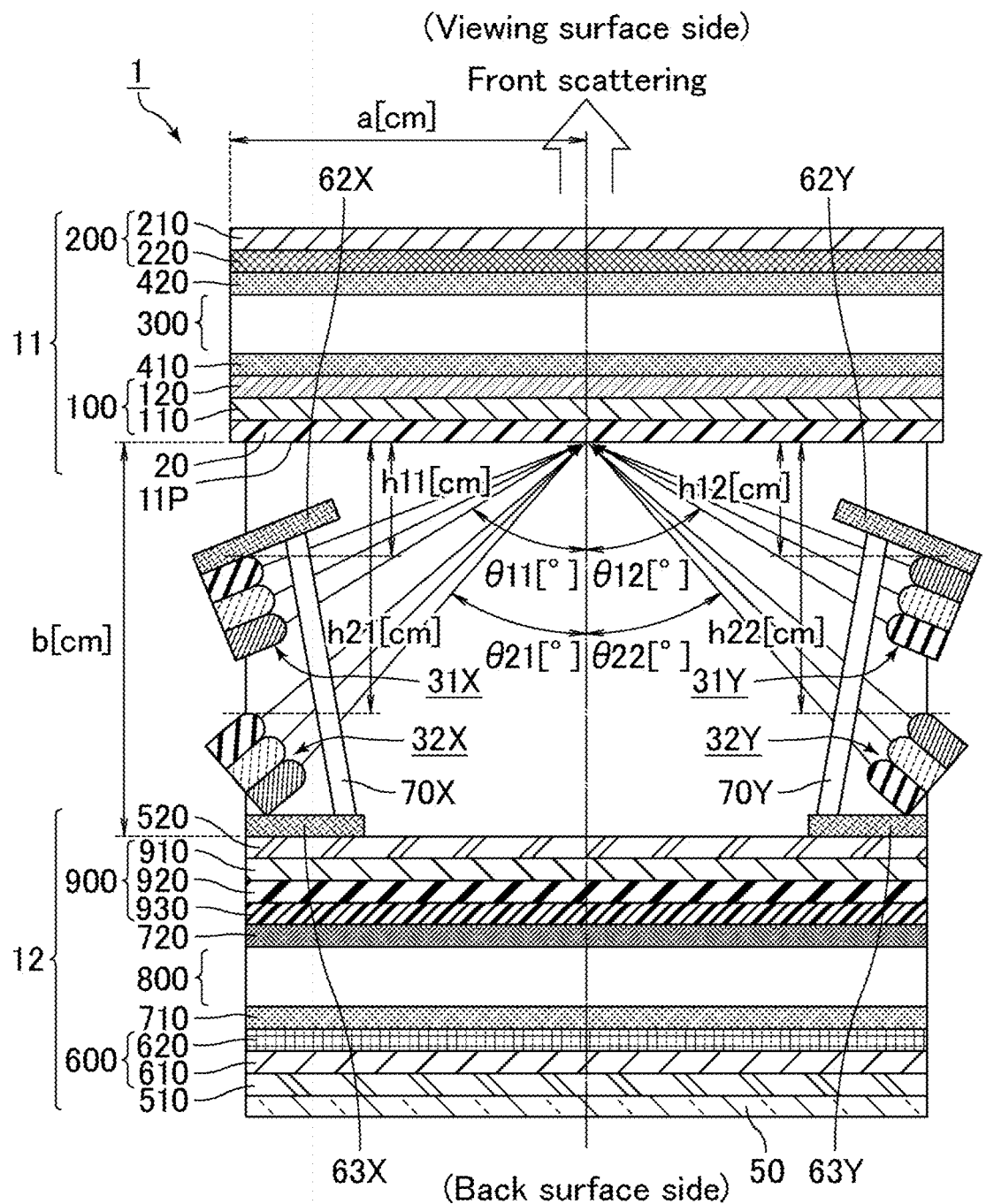
FIG. 20 is a schematic cross-sectional view of a liquid crystal display device of Example 2-1.

FIG. 20 is a schematic cross-sectional view of a liquid crystal display device of Example 2-1. The liquid crystal display device 1 of Example 2-1 shown in FIG. 20 had the same structure as that of Example 1-1, except that the first back surface side light source 32X and the second back surface side light source 32Y were used. The angles were θ21=θ22=57°.

In Example 2-1, substitution resulted in $1 \leq 8 \leq \{20/\tan 68°\} \approx 8.08$ cm, meaning that the liquid crystal display device satisfied (formula 1-1) and (formula 1-2), and θ11−θ21=θ12−θ22=68°−57°=11°>10°, meaning that the liquid crystal display device satisfied (formula 2-1) and (formula 2-2).

Example 2-2

Figure 21:
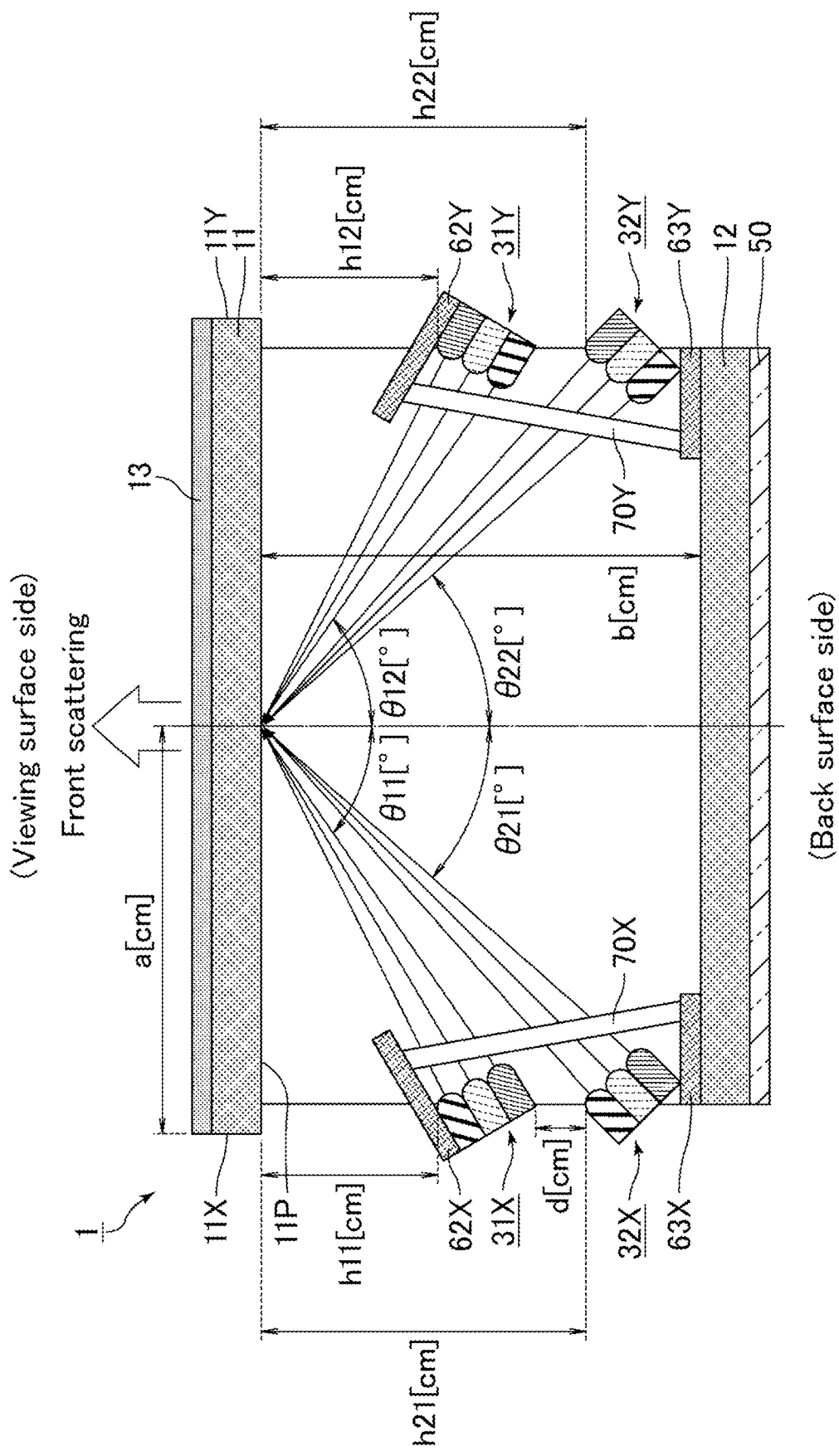
FIG. 21 is a schematic cross-sectional view of a liquid crystal display device of Example 2-2.

FIG. 21 is a schematic cross-sectional view of a liquid crystal display device of Example 2-2. The liquid crystal display device of Example 2-2 shown in FIG. 21 was produced as in Example 2-1, except that the light-shielding louver 13 same as the one used in Example 1-2 was disposed on the viewing surface side of the first liquid crystal panel 11.

Example 2-3

The liquid crystal display device 1 of Example 2-3 was produced as in Example 2-1, except that the first liquid crystal panel 11 included the anisotropic light diffusion film 14 on the back surface side of the first support substrate 110 as shown in FIG. 10C. In Example 2-3, the anisotropic light diffusion film 14 was the anisotropic light diffusion film 1-a.

Example 2-4

The liquid crystal display device 1 of Example 2-4 was produced as in Example 2-1, except that the first liquid crystal panel 11 included the anisotropic light diffusion film 14 on the viewing surface side of the second support substrate 210 as shown in FIG. 10D. In Example 2-4, the anisotropic light diffusion film 14 was the anisotropic light diffusion film 1-a.

Example 2-5

The liquid crystal display device 1 of Example 2-5 was produced as in Example 2-1, except that the first liquid crystal panel 11 included the anisotropic light diffusion film 14 on the back surface side of the first support substrate 110 as shown in FIG. 10C. In Example 2-5, the anisotropic light diffusion film 14 was an anisotropic light diffusion film 1-b having the optical characteristics shown in the following Table 3. The following Table 3 shows the angle dependence of the transmittance of the anisotropic light diffusion film 1-b.

TABLE 3

| Angle | Transmittance |
|---|---|
| 0° | 100% |
| ±15° | 97 to 98% |
| ±30° | 72 to 89% |
| ±40° | 8 to 13% |
| ±45° | 3.1 to 3.6% |
| ±50° | 3.4% |
| ±60° | 1.7 to 2.2% |

Example 2-6

The liquid crystal display device 1 of Example 2-6 was produced as in Example 2-1, except that the first liquid crystal panel 11 included the anisotropic light diffusion film 14 on the viewing surface side of the second support substrate 210 as shown in FIG. 10D. In Example 2-6, the anisotropic light diffusion film 14 was the anisotropic light diffusion film 1-b.

Example 2-7

As shown in FIG. 10C, the liquid crystal display device 1 of Example 2-7 was produced as in Example 2-1, except that in the first liquid crystal panel 11, the anisotropic light diffusion film 14 was disposed on the back surface side of the first support substrate 110. In Example 2-7, the anisotropic light diffusion film 14 was the anisotropic light diffusion film 1-c having the optical characteristics shown in the following Table 4. The following Table 4 shows the angle dependence of transmittance of the anisotropic light diffusion film 1-c.

TABLE 4

| Angle | Transmittance |
| --- | --- |
| −60° | 1.7% |
| −50° | 3.0% |
| −45° | 4.2% |
| −40° | 3.7% |
| −30° | 21% |
| −15° | 92% |
| 0° | 100% |
| +15° | 100% |
| +30° | 98% |
| +40° | 95% |
| +45° | 93% |
| +50° | 90% |
| +60° | 81% |

Example 2-8

The liquid crystal display device 1 of Example 2-8 was produced as in Example 2-1, except that the first liquid crystal panel 11 included the anisotropic light diffusion film 14 on the viewing surface side of the second support substrate 210 as shown in FIG. 10D. In Example 2-8, the anisotropic light diffusion film 14 was the anisotropic light diffusion film 1-c.

Example 2-9

The liquid crystal display device 1 of Example 2-9 was produced as in Example 2-1, except that the first liquid crystal panel 11 included the anisotropic light diffusion film 14 on the back surface side of the first support substrate 110 as shown in FIG. 10C. In Example 2-9, the anisotropic light diffusion film 14 was an anisotropic light diffusion film 1-d having the optical characteristics shown in the following Table 5. The following Table 5 shows the angle dependence of the transmittance of the anisotropic light diffusion film 1-d.

TABLE 5

| Angle | Transmittance |
| --- | --- |
| −60° | 2.3% |
| −50° | 3.5% |
| −45° | 3.7% |
| −40° | 13% |
| −30° | 79% |
| −15° | 98% |
| 0° | 100% |
| +15° | 100% |
| +30° | 98% |
| +40° | 95% |
| +45° | 93% |
| +50° | 90% |
| +60° | 81% |

Example 2-10

The liquid crystal display device 1 of Example 2-10 was produced as in Example 2-1, except that the first liquid crystal panel 11 included the anisotropic light diffusion film 14 on the viewing surface side of the second support substrate 210 as shown in FIG. 10D. In Example 2-10, the anisotropic light diffusion film 14 was the anisotropic light diffusion film 1-d.

Example 2-11

The liquid crystal display device 1 of Example 2-11 was produced as in Example 2-1, except that the second liquid crystal panel 12 included the anisotropic light reflection film 15 on the viewing surface side of the fourth support substrate 910. In Example 2-11, the anisotropic light reflection film 15 was the anisotropic light reflection film having the optical characteristics shown in Table 2.

Example 2-12

The liquid crystal display device 1 of Example 2-12 was produced as in Example 2-1, except that the first liquid crystal panel 11 included the anisotropic light diffusion film 14 on the back surface side of the first support substrate 110 and the second liquid crystal panel 12 included the anisotropic light reflection film 15 on the viewing surface side of the fourth support substrate 910.

In Example 2-12, the anisotropic light diffusion film 14 was the anisotropic light diffusion film 1-a, and the anisotropic light reflection film 15 was the anisotropic light reflection film having the optical characteristics shown in Table 2.

Comparative Example 1

Figure 22:
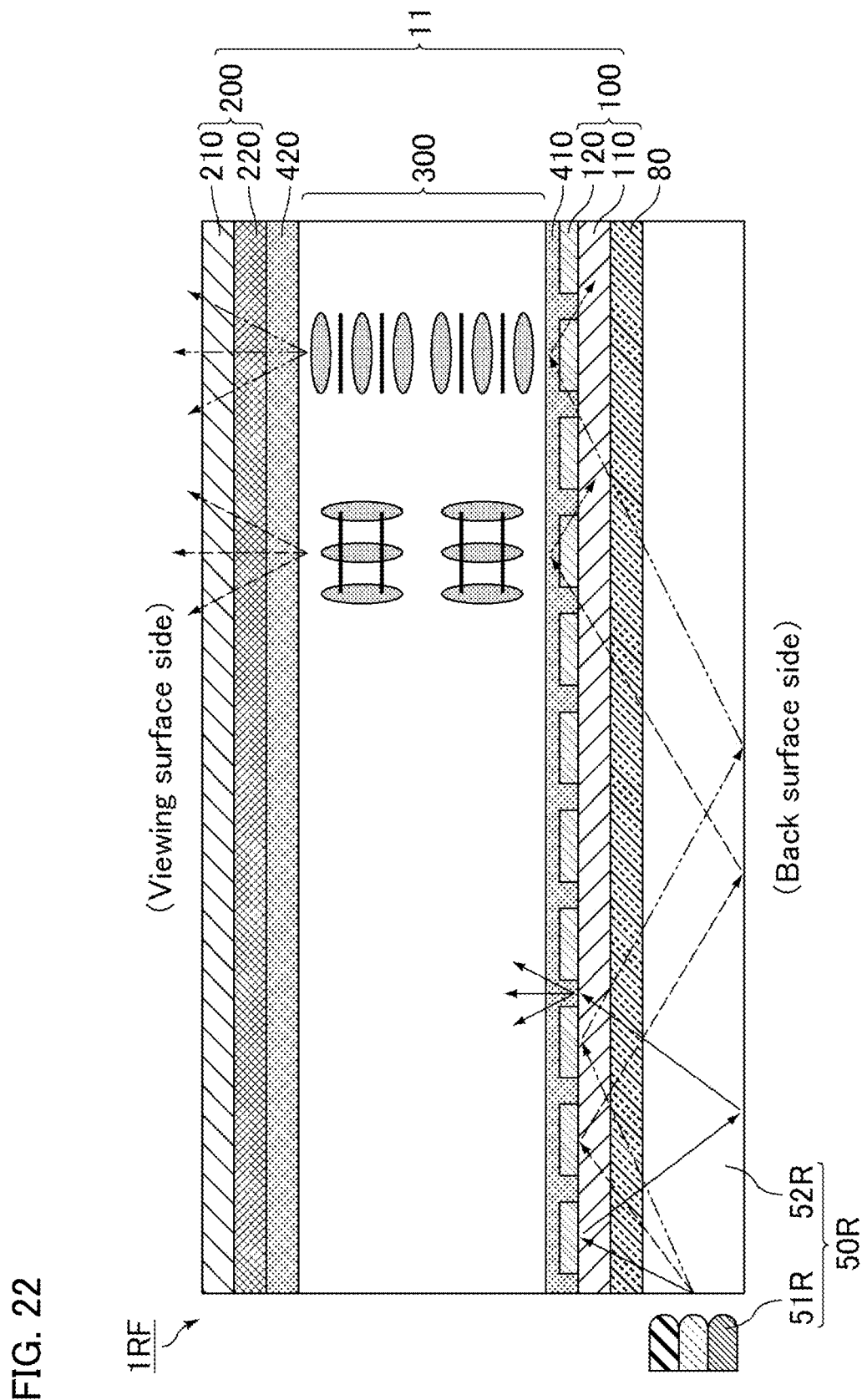
FIG. 22 is a schematic cross-sectional view of a liquid crystal display device of Comparative Example 1.

FIG. 22 is a schematic cross-sectional view of a liquid crystal display device of Comparative Example 1. A liquid crystal display device 1RF of Comparative Example 1 was produced by disposing a backlight 50R on the back surface side of the first liquid crystal panel 11 produced as in Example 1-1 with an adhesive component 80 such as OCA. The backlight 50R included the LED light source 51R on the edge surface of the light guide plate 52R.

(Evaluation of Examples and Comparative Example)

The transmittance in the transparent state, the front luminance of the panel central portion in the scattering state, the front contrast ratio of the panel central portion, and how the LED bulbs were observed in an oblique view were evaluated in each of the examples and the comparative example. The following Table 6 shows the results.

The evaluations were performed as follows.

<Transmittance in Transparent State>

The luminance was measured with the spectroradiometer (SR-UL1) available from Topcon Technohouse Corporation when the 19-inch first liquid crystal panel of each of the examples and comparative example with no voltage applied was placed on a common backlight (light source for liquid crystal display devices) and when nothing was placed on the backlight. The luminance measured when the first liquid crystal panel with no voltage applied was placed on the backlight was divided by the luminance measured when nothing was placed on the backlight, so that the transmittance in the transparent state was determined. In the luminance measurement, the light source was a halogen lamp, the acceptance angle was 2°, and the measurement wavelength was about 550 nm.

<Front Luminance of Panel Central Portion in Scattering State and Front Contrast Ratio of Panel Central Portion>

The 19-inch first liquid crystal panel of each of the examples and comparative example was placed on a common backlight (light source for liquid crystal display devices), and the distance between the first liquid crystal panel and the spectroradiometer available from Topcon Technohouse Corporation was set to about 50 cm, so that the luminance (white luminance) in the scattering state and the luminance in the transparent state were measured in a dark room. The luminance in the scattering state was taken as the front luminance of the panel central portion in the scattering state. The luminance in the scattering state was divided by the luminance in the transparent state to determine the front contrast ratio of the panel central portion. In luminance measurement, the light source was a halogen lamp, the acceptance angle was 2°, and the measurement wavelength was about 550 nm.

<LED Bulb Appearance in Oblique View>

The appearance was determined by subjective evaluation of whether or not bright lines of the red LEDs 31R, the green LEDs 31G, and the blue LEDs 31B were visually observed.

TABLE 6

| Light source irradiation system | Light source | Structure Light-shielding louver | Anisotropic light diffusion film | Anisotropic light reflection film | Example/ Comparative Example | Effect Transmittance in transparent state |
|---|---|---|---|---|---|---|
| Oblique light incidence system | First light source and second light source (one pair, two rod-like light sources in total) | — | — | — | Example 1-1 | A (65%) |
| | | Included | — | — | Example 1-2 | B (50%) |
| | | — | Included | — | Example 1-3 | A (60%) |
| | | — | — | Included | Example 1-4 | A (65%) |
| | | — | Included | Included | Example 1-5 | A (60%) |
| | | — | Included | Included | Example 1-6 | A (60%) |
| | First light source and second light source and third light source and fourth light source (two pairs, four rod-like light sources in total) | — | — | — | Example 2-1 | A (65%) |
| | | Included | — | — | Example 2-2 | B (50%) |
| | | — | Included | — | Example 2-3 | A (60%) |
| | | — | Included | — | Example 2-4 | A (60%) |
| | | — | Included | — | Example 2-5 | A (60%) |
| | | — | Included | — | Example 2-6 | A (60%) |
| | | — | Included | — | Example 2-7 | A (60%) |
| | | — | Included | — | Example 2-8 | A (60%) |
| | | — | Included | — | Example 2-9 | A (60%) |
| | | — | Included | — | Example 2-10 | A (60%) |
| | | — | — | Included | Example 2-11 | A (65%) |
| | | — | Included | Included | Example 2-12 | A (60%) |
| Light guide system | Rod-like light source on each edge surface of light guide plate (one pair, two rod-like light sources in total) | — | — | — | Comparative Example 1 | A (65%) |

| Light source irradiation system | Effect Front luminance of panel central portion in scattering state | Front contrast ratio of panel central portion | Distance between first liquid crystal panel and first and second light sources (h11 and h12) | LED bulb in oblique view |
|---|---|---|---|---|
| Oblique light incidence system | C (102 cd/m$^2$) | A (5) | B (8 cm) | C (Too bright, but depends on use) |
| | C (79 cd/m$^2$) | A (4.3) | B (8 cm) | A (Almost unobservable) |
| | A (138 cd/m$^2$) | A (4.6) | B (8 cm) | B (Blurring reduced brightness) |
| | B (113 cd/m$^2$) | A (4.3) | B (8 cm) | C (Too bright, but depends on use) |
| | A (153 cd/m$^2$) | B (3.6) | A (4 cm) | B (Blurring reduced brightness) |
| | A (169 cd/m$^2$) | A (4.1) | B (8 cm) | B (Blurring reduced brightness) |
| | A (203 cd/m$^2$) | A (5.2) | B (8 cm) | C (Too bright) |
| | A (158 cd/m$^2$) | A (4.5) | B (8 cm) | A (Almost unobservable) |
| | A (298 cd/m$^2$) | C (2.6) | B (8 cm) | B (Blurring reduced brightness) |
| | A (240 cd/m$^2$) | C (2.3) | B (8 cm) | B (Blurring reduced brightness) |
| | A (250 cd/m$^2$) | C (2.4) | B (8 cm) | B (Blurring reduced brightness) |
| | A (246 cd/m$^2$) | C (2.4) | B (8 cm) | B (Blurring reduced brightness) |
| | A (240 cd/m$^2$) | C (2.6) | B (8 cm) | B (Blurring reduced brightness) |

TABLE 6-continued

|  | A (212 cd/m²) | C (2.6) | B (8 cm) | B (Blurring reduced brightness) |
|---|---|---|---|---|
|  | A (202 cd/m²) | C (2.5) | B (8 cm) | B (Blurring reduced brightness) |
|  | A (206 cd/m²) | C (2.5) | B (8 cm) | B (Blurring reduced brightness) |
|  | A (225 cd/m²) | A (4.5) | B (8 cm) | C (Too bright, but depends on use) |
|  | A (337 cd/m²) | A (4.3) | B (8 cm) | B (Blurring reduced brightness) |
| Light guide system | D (60 cd/m²) | D (1.4) | A (0 cm) | A (Almost unobservable) |

In Table 6, the subjective evaluation was performed based on the following criteria.

A: Excellent
B: Good
C: Average
D: Poor

In evaluation of LED bulbs in an oblique view in Table 6, it is important that the LED light is not observed by the viewer.

Also, the NTSC ratio in the liquid crystal display device of each of Example 2-3, Examples 2-7 to 2-10, and Comparative Example 1 was determined. The NTSC ratio was 5.7% in Example 2-3, 2.8% in Example 2-7, 2.8% in Example 2-8, 2.5% in Example 2-9, 2.6% in Example 2-10, and 20.5% in Comparative Example 1. The NTSC ratio was determined as follows. The chromaticity (x, y) of each of RGB in the first liquid crystal panel of each of the examples and comparative example was measured with the spectroradiometer (SR-UL1) available from Topcon Technohouse Corporation to calculate the color gamut coverage (area). Thus, the ratio of the color gamut coverage to the area of NTSC (color gamut standard) was determined.

The liquid crystal display devices of Examples 1-1 to 1-6 and 2-1 to 2-12 can display images without a polarizing plate since its first liquid crystal panel includes a polymer dispersed liquid crystal, thus reducing a decrease in transmittance in the transparent state. Also, in Examples 1-1 to 1-6 and 2-1 to 2-12, the back surface side main surface 11P of the first liquid crystal panel 11 was irradiated with light from an oblique direction, so that the front luminance of the panel central portion and the front contrast ratio of the panel central portion in the scattering state were successfully increased. In contrast, in Comparative Example 1, light from the LED light source 51R was incident on the edge surface of the light guide plate 52R, so that the front luminance of the panel central portion and the front contrast ratio of the panel central portion in the scattering state were not increased.

The liquid crystal display devices of Examples 1-1 to 1-6 satisfying (formula 1-1) and (formula 1-2) increased the intensity of the front scattering components in the scattering state and enabled further reduction of a decrease in luminance of the panel central portion in the scattering state, thus enabling even brighter display.

The liquid crystal display devices of Examples 2-1 and 2-2 satisfying (formula 1-1), (formula 1-2), (formula 2-1), and (formula 2-2) increased the intensity of the front scattering components in the scattering state and enabled further reduction of a decrease in luminance of the panel central portion in the scattering state, thus enabling even brighter display.

The liquid crystal display device 1RF of Comparative Example 1 had a front luminance of the panel central portion in the scattering state of 60 cd/m² and a front contrast ratio of the panel central portion of 1.4, and exhibited poor display quality in a front view, which was at a level that made the viewer uncomfortable.

Figure 23:
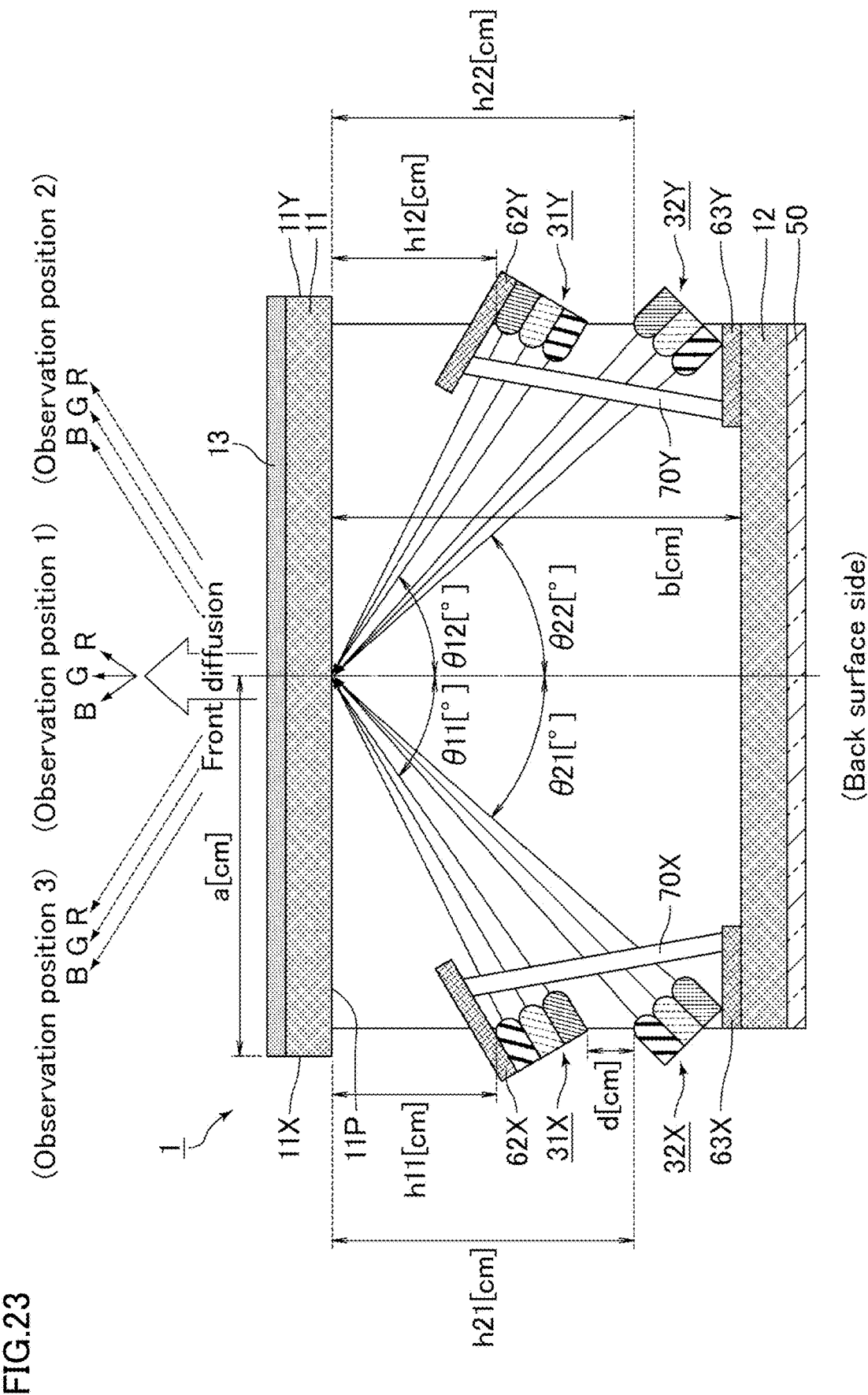
FIG. 23 is a schematic view showing the evaluation of LED bulbs.

FIG. 23 is a schematic view showing the evaluation of LED bulbs. In a liquid crystal display device including the light-shielding louver 13 as with the liquid crystal display devices of Example 1-2 and Example 2-2, the LED bulbs were not observed even when the display device was observed at the observation position 2 or 3 from an oblilue direction as shown in FIG. 23.

REFERENCE SIGNS LIST 1, 1RF: liquid crystal display device
1B, 1G, 1R: input grayscale data
1b, 1g, 1r: applied grayscale data
4: pixel forming portion
11: first liquid crystal panel
11A: display portion
11P: back surface side main surface
11X: one edge portion
11Y: other edge portion
12: second liquid crystal panel
13: light-shielding louver
14: anisotropic light diffusion film
15: anisotropic light reflection film
20: transparent resin plate
31X: first light source
31Y: second light source
32X: first back surface side light source
32Y: second back surface side light source
31B, 31G, 31R: LED (light emitting diode)
40: TFT (thin film transistor)
42: liquid crystal capacitance
43: auxiliary capacitance
45: auxiliary capacitance electrode
46: pixel capacitance
50, 50R: backlight
51R: LED light source
52R: light guide plate
61X: first mirror
61Y: second mirror
62X: third mirror
62Y: fourth mirror
63X: fifth mirror
63Y: sixth mirror
70X: first luminance increasing film
70Y: second luminance increasing film
80: adhesive component
100: first substrate
110: first support substrate
120, 620: pixel electrode 131: louver layer
132: transparent film
200: second substrate
210: second support substrate
220, 930: common electrode
300: polymer dispersed liquid crystal
310: polymer network
320: liquid crystal component
410: first alignment film
420: second alignment film
510: first polarizing plate
520: second polarizing plate
600: third substrate
610: third support substrate
710: third alignment film
720: fourth alignment film
800: liquid crystal layer
900: fourth substrate
910: fourth support substrate
920: color filter layer
1000: preprocessing unit
1100: signal separation circuit
1200: data correction circuit
1300(R): red field memory
1300(G) green field memory
1300(B): blue field memory
1311: light-shielding layer
1312: transparent layer
2000: timing controller
3100: gate driver
3200: source driver
3300: LED driver
4011: region having relatively low refractive index
4012, 4012': region having relatively high refractive index
4012a, 4012a': column
4014: bent portion
4020: first internal structure
4020a, 4030a: columnar structure
4020b, 4030b: louver structure
4030: second internal structure
4050: light diffusion layer
DIN: input image signal
DV: digital video signal
GCK: gate clock signal
GSP: gate start pulse signal
GL, GL1 to GLm: gate line
LS: latch strobe signal
S1: LED driver control signal
S2: light source control signal
SCK: source clock signal
SL, SL1 to SLn: source line
SSP: source start pulse signal

What is claimed is:

1. A liquid crystal display device comprising, sequentially from its viewing surface side toward its back surface side:
a first liquid crystal panel;
a light source;
a back surface side light source; and
a second liquid crystal panel,
the first liquid crystal panel including a polymer dispersed liquid crystal containing a polymer network and liquid crystal components,
the light source being configured to directly irradiate a back surface side main surface of the first liquid crystal panel with light from an oblique direction without guiding light emitted from the light source through any other element between the light source and the first liquid crystal panel, and
the back surface side light source irradiating the back surface side main surface of the first liquid crystal panel with light from an oblique direction without guiding light emitted from the back surface side light source through any other element between the back surface side light source and the first liquid crystal panel.

2. The liquid crystal display device according to claim 1, wherein the first liquid crystal panel displays an image based on a field-sequential color system, and
the light source includes light-emitting elements configured to emit light rays of colors different from one another.

3. The liquid crystal display device according to claim 1, wherein the first liquid crystal panel further includes a thin film transistor.

4. The liquid crystal display device according to claim 1, wherein a distance between the first liquid crystal panel and the second liquid crystal panel is a [cm] or shorter, where a is calculated from a length $2a$ [cm] of a long side of the first liquid crystal panel.

5. The liquid crystal display device according to claim 1, wherein the liquid crystal display device satisfies the following (formula 1-1):

$$1 \text{ cm} \leq h11 \leq \{a/(\tan \theta 11)\} \quad \text{(formula 1-1)}$$

where a is calculated from a length $2a$ [cm] of a long side of the first liquid crystal panel, h11 [cm] is a distance between the first liquid crystal panel and the light source, and $\theta 11$[°] is an angle of incidence of light from the light source on the back surface side main surface of the first liquid crystal panel.

6. The liquid crystal display device according to claim 1, wherein the light source is a first light source and disposed correspondingly to one of a pair of edge portions of the first liquid crystal panel facing each other,
the liquid crystal display device further includes a second light source that is disposed between the first liquid crystal panel and the second liquid crystal panel and correspondingly to the other of the edge portions,
the second light source is configured to irradiate the back surface side main surface of the first liquid crystal panel with light from an oblique direction, and
an angle of incidence of light from the first light source on the back surface side main surface of the first liquid crystal panel is the same as an angle of incidence of light from the second light source on the back surface side main surface of the first liquid crystal panel.

7. The liquid crystal display device according to claim 1, wherein the liquid crystal display device satisfies the following (formula 1-1) and (formula 2-1):

$$1 \text{ cm} \leq h11 \leq \{a/(\tan \theta 11)\} \quad \text{(formula 1-1)}$$

$$\theta 11 - \theta 21 > 10° \quad \text{(formula 2-1)}$$

where a is calculated from a length $2a$ [cm] of a long side of the first liquid crystal panel, h11 [cm] is a distance between the first liquid crystal panel and the light source, $\theta 11$[°] is an angle of incidence of light from the light source on the back surface side main surface of the first liquid crystal panel, and $\theta 21$[°] is an angle of incidence of light from the back surface side light source on the back surface side main surface of the first liquid crystal panel.

8. The liquid crystal display device according to claim 1, wherein the back surface side light source is a first back surface side light source and disposed correspondingly to one of a pair of edge portions of the first liquid crystal panel facing each other, the liquid crystal display device further includes a second back surface side light source that is disposed between the light source and the second liquid crystal panel and correspondingly to the other of the edge portions, the second back surface side light source is configured to irradiate the back surface side main surface of the first liquid crystal panel with light from an oblique direction, and an angle of incidence of light from the first back surface side light source on the back surface side main surface of the first liquid crystal panel is the same as an angle of incidence of light from the second back surface side light source on the back surface side main surface of the first liquid crystal panel.

9. The liquid crystal display device according to claim 1, wherein the first liquid crystal panel further includes a first support substrate on a back surface side of the polymer dispersed liquid crystal, and a second support substrate on a viewing surface side of the polymer dispersed liquid crystal.

10. The liquid crystal display device according to claim 9, wherein the first liquid crystal panel further includes an alignment film at least one of between the first support substrate and the polymer dispersed liquid crystal or between the second support substrate and the polymer dispersed liquid crystal, and the alignment film is a horizontal alignment film configured to align the liquid crystal components in a direction parallel to a surface of the alignment film.

11. The liquid crystal display device according to claim 10, wherein the liquid crystal components have a positive anisotropy of dielectric constant.

12. The liquid crystal display device according to claim 9, wherein the first liquid crystal panel further includes a transparent resin plate on a back surface side of the first support substrate.

13. The liquid crystal display device according to claim 9, wherein the first liquid crystal panel further includes an anisotropic light diffusion film having a function to transmit light in a front view and scatter light in an oblique view on at least one of a back surface side of the first support substrate or a viewing surface side of the second support substrate.

14. The liquid crystal display device according to claim 1, wherein the second liquid crystal panel includes, sequentially from its back surface side toward its viewing surface side, a third support substrate, a liquid crystal layer, and a fourth support substrate.

* * * * *